US012762873B2

(12) United States Patent
Hoffman

(10) Patent No.: US 12,762,873 B2
(45) Date of Patent: Oct. 13, 2026

(54) SYSTEMS AND METHODS FOR TISSUE BOUNDS DETECTION

(71) Applicant: 10x Genomics, Inc., Pleasanton, CA (US)

(72) Inventor: David P. Hoffman, Pleasanton, CA (US)

(73) Assignee: 10x Genomics, Inc., Pleasanton, CA (US)

( * ) Notice: Subject to any disclaimer, the term of this patent is extended or adjusted under 35 U.S.C. 154(b) by 267 days.

(21) Appl. No.: 18/394,370

(22) Filed: Dec. 22, 2023

(65) Prior Publication Data

US 2024/0233415 A1 Jul. 11, 2024

Related U.S. Application Data

(60) Provisional application No. 63/435,525, filed on Dec. 27, 2022.

(51) Int. Cl.

| | |
|---|---|
| ***G06V 20/69*** | (2022.01) |
| ***G06T 7/62*** | (2017.01) |
| ***G06V 10/32*** | (2022.01) |
| ***G06V 10/98*** | (2022.01) |

(52) U.S. Cl.
CPC ............ *G06V 20/695* (2022.01); *G06V 10/32* (2022.01); *G06V 10/993* (2022.01); *G06V 2201/03* (2022.01)

(58) Field of Classification Search
CPC .... G06V 20/695; G06V 10/32; G06V 10/993; G06V 2201/03; G06T 7/62; G06T 2207/10056; G06T 2207/10064; G06T 2207/20081; G06T 2207/30024; G02B 21/244; G02B 21/367
USPC ........................................................ 382/133
See application file for complete search history.

(56) References Cited

U.S. PATENT DOCUMENTS

| | | | | |
|---|---|---|---|---|
| 2012/0236120 | A1* | 9/2012 | Kramer | G02B 21/0004 382/128 |
| 2014/0049682 | A1 | 2/2014 | Galstian et al. | |
| 2015/0087902 | A1 | 3/2015 | Mertz et al. | |
| 2017/0018065 | A1 | 1/2017 | Greenway, Jr. et al. | |
| 2021/0112203 | A1 | 4/2021 | Walden, II et al. | |
| 2021/0343015 | A1* | 11/2021 | Mouton | G06T 7/174 |
| 2022/0084305 | A1* | 3/2022 | Zhang | G06V 10/56 |
| 2022/0269058 | A1* | 8/2022 | Liu | G03B 17/565 |
| 2022/0343467 | A1 | 10/2022 | Alvarez et al. | |
| 2024/0135565 | A1* | 4/2024 | Steinert | G02B 27/0075 |

OTHER PUBLICATIONS

International Search Report and Written Opinion, PCT/US23/85692, mailed Apr. 24, 2024, 25 pages.

* cited by examiner

*Primary Examiner* — Jennifer Mehmood
*Assistant Examiner* — Dustin Bilodeau
(74) *Attorney, Agent, or Firm* — Erik A. Huestis; Nicole A. Bustos-Pomerantz; Foley Hoag LLP

(57) ABSTRACT

A method for determining axial bounds of a tissue sample is provided. A plurality of images of a sample is received. The plurality of images includes a plurality of z-stacks and each z-stack in the plurality of z-stacks represents at least a portion of a volume of the sample. For each z-stack in the plurality of z-stacks, a focus score is determined for each image within the z-stack and a thickness of the z-stack is determined based on the focus scores. Axial bounds of the sample are determined based on the determined thicknesses.

20 Claims, 30 Drawing Sheets

300c

SYSTEMS AND METHODS FOR TISSUE BOUNDS DETECTION

CROSS REFERENCE TO RELATED APPLICATIONS

This application claims priority to U.S. provisional patent application Ser. No. 63/435,525 filed Dec. 27, 2022, the entire content of which is incorporated herein by reference and relied upon.

FIELDS OF THE DISCLOSURE

The present disclosure is directed to imaging techniques for samples having inherent contrast properties, e.g., biological samples. More specifically, the present disclosure describes identifying axial bounds and lateral bounds of samples based on the inherent contrast properties of the sample.

BACKGROUND

For automated, high-throughput tissue imaging applications, automatically identifying relevant regions—those regions that contain tissue ("lateral bounds")—can be challenging as many biological samples are substantially translucent or transparent. For volumetric imaging applications, automatically identifying thickness ("axial bounds") of the relevant regions is also challenging without manual measurement. Moreover, manual measurement is limited in that it cannot obtain a high resolution of thickness measurements across a sample volume. Even with manual measurement, tissue samples are complex in that they can vary in thickness over the volume and a single thickness estimate obtained by manual methods will have to significantly overestimate the maximum thickness so that no portion of the volume is missed during volumetric imaging. Thick samples also present a challenging structure, especially in inverted imaging geometries. Significantly overestimating tissue thickness in volumetric imaging can have negative consequences—specifically, increased computational resources used to store the volumetric images and any additional processing of those images. Moreover, tissue samples affixed to slides may include artifacts of tissue or non-tissue material in the periphery of the actual tissue sample (sometimes adhered to the slide), which may appear like tissue structure especially in a plan view of the sample, but these artifacts generally have significantly less thickness than the tissue sample.

Accordingly, there exists a need for a fast and accurate tissue bounds detection method for use in automated and high-throughput imaging systems.

SUMMARY

In various embodiments, a method is provided for determining axial bounds of a tissue sample. A plurality of images of a sample is received. The plurality of images includes a plurality of z-stacks and each z-stack in the plurality of z-stacks represents at least a portion of a volume of the sample. For each z-stack in the plurality of z-stacks, a focus score is determined for each image within the z-stack and a thickness of the z-stack is determined based on the focus scores. Axial bounds of the sample are determined based on the determined thicknesses.

In various embodiments, a system is provided including an image database and a computing node including a computer readable storage medium having program instructions embodied therewith. The program instructions are executable by a processor to cause the processor to perform a method where a plurality of images of a sample is received. The plurality of images includes a plurality of z-stacks and each z-stack in the plurality of z-stacks represents at least a portion of a volume of the sample. For each z-stack in the plurality of z-stacks, a focus score is determined for each image within the z-stack and a thickness of the z-stack is determined based on the focus scores. Axial bounds of the sample are determined based on the determined thicknesses.

In various embodiments, a computer program product is provided for determining axial bounds of a tissue sample. The computer program product includes a computer readable storage medium having program instructions embodied therewith. The program instructions are executable by a processor to cause the processor to perform a method where a plurality of images of a sample is received. The plurality of images includes a plurality of z-stacks and each z-stack in the plurality of z-stacks represents at least a portion of a volume of the sample. For each z-stack in the plurality of z-stacks, a focus score is determined for each image within the z-stack and a thickness of the z-stack is determined based on the focus scores. Axial bounds of the sample are determined based on the determined thicknesses.

Figure 1:
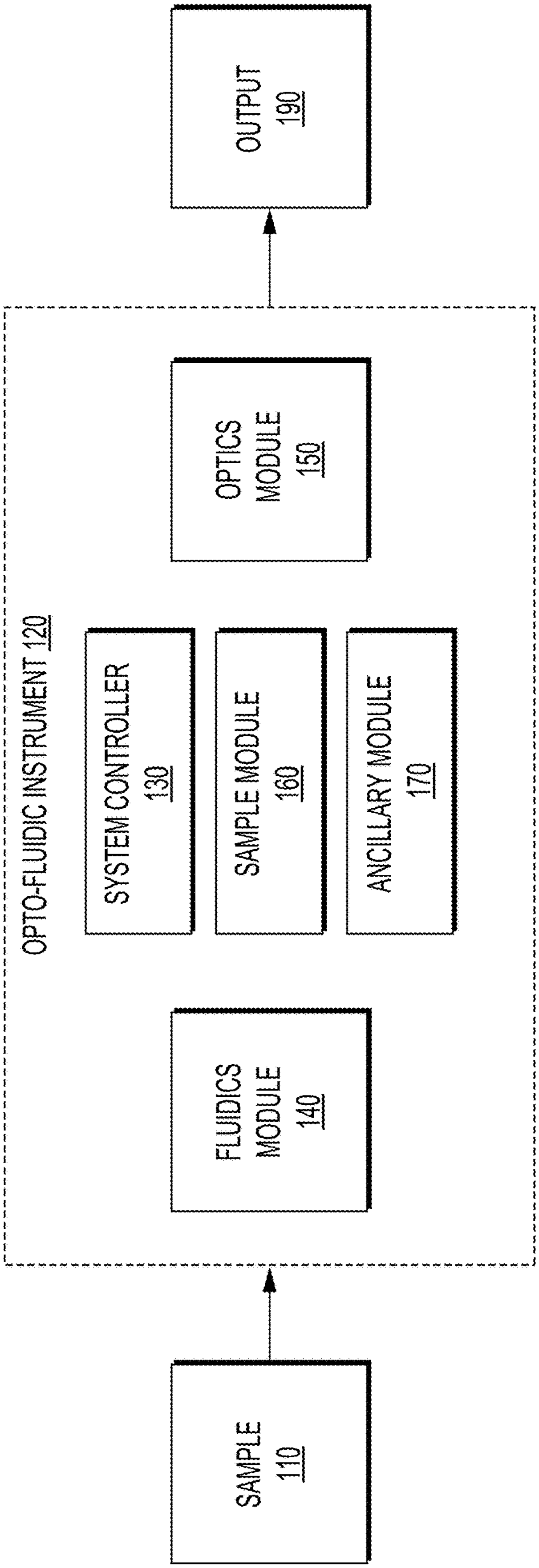
FIG. 1 is an example workflow of analysis of a biological sample (e.g., a cell or tissue sample) using an opto-fluidic instrument, according to various embodiments.

It is to be understood that the figures are not necessarily drawn to scale, nor are the objects in the figures necessarily drawn to scale in relationship to one another. The figures are depictions that are intended to bring clarity and understanding to various embodiments of apparatuses, systems, and methods disclosed herein. Wherever possible, the same reference numbers will be used throughout the drawings to refer to the same or like parts. Moreover, it should be appreciated that the drawings are not intended to limit the scope of the present teachings in any way.

DETAILED DESCRIPTION

I. Overview

As explained above, current tissue bounds detection technologies are insufficient for imaging (e.g., volumetric imaging) of samples in automated and high-throughput imaging systems as tissue bounds are generally determined manually and the determined thicknesses are significantly overestimated by these manual processes, causing increased computational burden.

The present disclosure resolves the above technical problems by providing systems, methods, and computer program products to automatically determine axial and lateral bounds of a sample (e.g., a tissue sample) using the inherent contrast properties of the sample (e.g., using dark field imaging). In general, the systems and methods described herein use any suitable method to generate contrast of a sample against a background (e.g., illumination of a sample via bright field imaging, illumination of a sample via fluorescent imaging, inducing autofluorescence within the sample, adding contrast to the sample with one or more stains, etc.).

Target molecules (e.g., nucleic acids, proteins, antibodies, etc.) can be detected in biological samples (e.g., one or more cells or a tissue sample) using an instrument having integrated optics and fluidics modules (an "opto-fluidic instrument"). In an opto-fluidic instrument, the fluidics module is configured to deliver one or more reagents (e.g., fluorescent probes) to the biological sample and/or remove spent reagents therefrom. Additionally, the optics module is configured to illuminate the biological sample with light having one or more spectral emission curves (over a range of wavelengths) and subsequently capture one or more images of emitted light signals from the biological sample during one or more probing cycles. In various embodiments, the captured images may be processed in real time and/or at a later time to determine the presence of the one or more target molecules in the biological sample, as well as three-dimensional position information associated with each detected target molecule. Additionally, the opto-fluidics instrument includes a sample module configured to receive (and, optionally, secure) one or more biological samples. In some instances, the sample module includes an X-Y stage configured to move the biological sample along an X-Y plane (e.g., perpendicular to an objective lens of the optics module).

In various embodiments, the opto-fluidic instrument is configured to analyze one or more target molecules in their naturally occurring place (i.e., in situ) within the biological sample. For example, an opto-fluidic instrument may be an in-situ analysis system used to analyze a biological sample and detect target molecules including but not limited to DNA, RNA, proteins, antibodies, etc.

A sample disclosed herein can be or be derived from any biological sample. Biological samples may be obtained from any suitable source using any of a variety of techniques including, but not limited to, biopsy, surgery, and laser capture microscopy (LCM), and generally includes cells, tissues, and/or other biological material from the subject. A biological sample can be obtained from a prokaryote such as a bacterium, an archaea, a virus, or a viroid. A biological sample can also be obtained from eukaryotic mammalian and eukaryotic non-mammalian organisms (e.g., a plant, a fungus, an insect, an arachnid, a nematoda, a reptile, or an amphibian). A biological sample from an organism may comprise one or more other organisms or components therefrom. For example, a mammalian tissue section may comprise a prion, a viroid, a virus, a bacterium, a fungus, or components from other organisms, in addition to mammalian cells and non-cellular tissue components. Subjects from which biological samples can be obtained can be healthy or asymptomatic subjects, subjects that have or are suspected of having a disease (e.g., an individual with a disease such as cancer) or a pre-disposition to a disease, and/or subjects in need of therapy or suspected of needing therapy.

The biological sample can include any number of macromolecules, for example, cellular macromolecules and organelles (e.g., mitochondria and nuclei). The biological sample can be obtained as a tissue sample, such as a tissue section, biopsy, a core biopsy, needle aspirate, or fine needle aspirate. The sample can be a fluid sample, such as a blood sample, urine sample, or saliva sample. The sample can be a skin sample, a colon sample, a cheek swab, a histology sample, a histopathology sample, a plasma or serum sample, a tumor sample, living cells, cultured cells, a clinical sample such as, for example, whole blood or blood-derived products, blood cells, or cultured tissues or cells, including cell suspensions.

In some embodiments, the biological sample may comprise cells or a tissue sample which are deposited on a substrate. As described herein, a substrate can be any support that is insoluble in aqueous liquid and allows for positioning of biological samples, analytes, features, and/or reagents on the support. In some embodiments, a biological sample is attached to a substrate. In some embodiments, the substrate is optically transparent to facilitate analysis on the opto-fluidic instruments disclosed herein. For example, in some instances, the substrate is a glass substrate (e.g., a microscopy slide, cover slip, or other glass substrate). Attachment of the biological sample can be irreversible or reversible, depending upon the nature of the sample and subsequent steps in the analytical method. In certain embodiments, the sample can be attached to the substrate reversibly by applying a suitable polymer coating to the substrate and contacting the sample to the polymer coating. The sample can then be detached from the substrate, e.g., using an organic solvent that at least partially dissolves the polymer coating. Hydrogels are examples of polymers that are suitable for this purpose. In some embodiments, the substrate can be coated or functionalized with one or more substances to facilitate attachment of the sample to the substrate. Suitable substances that can be used to coat or functionalize the substrate include, but are not limited to, lectins, poly-lysine, antibodies, and polysaccharides.

It is to be noted that, although the above discussion relates to an opto-fluidic instrument that can be used for in situ target molecule detection via probe hybridization, the discussion herein equally applies to any opto-fluidic instrument that employs any imaging or target molecule detection technique. That is, for example, an opto-fluidic instrument may include a fluidics module that includes fluids used for establishing the experimental conditions used for the probing of target molecules in the sample. Further, such an opto-fluidic instrument may also include a sample module configured to receive the sample, and an optics module including an imaging system for illuminating (e.g., exciting one or more fluorescent probes within the sample) and/or imaging light signals received from the probed sample. The in-situ analysis system may also include other ancillary modules configured to facilitate the operation of the opto-fluidic instrument, such as, but not limited to, cooling systems, motion calibration systems, etc.

II. Example Descriptions of Terms

As used herein the specification, “a” or “an” may mean one or more. As used herein in the claim(s), when used in conjunction with the word “comprising,” the words “a” or “an” may mean one or more than one. Some embodiments of the disclosure may consist of or consist essentially of one or more elements, method steps, and/or methods of the disclosure. It is contemplated that any method or composition described herein can be implemented with respect to any other method or composition described herein and that different embodiments may be combined.

As used herein, “substantially” means sufficient to work for the intended purpose. The term “substantially” thus allows for minor, insignificant variations from an absolute or perfect state, dimension, measurement, result, or the like such as would be expected by a person of ordinary skill in the field but that do not appreciably affect overall performance. When used with respect to numerical values or parameters or characteristics that can be expressed as numerical values, “substantially” means within ten percent.

The use of the term “or” in the claims is used to mean “and/or” unless explicitly indicated to refer to alternatives only or the alternatives are mutually exclusive, although the disclosure supports a definition that refers to only alternatives and “and/or.” For example, “x, y, and/or z” can refer to “x” alone, “y” alone, “z” alone, “x, y, and z,” “(x and y) or z,” “x or (y and z),” or “x or y or z.” It is specifically contemplated that x, y, or z may be specifically excluded from an embodiment. As used herein “another” may mean at least a second or more.

The term “ones” means more than one.

As used herein, the term “plurality” can be 2, 3, 4, 5, 6, 7, 8, 9, 10, or more.

As used herein, the term “set of” means one or more. For example, a set of items includes one or more items.

As used herein, the phrase “at least one of,” when used with a list of items, means different combinations of one or more of the listed items may be used and only one of the items in the list may be needed. The item may be a particular object, thing, step, operation, process, or category. In other words, “at least one of” means any combination of items or number of items may be used from the list, but not all of the items in the list may be required. For example, without limitation, “at least one of item A, item B, or item C” means item A; item A and item B; item B; item A, item B, and item C; item B and item C; or item A and C. In some cases, “at least one of item A, item B, or item C” means, but is not limited to, two of item A, one of item B, and ten of item C; four of item B and seven of item C; or some other suitable combination.

As used herein, the term “about” refers to include the usual error range for the respective value readily known. Reference to “about” a value or parameter herein includes (and describes) embodiments that are directed to that value or parameter per se. For example, description referring to “about X” includes description of “X”. In some embodiments, “about” may refer to ±15%, ±10%, ±5%, or ±1% as understood by a person of skill in the art.

While the present teachings are described in conjunction with various embodiments, it is not intended that the present teachings be limited to such various embodiments. On the contrary, the present teachings encompass various alternatives, modifications, and equivalents, as will be appreciated by those of skill in the art.

In describing the various embodiments, the specification may have presented a method and/or process as a particular sequence of steps. However, to the extent that the method or process does not rely on the particular order of steps set forth herein, the method or process should not be limited to the particular sequence of steps described, and one skilled in the art can readily appreciate that the sequences may be varied and still remain within the spirit and scope of the various embodiments.

III. Opto-Fluidic Instruments for Tissue Bounds Detection

FIG. 1 shows an example workflow of analysis of a biological sample 110 (e.g., cell or tissue sample) using an opto-fluidic instrument 120, according to various embodiments. In various embodiments, the sample 110 can be a biological sample (e.g., a tissue) that includes molecules targeted for analysis (i.e., target molecules), such as DNA, RNA, proteins, antibodies, etc. In various embodiments, the biological sample is a fresh frozen tissue. In various embodiments, the biological sample is a formalin-fixed paraffin-embedded (FFPE) sample. For example, the sample 110 can be a sectioned tissue that is treated to access the RNA thereof for labeling with circularizable DNA probes. In various embodiments, ligation of the probes generates a circular DNA probe which can be enzymatically amplified and bound with fluorescent oligonucleotides to produce a sufficiently bright signal that facilitates image acquisition and has a high signal-to-noise ratio.

In various embodiments, the sample 110 may be placed in the opto-fluidic instrument 120 for analysis and detection of the target molecules in the sample 110. In various embodiments, the opto-fluidic instrument 120 is configured to facilitate the experimental conditions conducive for the detection of the target molecules. For example, the opto-fluidic instrument 120 can include a fluidics module 140, an optics module 150, a sample module 160, and at least one ancillary module 170, and these modules may be operated by a system controller 130 to create the experimental conditions for the probing of the target molecules in the sample 110 by selected probes (e.g., circularizable DNA probes), as well as to facilitate the imaging of the probed sample 110 (e.g., by an imaging system of the optics module 150). In various embodiments, the various modules of the opto-fluidic instrument 120 may be separate components. In various embodiments, the various modules of the opto-fluid instrument 120 may be in electrical communication with each other. In various embodiments, at least some of the modules of the opto-fluidic instrument 120 may be integrated together into a single module.

In various embodiments, the sample module 160 may be configured to receive the sample 110 in the opto-fluidic instrument 120. For instance, the sample module 160 may include a sample interface module (SIM) that is configured to receive a sample device (e.g., cassette) in which a substrate (having the sample 110 positioned thereon) can be secured. In various embodiments, the substrate is a glass slide. That is, the sample 110 may be placed in the opto-fluidic instrument 120 by securing the substrate having the sample 110 (e.g., the sectioned tissue) within the sample device that is then inserted into the SIM of the sample module 160. In various embodiments, the SIM includes an alignment mechanism configured to secure the sample device within the SIM and align the sample device in X, Y, and Z axes within the SIM. In some instances, the sample module 160 may also include an X-Y stage onto which the SIM is mounted. The X-Y stage may be configured to move the SIM mounted thereon (e.g., and as such the sample device containing the sample 110 inserted therein) in perpendicular directions along a two-dimensional (2D) plane of the opto-fluidic instrument 120. Additional discussion related to the SIM can be found in U.S. application Ser. No. 18/328,200, filed Jun. 2, 2023, titled "Methods, Systems, and Devices for Sample Interface," which is incorporated herein by reference in its entirety.

The experimental conditions that are conducive for the detection of the target molecules in the sample 110 may depend on the target molecule detection technique that is employed by the opto-fluidic instrument 120. For example, in various embodiments, the opto-fluidic instrument 120 can be a system that is configured to detect molecules in the sample 110 via hybridization of probes. In such cases, the experimental conditions can include molecule hybridization conditions that result in the intensity of hybridization of the target molecule (e.g., nucleic acid) to a probe (e.g., oligonucleotide) being significantly higher when the probe sequence is complementary to the target molecule than when there is a single-base mismatch. The hybridization conditions include the preparation of the sample 110 using reagents such as washing/stripping reagents, probe reagents, etc., and such reagents may be provided by the fluidics module 140. Examples of the washing buffer include but are not limited to deionized water, phosphate-buffered saline (PBS), PBS with dimethyl sulfoxide (DMSO), etc. The stripping buffer can be but is not limited to DMSO, a surfactant, etc. In some instances, the surfactant can be or include polysorbate 20. In some instances, the stripping buffer may include the surfactant in a weight proportion of about 0.1%. The probe reagent can be fluorescent probes, such as but not limited to oligonucleotide probes.

In various embodiments, the fluidics module 140 may include one or more components that may be used for storing the reagents, as well as for transporting said reagents to and from the sample device containing the sample 110. For example, the fluidics module 140 may include one or more reservoirs or reagent bottles configured to store the reagents, as well as a waste container configured for collecting the reagents (e.g., and other waste) after use by the opto-fluidic instrument 120 to analyze and detect the molecules of the sample 110. In various embodiments, the one or more reservoirs include one or more high use reagent reservoirs. In various embodiments, the fluidics module 140 may be configured to receive one or more low use reagent plates (e.g., a 96 deep well plate).

Further, the fluidics module 140 may also include pumps, tubes, pipettes, etc., that are configured to facilitate the transport of the one or more reagents (such non-limiting examples may include high use reagent and/or low use reagent) to the sample device and thus contact the sample 110 with the reagent (such non-limiting examples may include high use reagent and/or low use reagent). For instance, the fluidics module 140 may include one or more pumps ("reagent pumps") that are configured to pump washing and/or stripping reagents (i.e., high use reagents) to the sample device for use in washing and/or stripping the sample 110. In various embodiments, the fluidics module 140 may be configured for other washing functions such as washing an objective lens of the imaging system of the optics module 150. In some embodiments, a stage (e.g., a Y-Z stage) may be configured to move the pipettes, tubes, etc., along one or more directions, to and from the sample device containing the sample 110, so that the various reagents may be dispensed in the sample device, and spent reagents may be extracted from the sample device.

In various embodiments, the ancillary module 170 includes a cooling system (i.e., a heat transfer system) of the opto-fluidic instrument 120. In various embodiments, the cooling system includes a network of coolant-carrying tubes configured to transport coolant to various modules of the opto-fluidic instrument 120 for regulating the temperatures thereof. In such cases, the ancillary module 170 may include one or more heat transfer components of a heat transfer circuit. In various embodiments, the heat transfer components include one or more coolant reservoirs for storing coolants and pumps (e.g., "coolant pumps") for generating a pressure differential, thereby forcing the coolants to flow from the reservoirs to the various modules of the opto-fluidic instrument 120 via the coolant-carrying tubes. In some instances, the heat transfer components of the ancillary module 170 may include returning coolant reservoirs that may be configured to receive and store returning coolants, i.e., heated coolants flowing back into the returning coolant reservoirs after absorbing heat discharged by the various modules of the opto-fluidic instrument 120. In such cases, the ancillary module 170 may also include one or more cooling fans that are configured to force air (e.g., cool and/or ambient air) to the external surfaces of the returning coolant reservoirs to thereby cool the heated coolant(s) stored therein. In some instance, the ancillary module 170 may also include one or more cooling fans that are configured to force air directly to a one or more components of the opto-fluidic instrument 120 so as to cool said one or more components. For one non-limiting example, the ancillary module 170 may include cooling fans that are configured to directly cool by forcing ambient air past the system controller 130 to thereby cool the system controller 130.

As discussed above, the opto-fluidic instrument 120 may include an optics module 150 which include the various optical components of the opto-fluidic instrument 120, such as but not limited to a camera, an illumination module (such non-limiting examples may include one or more LEDs and/or one or more lasers), an objective lens, and/or the like. The optics module 150 may include a fluorescence imaging system that is configured to image the fluorescence emitted by the probes (e.g., oligonucleotides) in the sample 110 after the probes are excited by light from the illumination module of the optics module 150. In some instances, the optics module 150 may also include an optical frame onto which the camera, the illumination module, and/or the X-Y stage of the sample module 160 may be mounted.

In various embodiments, the system controller 130 may be configured to control the operations of the opto-fluidic instrument 120 (e.g., and the operations of one or more modules thereof). In some embodiments, the system controller 130 may take various forms, including a processor, a single computer (or computer system), or multiple computers in communication with each other. In various embodiments, the system controller 130 may be communicatively coupled with a data storage, a set of input devices, a display system, or a combination thereof. In various embodiments, some or all of these components may be considered to be part of or otherwise integrated with the system controller 130, may be separate components in communication with each other, or may be integrated together. In other embodiments, the system controller 130 can be, or may be in communication with, a cloud computing platform.

In various embodiments, the opto-fluidic instrument 120 may analyze the sample 110 and generate the output 190 that includes indications of the presence of the target molecules in the sample 110. For instance, with respect to the example embodiment discussed above where the opto-fluidic instrument 120 employs a hybridization technique for detecting molecules, the opto-fluidic instrument 120 may perform a plurality of probing rounds on the sample 110. During the plurality of probing rounds, the sample 110 undergoes successive rounds of fluorescent probe hybridization (using two or more sets of fluorescent probes, where each set of fluorescent probes is excited by a different color channel) and is volumetrically imaged in a plurality of z-stacks to detect target molecules in the probed sample 110 in three dimensions. In such cases, the output 190 may include a plurality of light signals at specific three-dimensional locations over the plurality of probing cycles. In various embodiments, an optical signature (e.g., a codeword) specific to each gene is determined from the detected optical signals at each three-dimensional location across the plurality of probing cycles, which allows the identification of the target molecules.

IV. Experimental Determination of Tissue Bounds Detection

Figure 2A:
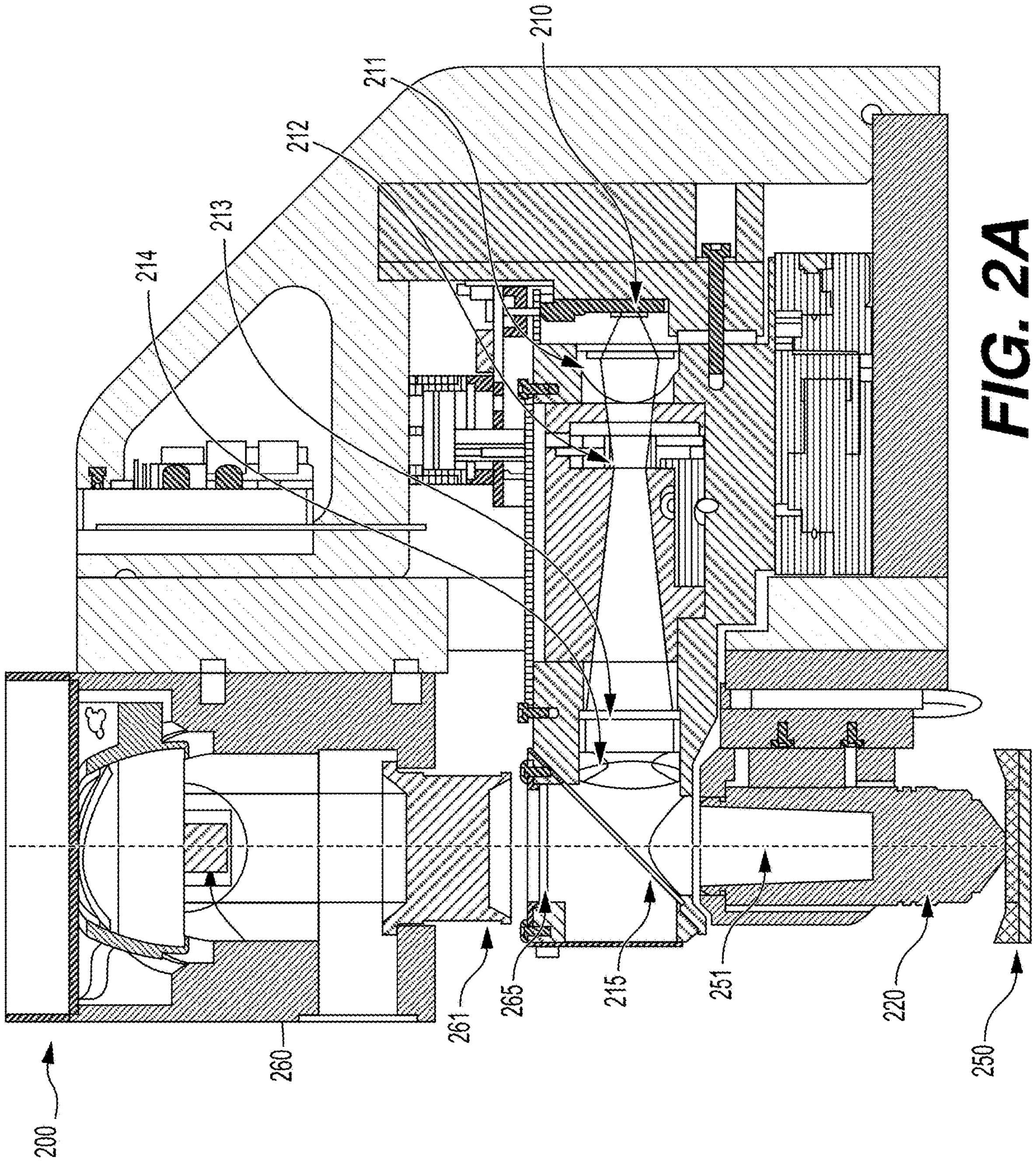
FIGS. 2A-2B illustrate cross-sectional views of an optics module in an imaging system, according to some embodiments.
Figure 2B:
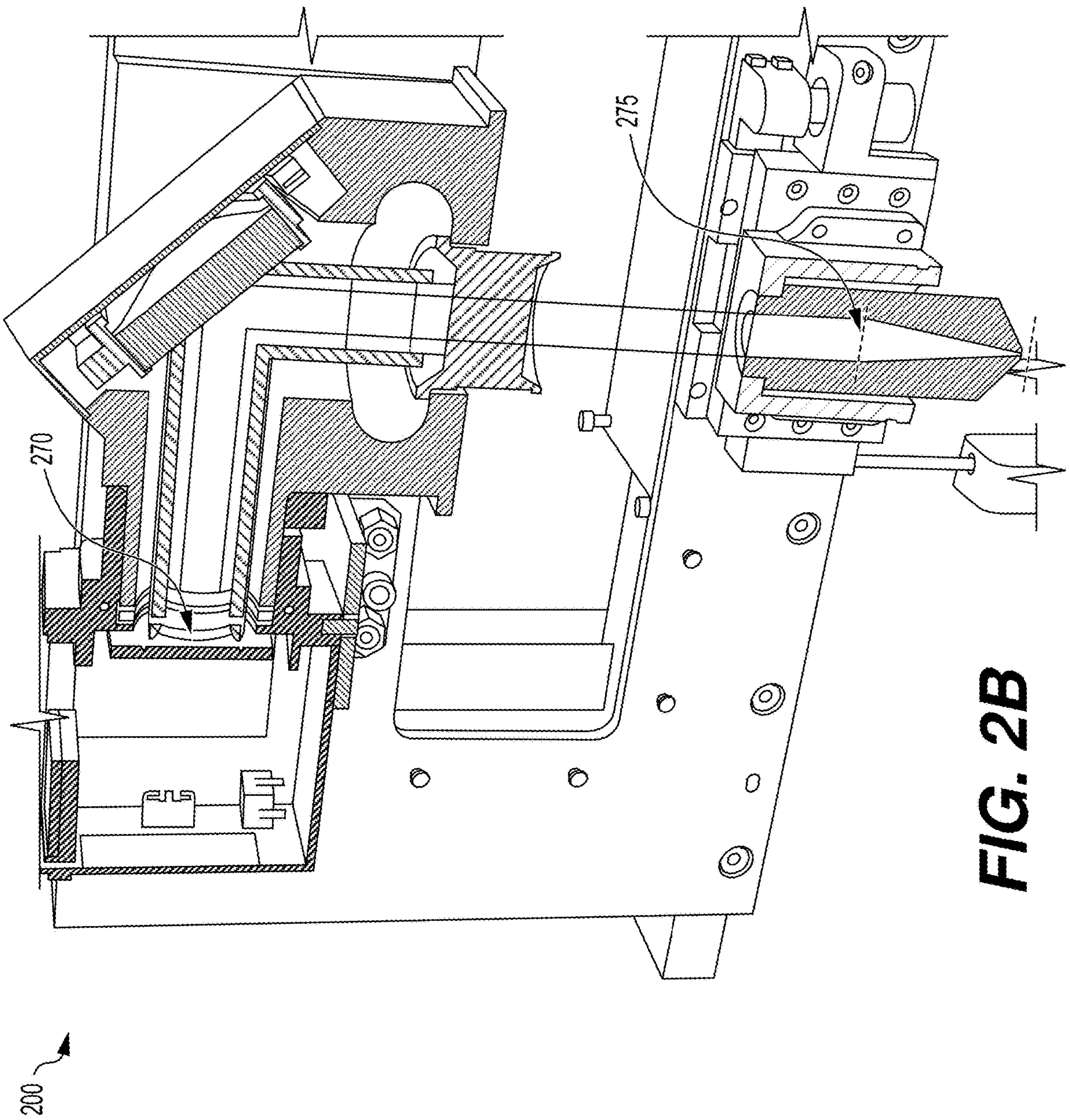

FIG. 2A illustrates a cross-sectional view of an optics module 200 in an imaging system. One or more illumination sources 210, e.g., one or more light emitting diodes (LEDs), provides light through one or more optical components and an objective lens 220 to thereby illuminate a sample 250. In various embodiments, the optical components include a collimator 211. In various embodiments, the optical components include a field stop 212. In various embodiments, the optical components include one or more excitation filters 213. In various embodiments, the one or more excitation filters 213 are configured to filter light from the illumination source(s) 210 for a predetermined range of wavelengths (e.g., each filter has one or more blocking band(s) and/or transmission band(s) that may be different or may overlap at least in part) and each excitation filter 213 is aligned with appropriate illumination source(s) 210 (e.g., blue LEDs, green LEDs, yellow LEDs, red LEDs, ultraviolet LEDs, etc.). In various embodiments, the optical components include a condenser 214. In various embodiments, the optical components include a beam splitter 215. An optical axis 251 is illustrated extending through the center of the optical surfaces in the objective lens 220 and its path includes an image plane 270, a focal plane, and input/output pupils 275 of FIG. 2B.

A sensor array 260 (e.g., CMOS sensor) receives light signals from the sample 250. In various embodiments, the optical components include one or more emission filters 265. In various embodiments, the one or more emission filters 265 are configured to filter light from the sample (e.g., emitted from one or more fluorophores, autofluorescence, etc.) for a predetermined range of wavelengths (e.g., each filter has one or more blocking band(s) and/or transmission band(s) that may be different or may overlap at least in part). In various embodiments, the emission filters 265 align (e.g., via motorized translation) with optics and/or the sensor array. In various embodiments, the sample 250 is probed with fluorescent probes configured to bind to a target (e.g., DNA or RNA) that, when illuminated with a particular wavelength (or range of wavelengths) of light, emit light signals that can be detected by the sensor array 260. In various embodiments, the sample 250 is repeatedly probed with two or more (e.g., two, three, four, five, six, etc.) different sets of probes. In various embodiments, each set of probes corresponds to a specific color (e.g., blue, green, yellow, or red) such that, when illuminated by that color, probes bound to a target emit light signals. In some embodiments, the sensor array 260 is aligned with the optical axis 251 of the objective lens 220 (i.e., the optical axis 251 of the camera is coincident with and parallel to the optical axis 251 of the objective lens 220). In various embodiments, the sensor array 260 is positioned perpendicularly to the objective lens 220 (i.e., the optical axis 251 of the camera is perpendicular to and intersects the optical axis 251 of the objective lens 220). In various embodiments, a tube lens 261 is mounted in the optical path to focus light on the sensor array 260 thereby allowing for image formation with infinity-corrected objectives. Descriptions of optical modules and illumination assemblies for use in opto-fluidic instruments can be found in U.S. provisional patent application No. 63/427,282, filed on Nov. 22, 2022, titled "Systems and Methods for Illuminating a Sample" and U.S. provisional patent application No. 63/427,360, file on Nov. 22, 2022, titled "Systems and Methods for Imaging Samples," each of which is incorporated by reference in its entirety.

In various embodiments, the sample is illuminated with one or more wavelengths configured to induce fluorescence in the sample. In various embodiments, the sample is probed during one or more probing cycles with one or more fluorescent probes configured to bind to one or more target analytes. In various embodiments, the one or more wavelengths are selected to induce fluorescence in a subset of the one or more fluorescent probes. In various embodiments, each probing cycle includes illumination with two or more (e.g., four) colors of light. In various embodiments, the sample is treated with a fluorescent stain configured to illuminate one or more structures within the sample. In various embodiments, the sample is contacted with a nuclear stain. In various embodiments, the sample is contacted with 4',6-diamidino-2-phenylindole ("DAPI") configured to bind to adenine-thymine-rich regions in DNA. In various embodiments, illumination of the sample causes autofluorescence of the sample. In various embodiments, autofluorescence is the natural emission of light by biological structures when they have absorbed light, and may be used to distinguish the light originating from artificially added fluorescent markers. In various embodiments, fluorescence of the sample through fluorescent probes, autofluorescence, and/or a fluorescent stain can be used with the methods described herein to determine one or more focus metrics of a tissue sample.

Figure 3A:
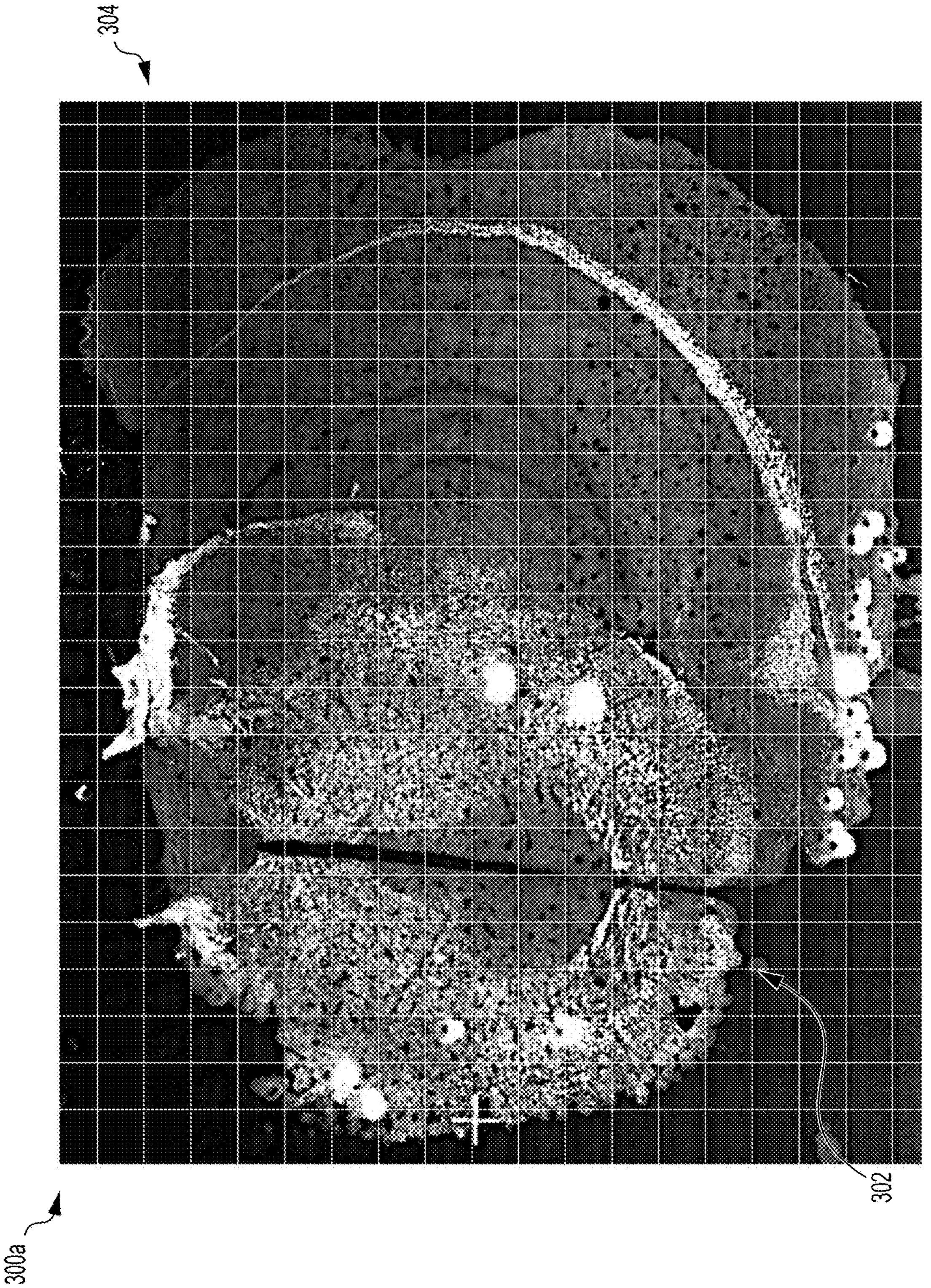
FIG. 3A illustrates a dark field image of a tissue sample, according to some embodiments.

In various embodiments, the sample is illuminated via edge lighting or transillumination along one or more edges of the sample and/or sample substrate. In various embodiments, the edge lighting provides dark-field illumination of the sample. In various embodiments, edge lighting is provided by one or more light sources positioned to provide light substantially perpendicular to a normal of the substrate surface on which the sample is disposed. In various embodiments, the substrate is a glass slide. In various embodiments, the substrate is configured as a wave guide to thereby guide light emitted from the edge lighting towards the sample. In various embodiments, illumination of the sample via edge lighting can be used with the methods described herein to determine one or more focus metrics of a tissue sample FIG. 3A illustrates a dark field image 300*a* of a tissue sample 302. In various embodiments, the tissue sample 302 is imaged by an optics module as described above. In various embodiments, the optics module images the tissue sample 302 as a plurality of fields-of-view (FOV). In various embodiments, each FOV is imaged as a z-stack having a plurality of z-slices (e.g., two or more z-slices). In various embodiments, each z-stack of images represents (e.g., approximates) a volume of the respective FOV being imaged. In various embodiments, the images of each FOV are stitched into a combined image of the tissue sample 302. In various embodiments, each FOV of the tissue sample 302 is imaged independently of other FOVs (e.g., the FOVs may not be stitched together into a single image). In various embodiments, the plurality of FOVs have a grid-like pattern 304, where each region (e.g., approximately square region) formed by the grid-like pattern 304 is imaged by the objective independently of the other areas. In various embodiments, the optics module images a predetermined volume. In various embodiments, the predetermined volume is defined by a maximum width, a maximum length, and/or a maximum thickness of the sample. In various embodiments, a buffer factor may be applied to any of the dimensions (e.g., max length, max width, and/or max thickness) to thereby add a predetermined buffer to the known dimension (s) and ensure that the tissue sample volume is fully imaged.

In various embodiments, the buffer factor is over 100%. In various embodiments, the buffer factor is about 100%. In various embodiments, the buffer factor is about 95%. In various embodiments, the buffer factor is about 90%. In various embodiments, the buffer factor is about 85%. In various embodiments, the buffer factor is about 80%. In various embodiments, the buffer factor is about 75%. In various embodiments, the buffer factor is about 70%. In various embodiments, the buffer factor is about 65%. In various embodiments, the buffer factor is about 60%. In various embodiments, the buffer factor is about 55%. In various embodiments, the buffer factor is about 50%. In various embodiments, the buffer factor is about 45%. In various embodiments, the buffer factor is about 40%. In various embodiments, the buffer factor is about 35%. In various embodiments, the buffer factor is about 30%. In various embodiments, the buffer factor is about 25%. In various embodiments, the buffer factor is about 20%. In various embodiments, the buffer factor is about 15%. In various embodiments, the buffer factor is about 10%. In various embodiments, the buffer factor is about 5%. In various embodiments, the buffer factor is about 1%. In various embodiments, the buffer factor is about 0.1%. In various embodiments, the buffer factor is about 0.1% to about 100%. In various embodiments, the buffer factor is about 0.1% to about 90%. In various embodiments, the buffer factor is about 0.1% to about 80%. In various embodiments, the buffer factor is about 0.1% to about 70%. In various embodiments, the buffer factor is about 0.1% to about 60%. In various embodiments, the buffer factor is about 0.1% to about 50%. In various embodiments, the buffer factor is about 0.1% to about 40%. In various embodiments, the buffer factor is about 0.1% to about 30%. In various embodiments, the buffer factor is about 0.1% to about 20%. In various embodiments, the buffer factor is about 0.1% to about 10%. In various embodiments, the buffer factor is about 0.1% to about 5%. In various embodiments, the buffer factor is about 1% to about 100%. In various embodiments, the buffer factor is about 1% to about 90%. In various embodiments, the buffer factor is about 1% to about 80%. In various embodiments, the buffer factor is about 1% to about 70%. In various embodiments, the buffer factor is about 1% to about 60%. In various embodiments, the buffer factor is about 1% to about 50%. In various embodiments, the buffer factor is about 1% to about 40%. In various embodiments, the buffer factor is about 1% to about 30%. In various embodiments, the buffer factor is about 1% to about 20%. In various embodiments, the buffer factor may be about 1% to about 10%. In various embodiments, the buffer factor is about 1% to about 5%. For example, if a maximum thickness (from the axial bounds) is determined to be 10 μm, the maximum length is 30 mm and the maximum width is 30 mm (from the lateral bounds), and a 10% buffer is added to each measurement, the imageable volume would be 11 μm×33 mm×33 mm. In various embodiments, a buffer factor applied to the thickness is larger than the buffer factor applied to the lateral bounds to ensure that all thickness of the tissue sample is imaged, as complete data in the z-direction (i.e., thickness) throughout the tissue sample may be more valuable than data in along the perimeter (e.g., at the peripheries) of the tissue sample.

In various embodiments, an imagable volume of the tissue sample is defined. In various embodiments, the optics module divides the imagable volume into a plurality of fields of view (FOVs) and images the sample volume by way of imaging a z-stack of images for each FOV. In various embodiments, the z-stack from each FOV represents (e.g., approximates) a volume (e.g., a sub-volume of the total volume) of the sample. In various embodiments, the imagable volume is defined based on the maximum length, maximum width, and maximum thickness determined via the methods described herein. In various embodiments, the imagable volume includes the buffer factor applied to the determined dimensions as described above.

In various embodiments, one or more FOV (e.g., all FOVs of the sample) is imaged using a first objective lens having first optical properties (e.g., a first magnification and/or a first numerical aperture). In various embodiments, one or more FOV (e.g., all FOVs of the sample) is subsequently imaged using a second objective lens having second optical properties (e.g., a second magnification and/or a second numerical aperture). In various embodiments, the second magnification is a higher magnification than the first magnification. In various embodiments, the first FOV is divided into a plurality of sub-FOVs and each sub-FOV is imaged using the second objective lens having the second optical properties (e.g., a higher magnification than the first objective lens). In various embodiments, measuring focus scores (and thus, thicknesses) at the sub-FOV level provides more accurate thickness measurements of the sample as more data points are obtained across the sample surface. In various embodiments, sub-FOVs are determined for two or more additional objective lenses (e.g., each additional objective lens having higher magnification than the previous) and each set of sub-FOVs is imaged using the appropriate objective lens. In various embodiments, subsequently higher magnifications may use more sub-FOVs to be defined within the first FOV). In various embodiments, sub-FOVs are imaged for each FOV using one, two, three, four, five, etc. additional objective lenses.

In various embodiments, once tissue bounds (e.g., lateral tissue bounds) are obtained for the sample, images are registered to one another across imaging cycles. In various embodiments, for cyclic biochemical imaging (e.g., in situ analysis) the same volume is imaged over and over again. In various embodiments, the tissue itself is used for image registration. In various embodiments, a reference imaging volume is determined. In various embodiments, to register an image in cyclical biochemical imaging, an image or set of images (e.g., a z-stack) is obtained and the image or set of images are registered to the reference volume to thereby determine physical offsets that register the cycles together. In various embodiments, image registration includes feature-based algorithms, such as scale-invariant feature transform (SIFT). In various embodiments, image registration includes an intensity-based algorithm, such as phase correlation.

Figure 3B:
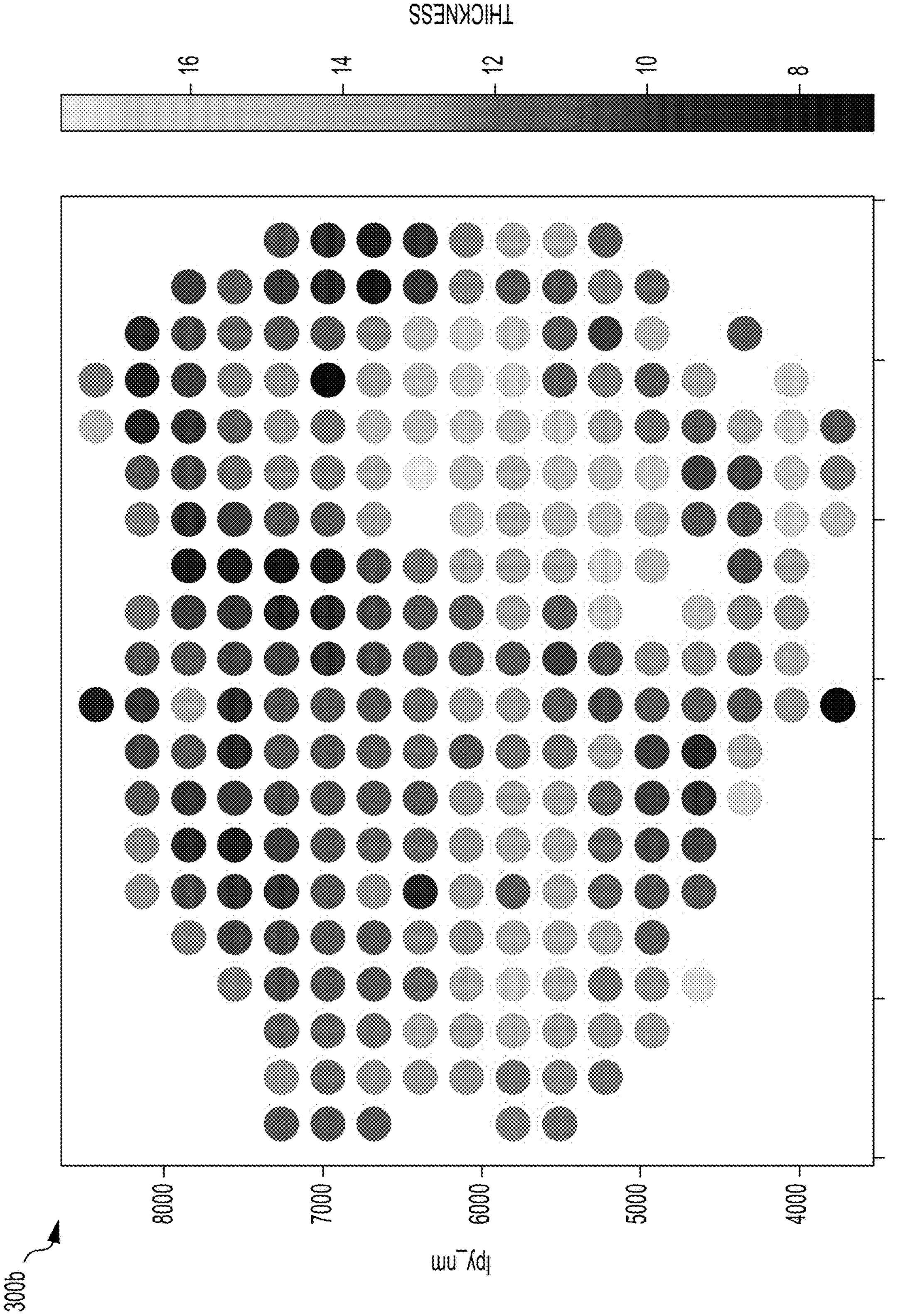
FIG. 3B illustrates estimated local thicknesses at a plurality of FOVs, according to some embodiments.

FIG. 3B illustrates a non-limiting example of a thickness plot 300*b* of the estimated local thicknesses at each of a plurality of FOVs illustrated in FIG. 3A. Each dot in thickness plot 300*b* is shaded based on the estimated thickness of the sample at each FOV, where each thickness is determined based on the focus scores of a z-stack of images obtained at that particular FOV location. In various embodiments, a focus score is determined for each image (i.e., z-slice) in a z-stack for each FOV. In various embodiments, the focus scores for a z-stack are associated with (e.g., plotted) against a height value of each slice away from a reference plane (e.g., the top surface of a substrate or an arbitrary focal plane within the sample volume), as will be explained in more detail below with respect to FIG. 4. In various embodiments, a threshold may be applied to the raw thickness data to thereby remove focus scores that represent minimal or zero thickness (the focus scores associated with minimal or zero thickness may still have a small, nontrivial focus score associated therewith). In various embodiments, the threshold removes thickness values below a predetermined value. In various embodiments, the threshold value may be less than about 1 μm, less than about 0.90 μm, less than about 0.80 μm, less than about 0.70 μm, less than about 0.60 μm, less than about 0.50 μm, less than about 0.40 μm, less than about 0.30 μm, less than about 0.20 μm, less than about 0.10 μm. In various embodiments, the threshold value may be about 0.10 μm, about 0.20 μm, about 0.30 μm, about 0.40 μm, about 0.50 μm, about 0.60 μm, about 0.70 μm, about 0.80 μm, about 0.90 μm, about 1.00 μm, about 1.10 μm, about 1.20 μm, about 1.30 μm, about 1.40 μm, about 1.50 μm, about 1.60 μm, about 1.70 μm, about 1.80 μm, about 1.90 μm, about 2.00 μm, about 2.50 μm, about 3.00 μm, about 3.50 μm, about 4.00 μm, about 4.50 μm, or about 5.00 μm.

In various embodiments, a filter may be applied to the raw thickness data. In various embodiments, the filter may be applied only within the lateral bounds of the tissue (e.g., because tissue thicknesses drop off significantly at the lateral bounds, but may be similar within the bounds). In various embodiments, the filter may be a smoothing filter configured to smooth out the variations in the thickness data. In various embodiments, the filter may be a high pass filter, a low pass filter, and/or a band pass filter. In various embodiments, the filter may be a rolling ball filter.

Figure 3C:
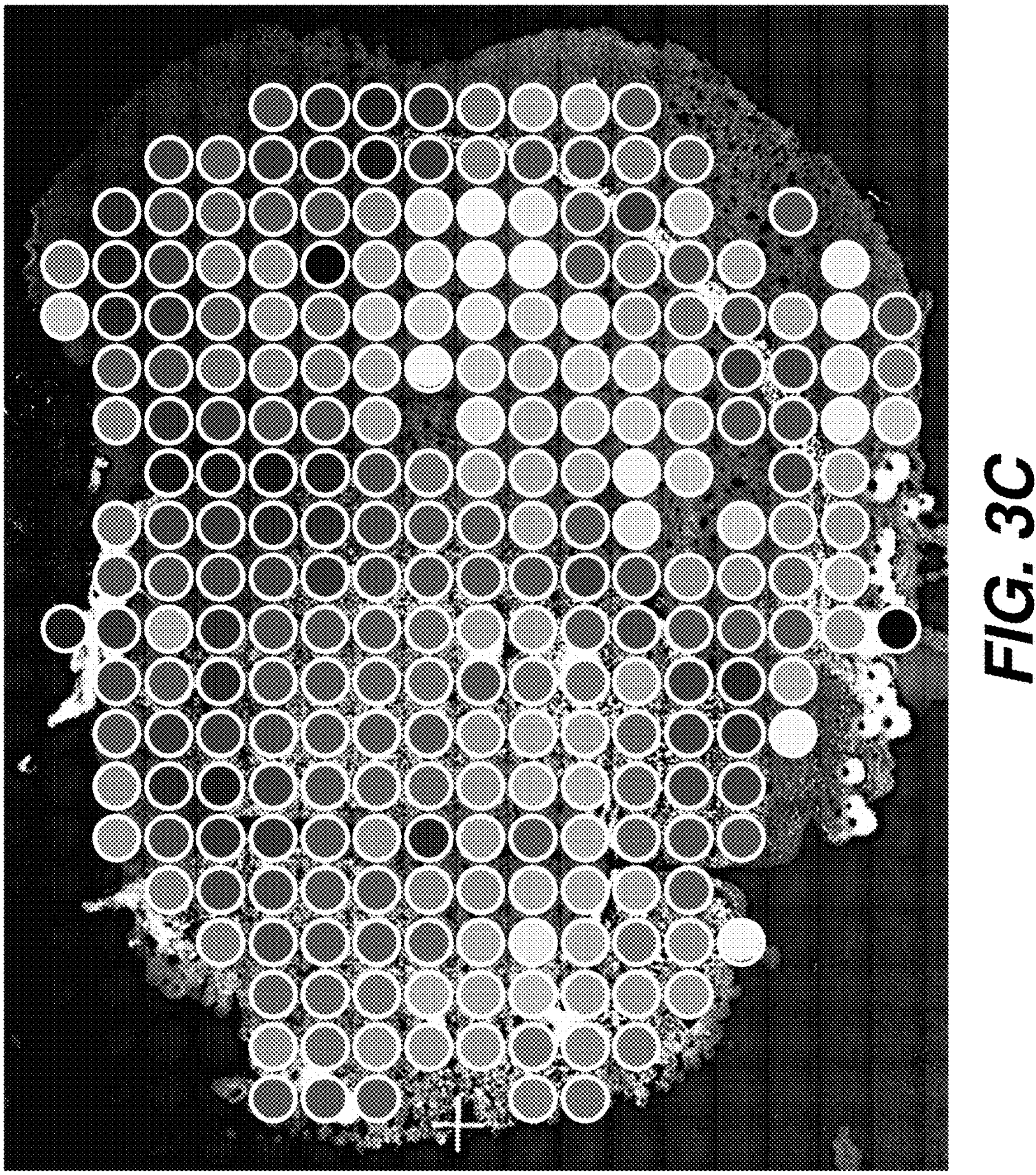
FIG. 3C illustrates an overlay of the local thicknesses on top of the dark field image of the tissue sample, according to some embodiments.

FIG. 3C illustrates an overlay 300*c* of the local thicknesses on top of the dark field image 300*a* of the tissue sample 302. In particular, FIG. 3C illustrates the thickness plot 300*b* of FIG. 3B overlaid on the image 300*a* of the tissue sample 302 such that each thickness measurement (i.e., shaded dot) corresponds to an FOV of the dark field image 300*a*.

Figure 3D:
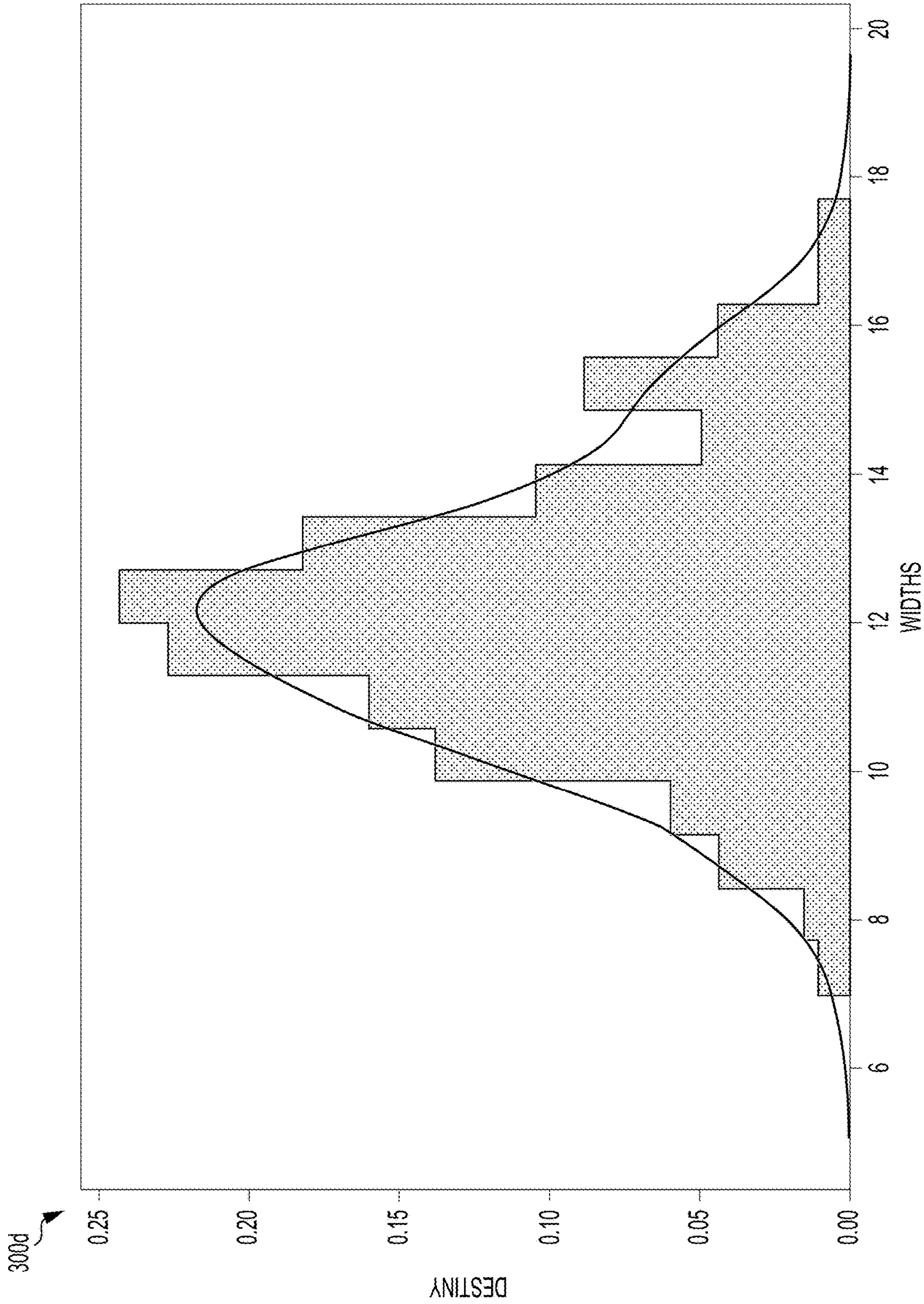
FIG. 3D illustrates a histogram of the local tissue thicknesses, according to some embodiments.

FIG. 3D illustrates a histogram 300*d* of the local tissue thicknesses from the plot shown in FIG. 3B. As shown in FIG. 3D, the nominal thickness is about 10 μm. In various embodiments, the nominal thickness is greater than about 10 μm. In various embodiments, the nominal thickness is less than about 15 μm. In various embodiments, the nominal thickness is less than about 20 μm. In various embodiments, the nominal thickness is less than about 30 μm. In various embodiments, the nominal thickness is less than about 40 μm. In various embodiments, the nominal thickness is less than about 50 μm. In various embodiments, the nominal thickness is about 5 μm to about 20 μm. In various embodiments, the nominal thickness is about 10 μm to about 20 μm. In various embodiments, the nominal thickness is about 10 μm to about 15 μm.

Figure 4:
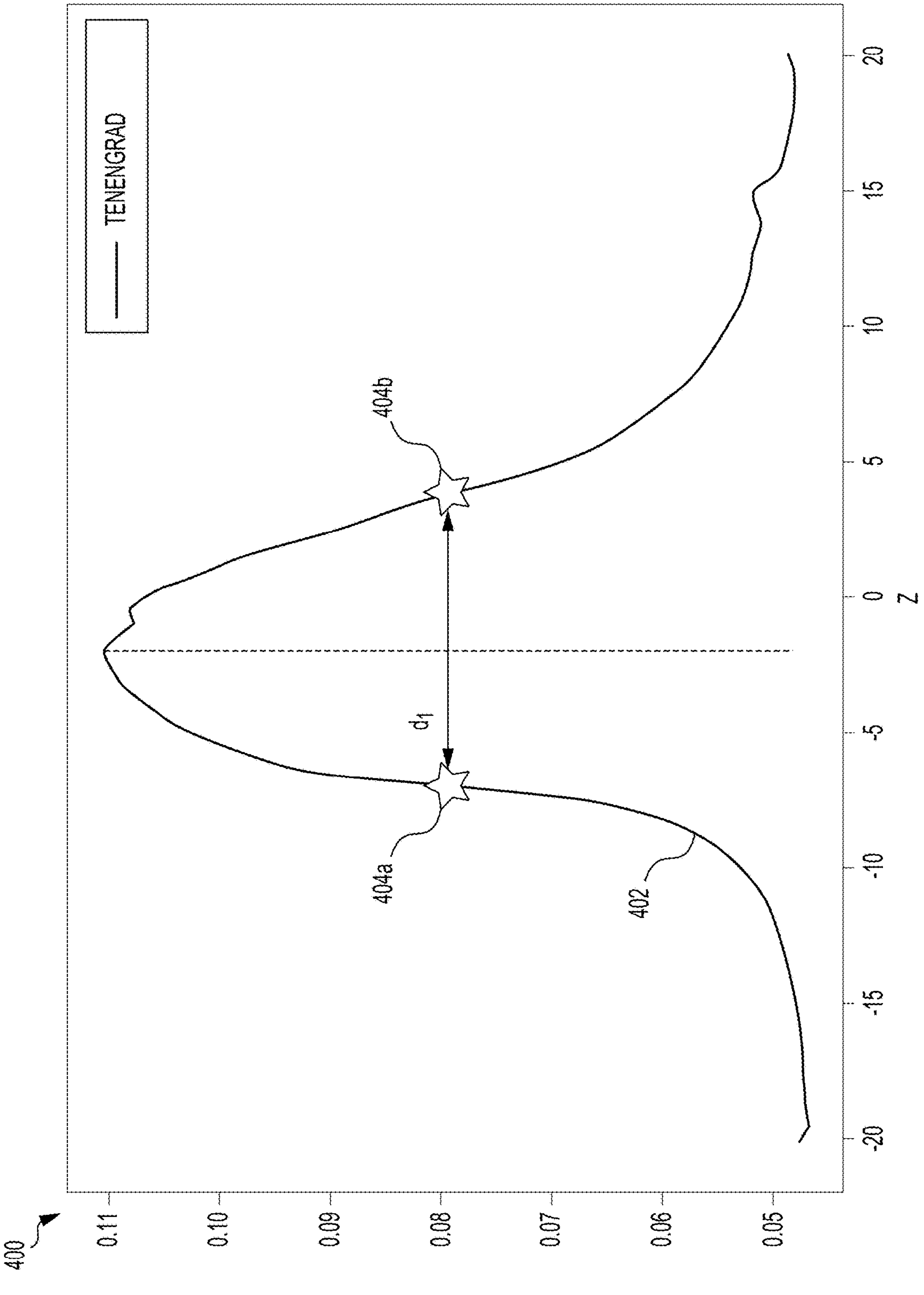
FIG. 4 illustrates a graph of focus scores obtained from a plurality of slices in a single z-stack of images, according to some embodiments.

FIG. 4 illustrates a graph of focus scores 400 obtained from a plurality of slices in a single z-stack of images. In various embodiments, because a focused image has high contents of higher frequencies, the focus score may be based on a measure of high frequencies (e.g., edges) within the image. As shown in FIG. 4, a Tenenbaum Gradient (Tenengrad) focus measure is determined at each of a plurality of images (e.g., image slices) within a z-stack. The Tenengrad is a convolution of an image with vertical (Sx) and horizontal (Sy) Sobel operators. In various embodiments, the Tenengrad sums the square of all the magnitudes greater than a predetermined threshold. In various embodiments, all pixels are included in the summation. To determine a global measure over the whole image, the square of the gradient vector components are summed, as follows:

$$F_{Tenengrad} = \sum\sum S_x(x, y)^2 + S_y(x, y)^2 \quad (1)$$

In various embodiments, a normalization factor is applied to the pixel values while determining the Tenengrad. In various embodiments, the normalization factor includes dividing each pixel value by a square root of the sum of the squared pixel values. In various embodiments, the normalization factor includes an intensity of the pixels (e.g., mean intensity, standard deviation, maximum intensity, minimum intensity, etc.) In various embodiments, a curve 402 may be interpolated from discrete Tenengrad focus scores determined for each image in the z-stack. In various embodiments, a same method of determining focus scores is used for each FOV. For example, a Tenengrad focus score may be determined for each image within the z-stacks across all FOVs. As shown in FIG. 4, a distance, di, may be determined between two sides of the resulting curve interpolated from the discrete focus scores. In various embodiments, the distance, di, is determined between a first inflection point 404*a* (i.e., where the second derivative changes sign) and a second inflection point 404*b* (i.e., where the second derivative changes sign) of the resulting focus score (e.g., Tenengrad) curve. In various embodiments, the distance, di, is determined between any two suitable points of the curve 402. For example, the distance, di, can be determined at a specific point on the graph where the first derivative is a predetermined value. In another example, the distance, di, can be determined at a specific point on the graph where the second derivative is a predetermined value.

In various embodiments, an entropy-based focus score may be determined for one or more (e.g., all) images within the z-stacks.

$$F_{Entropy} = -\sum\nolimits_{intensities} p(i)\log p(i) \tag{2}$$

In various embodiments, a Sum of Modified Laplace (SML) focus score may be determined for one or more (e.g., all) images within the z-stacks. An example of a SML is as follows:

$$F_{SML} = \sum\sum |L_x(x, y)| + |L_y(x, y)| \tag{3}$$

In various embodiments, a focus score is based on the contrast of a image as the absolute difference of a pixel with its eight neighbors, summed over all the pixels of the image.

$$F_{contrast} = \sum\sum C(x, y) \tag{4.1}$$

where the contrast C(x,y) for each pixel in the gray image I(x,y) is determined as:

$$C(x, y) = \sum\nolimits_{i=x-1}^{x+1}\sum\nolimits_{j=y-1}^{y+1} |I(x, y) - I(i, j)| \tag{4.2}$$

In various embodiments, a focus score is based on the coefficients of the discrete cosine transform obtained after dividing the image into 8×8 non overlapped windows and then averaging over all the 8×8 windows.

$$F_{M_e} = \frac{\sum M'_{B_e}}{num.of\,8\times 8\ \text{windows}} \tag{5.1}$$

where $$M'_{B_e}$$

is determined from the DCT coefficients F(ω, ν) as:

$$M'_{B_e} = 1 - \frac{\sum |F(\omega, \nu)|^2}{\left(\sum F(\omega, \nu)\right)^2} \tag{5.2}$$

Figure 5A:
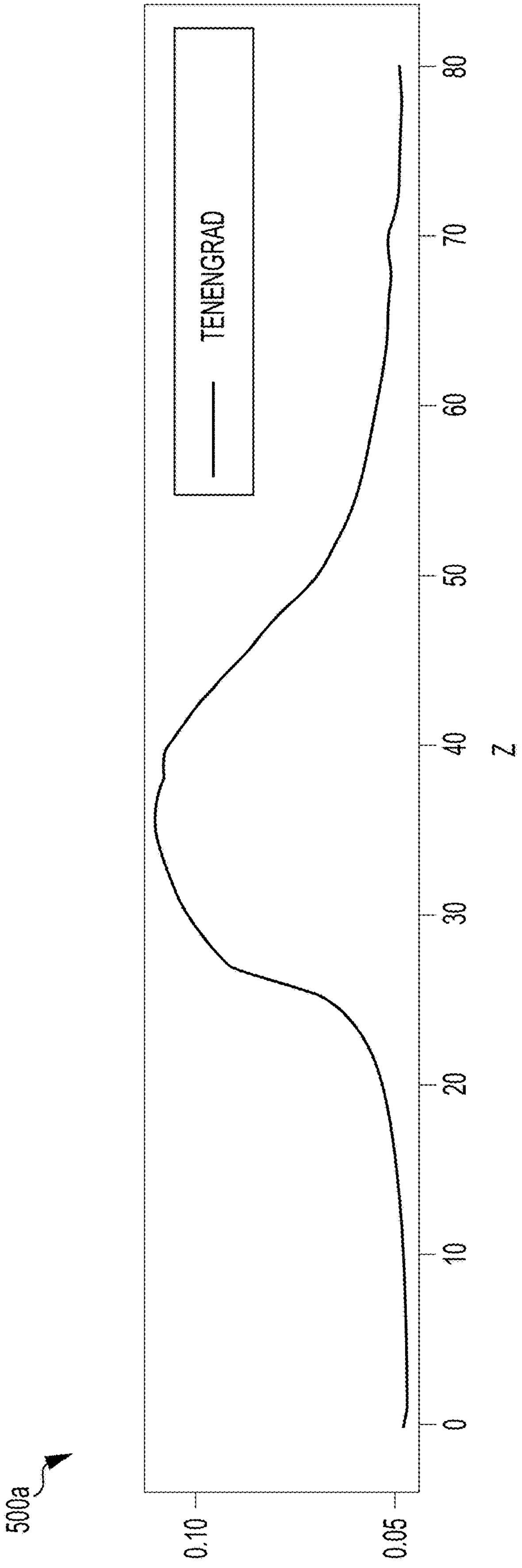
FIGS. 5A-5H illustrate graphs of focus scores determined using various methods, according to some embodiments.
Figure 5B:
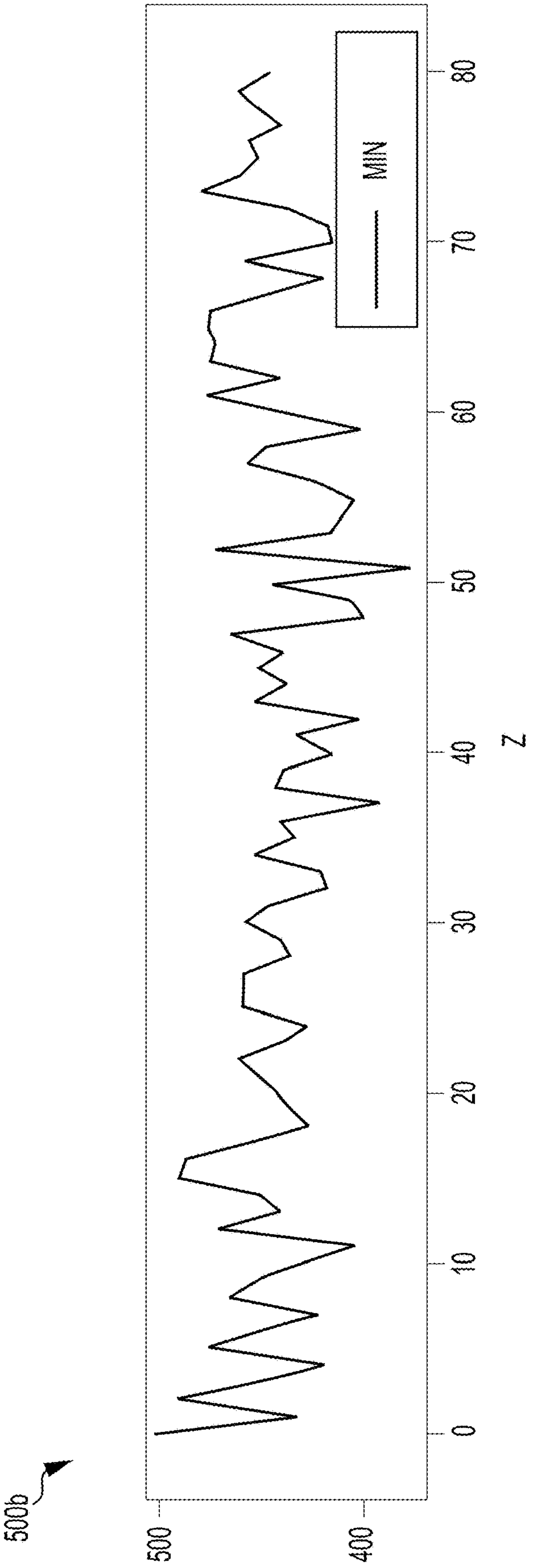
Figure 5C:
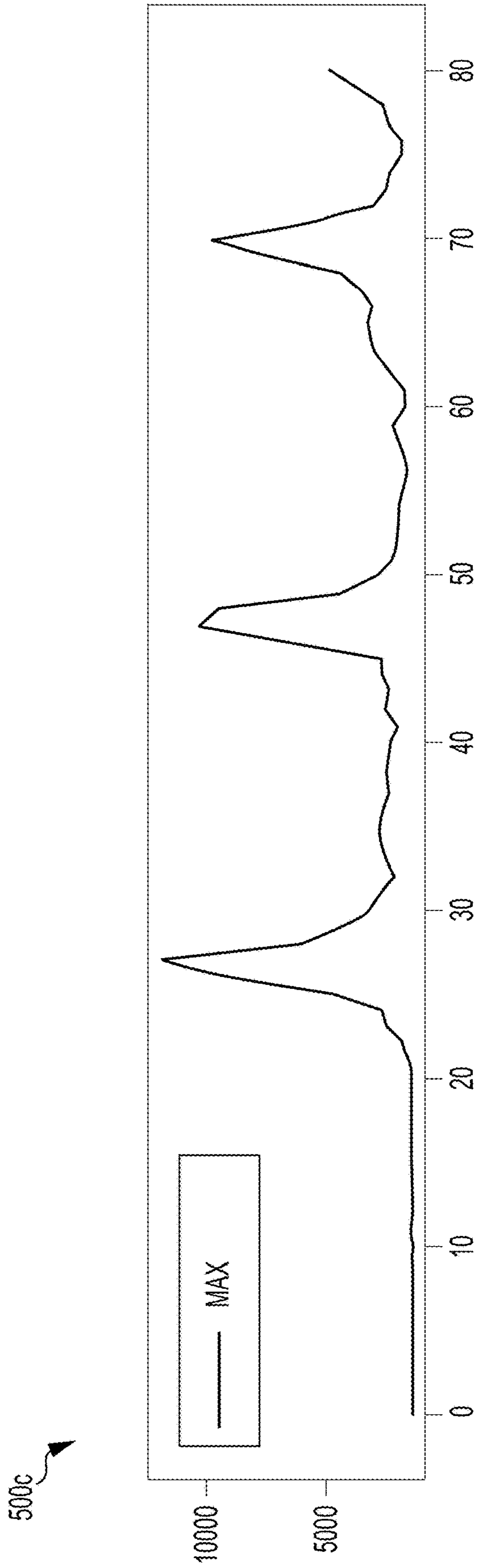
Figure 5D:
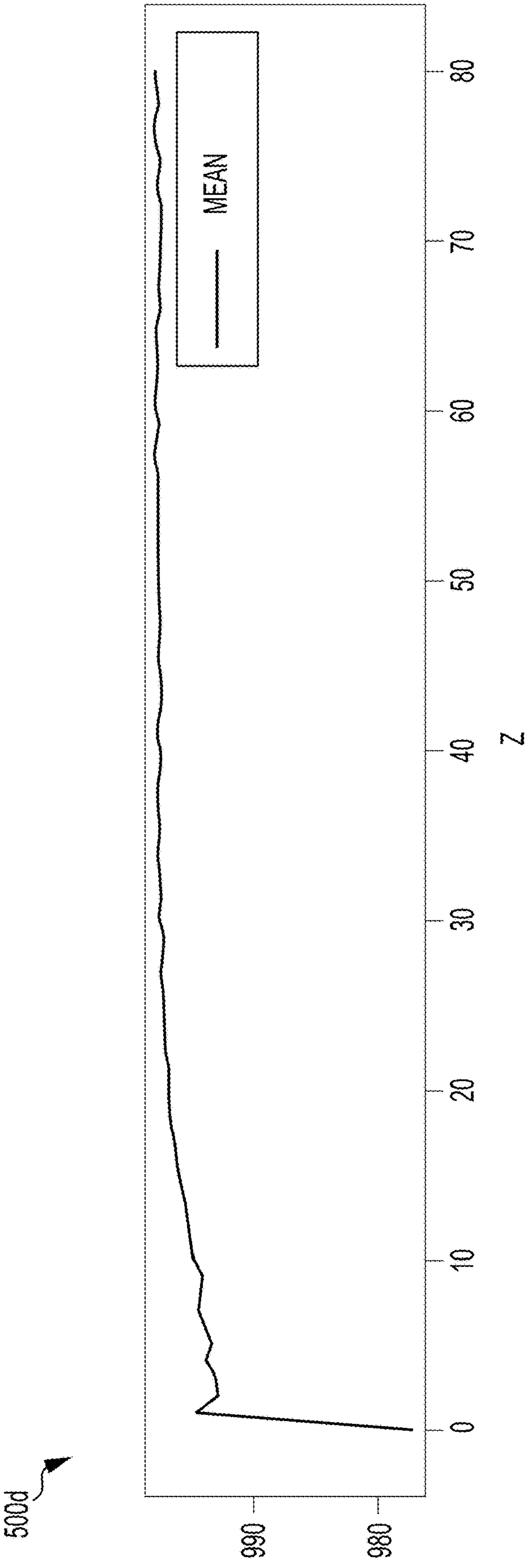
Figure 5E:
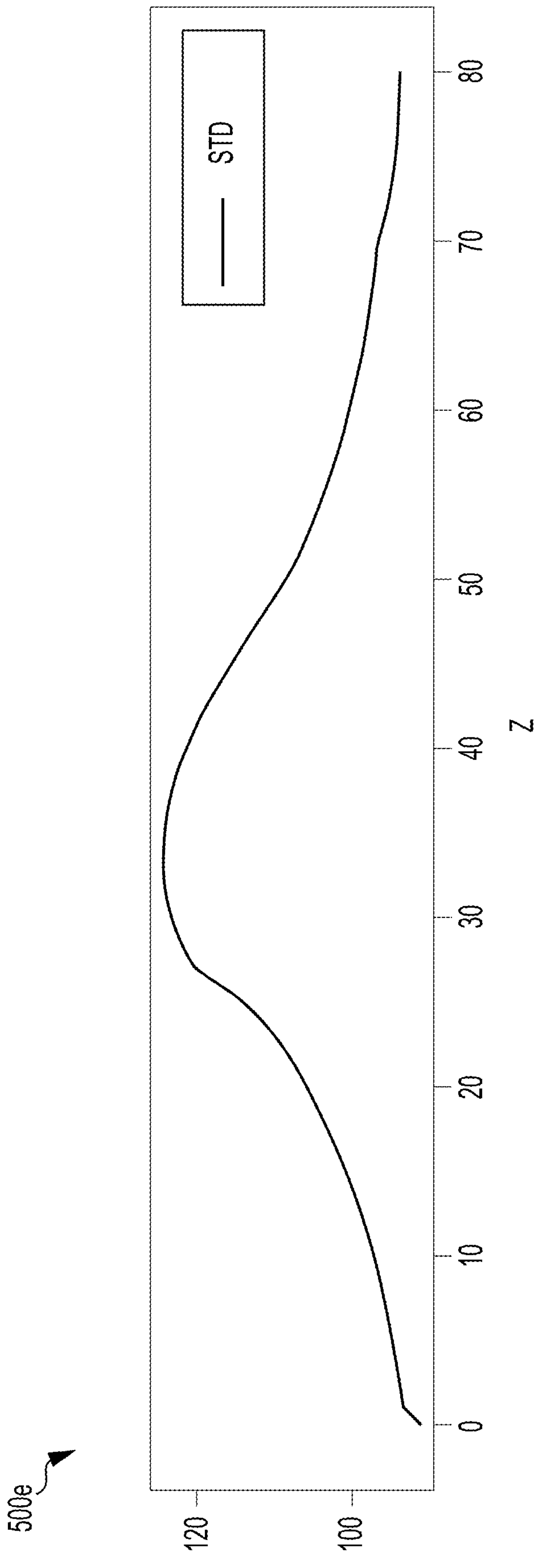
Figure 5F:
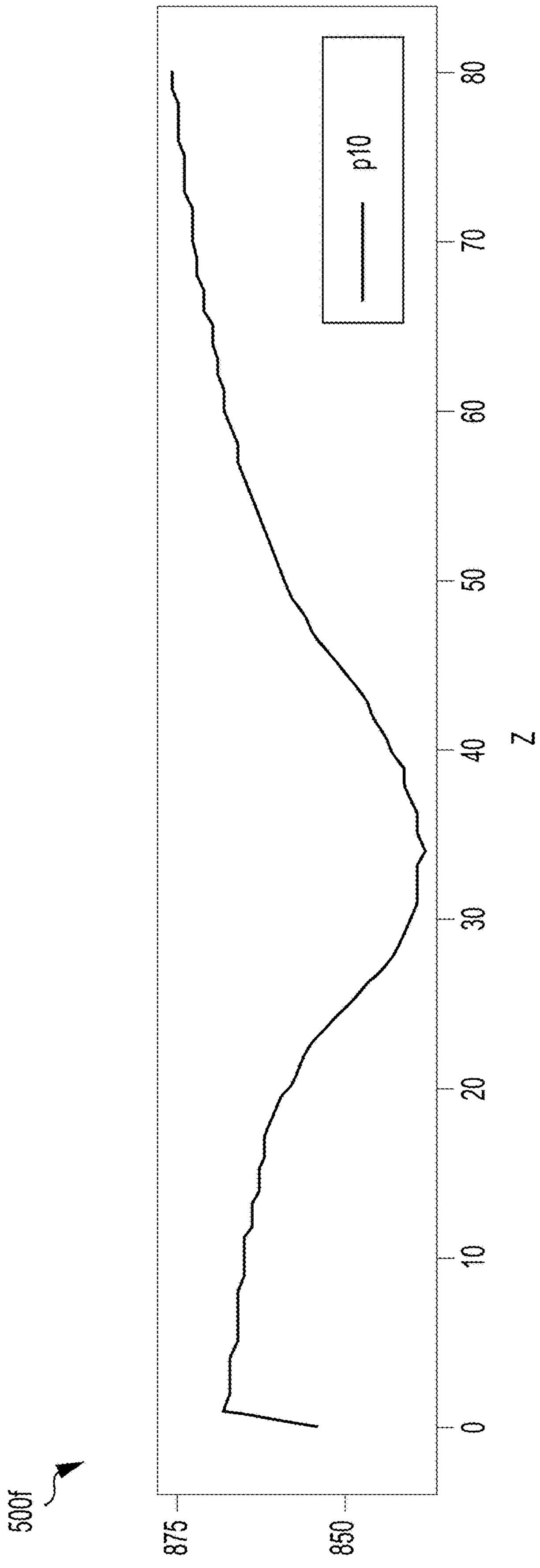
Figure 5G:
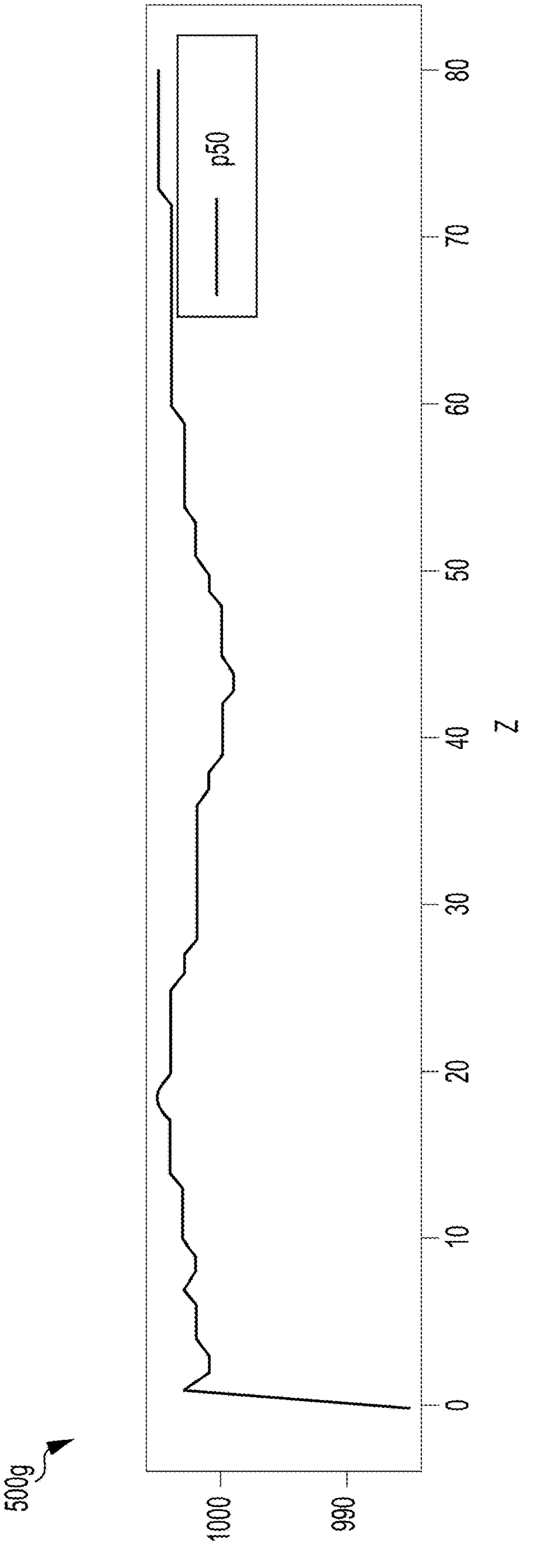
Figure 5H:
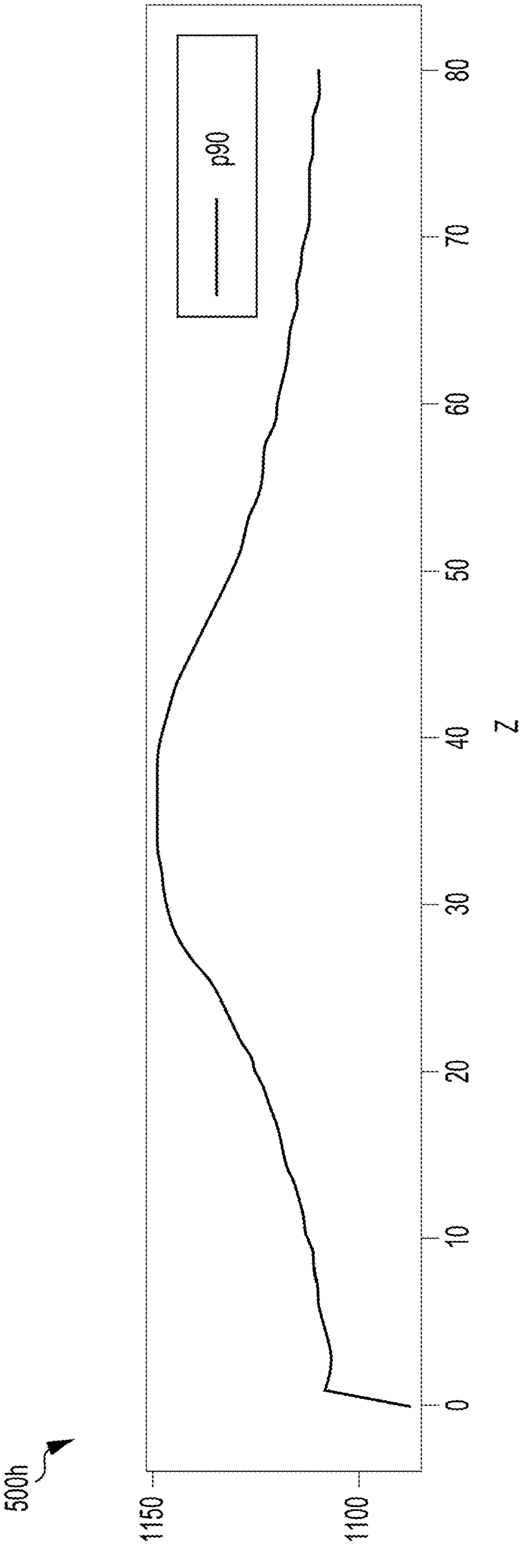

FIGS. 5A-5H illustrate graphs 500*a*, 500*b*, 500*c*, 500*d*, 500*e*, 500*f*, 500*g*, 500*h* of focus scores determined using various methods. As shown in FIG. 5A, a Tenengrad may be determined for one or more (e.g., all) images in a z-stack representing a volume at a particular FOV. As shown in FIG. 5B, a minimum pixel value (e.g., intensity value) may be determined for one or more (e.g., all) images in a z-stack representing a volume at a particular FOV. As shown in FIG. 5C, a maximum pixel value may be determined for one or more (e.g., all) images in a z-stack representing a volume at a particular FOV. As shown in FIG. 5D, a mean pixel value may be determined for one or more (e.g., all) images in a z-stack representing a volume at a particular FOV. As shown in FIG. 5E, a standard deviation of pixel values may be determined for one or more (e.g., all) images in a z-stack representing a volume at a particular FOV. As shown in FIG. 5F, a 10th percentile (p10) of pixel values may be determined for one or more (e.g., all) images in a z-stack representing a volume at a particular FOV. As shown in FIG. 5G, a 50th percentile (p50) of pixel values may be determined for one or more (e.g., all) images in a z-stack representing a volume at a particular FOV. As shown in FIG. 5H, a 90th percentile of pixel values (p90) may be determined for one or more (e.g., all) images in a z-stack representing a volume at a particular FOV.

Figure 6A:
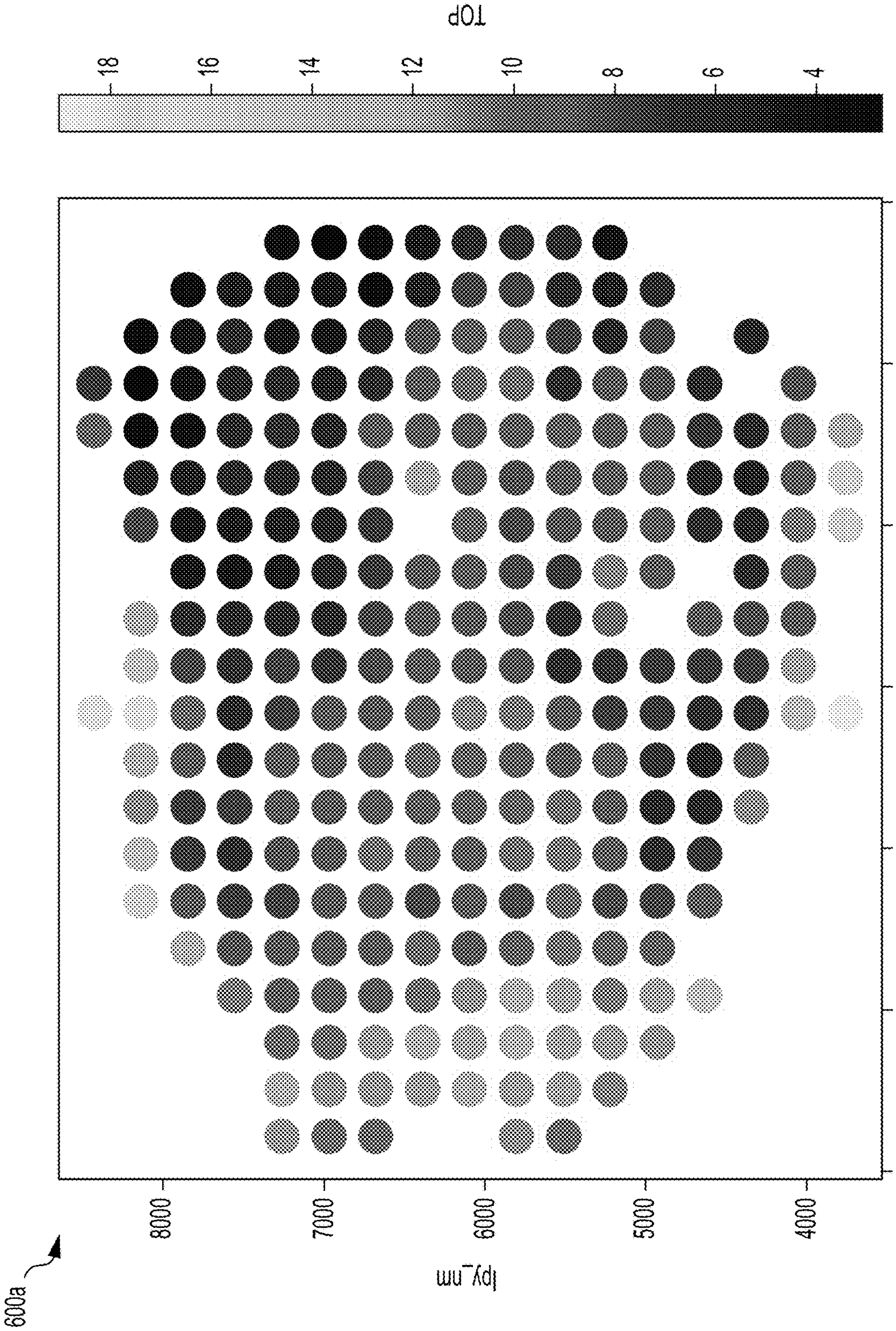
FIG. 6A illustrates estimates of local heights at a plurality of FOVs at the top of the tissue sample, according to some embodiments.

FIG. 6A is a plot that illustrates estimates of local heights at a plurality of FOVs at the top of the tissue sample 600*a*. In one non-limiting example, the z-heights in represents as shaded dots in the plot shown 600*a* in FIG. 6A correspond to the right-side inflection point 404*b* in the Tenengrad plot of FIG. 4.

Figure 6B:
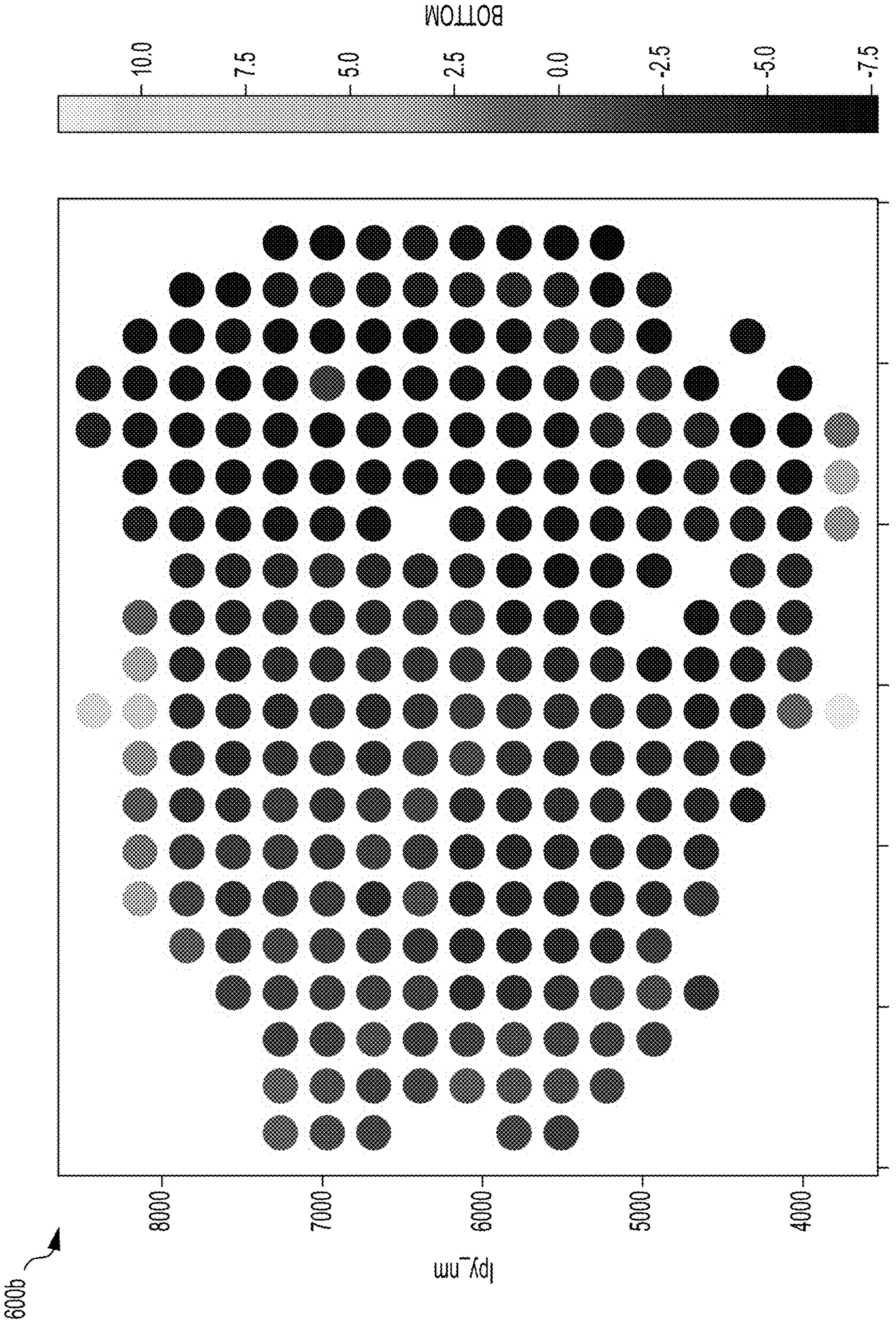
FIG. 6B illustrates estimates of local heights at a plurality of FOVs at the bottom of the tissue sample, according to some embodiments.

FIG. 6B illustrates estimates of local heights at a plurality of FOVs at the bottom of the tissue sample 600*b*. In one non-limiting example, the z-heights represents as shaded dots in the plot shown 600*b* in FIG. 6B correspond to the left-side inflection point 404*a* in the Tenengrad plot of FIG. 4.

Figure 6C:
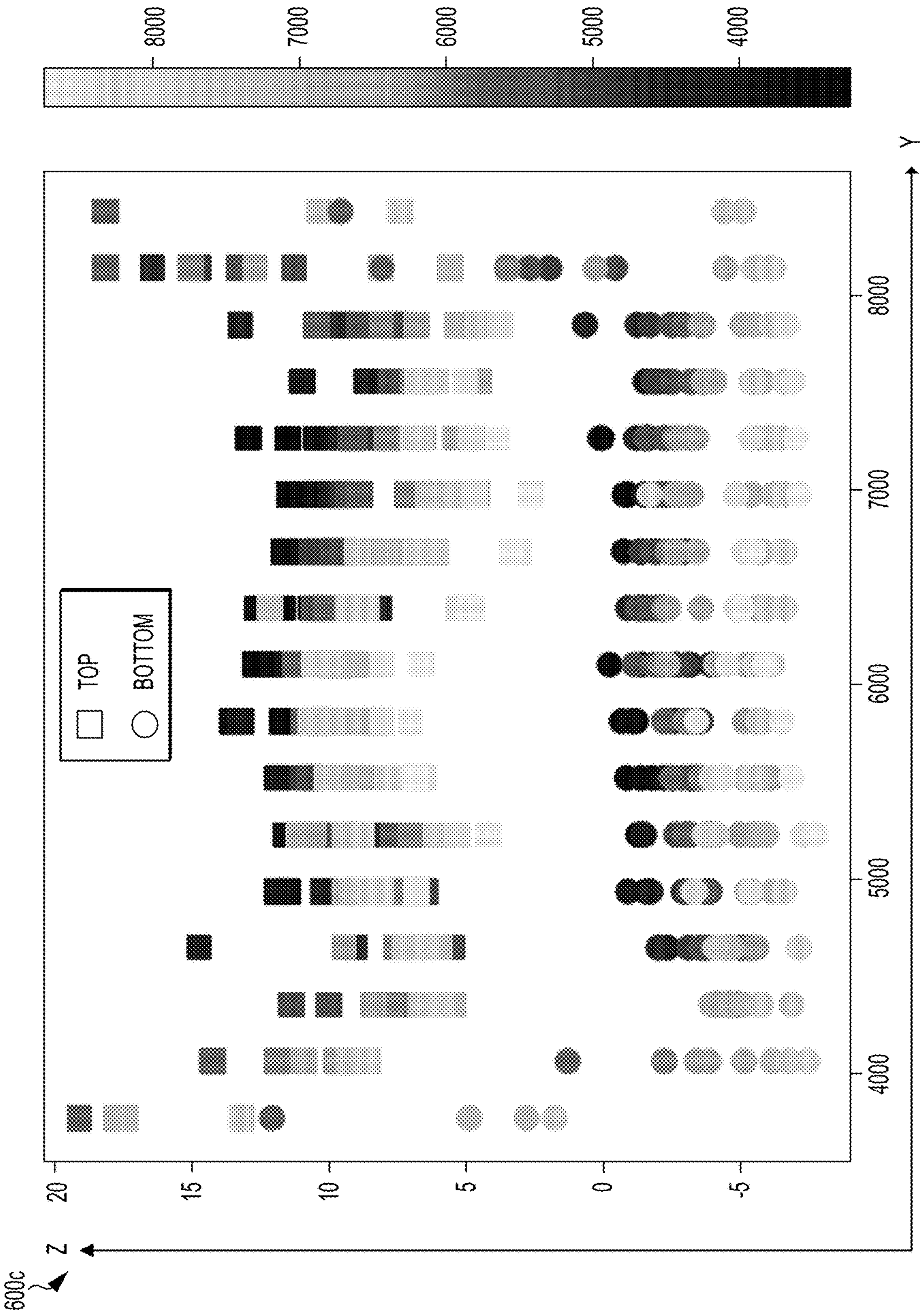
FIG. 6C illustrates estimates of thicknesses of the top and bottom surfaces along a YZ plane of the tissue sample, according to some embodiments.

FIG. 6C illustrates estimates of thicknesses of the top and bottom surfaces along a YZ plane of the tissue sample 600*c*. In one non-limiting example, FIG. 6C plots the top surface heights and the bottom surface heights of all FOVs 600*c* (looking at the tissue sample from the YZ plane). As can be seen from FIG. 6C, the tissue sample is substantially flat on the bottom and has some variation in height on the top surface.

Figure 6D:
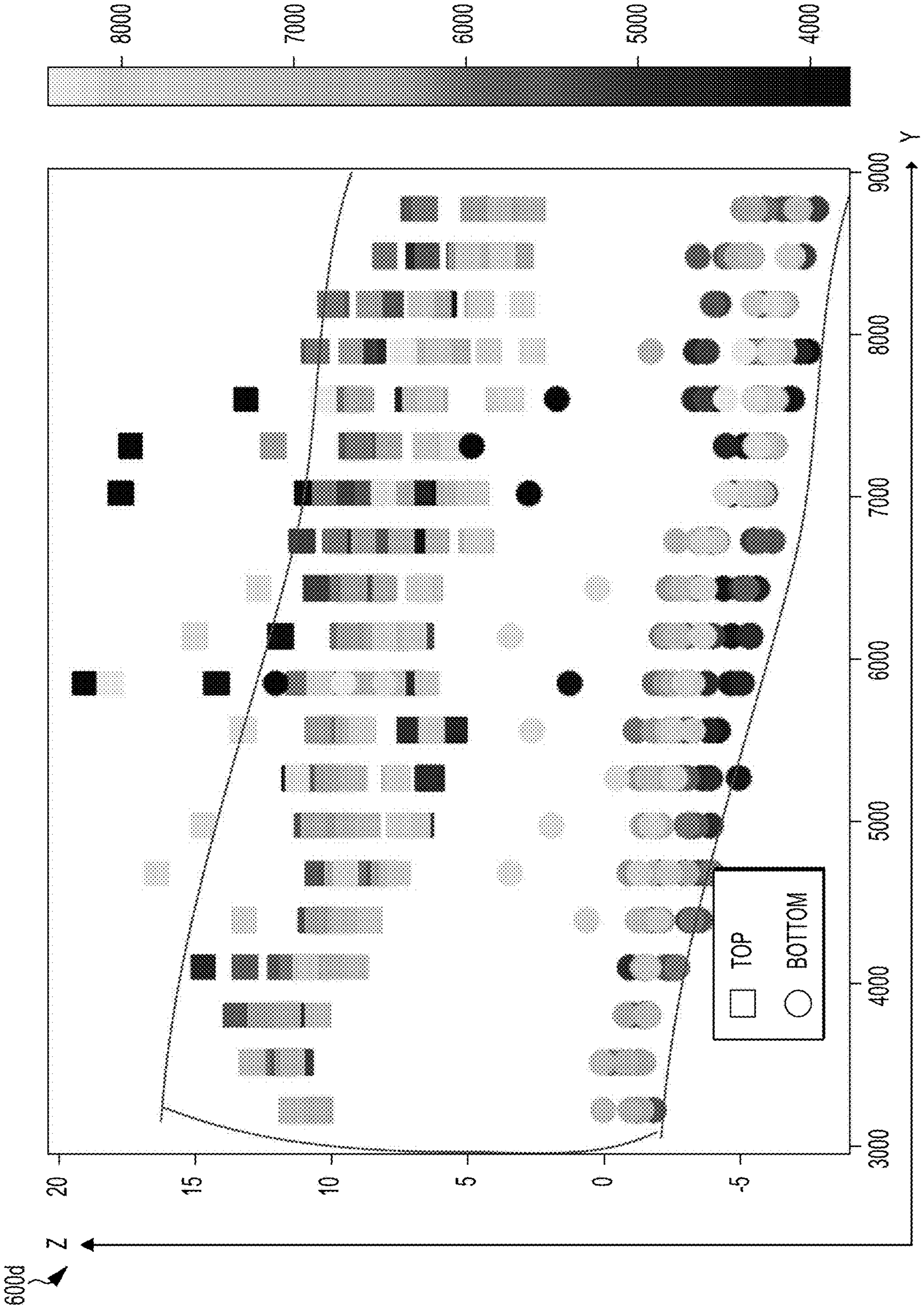
FIG. 6D illustrates estimates of thicknesses of the top and bottom surfaces along a XZ plane of the tissue sample, according to some embodiments.

FIG. 6D illustrates estimates of thicknesses of the top and bottom surfaces along a XZ plane of the tissue sample 600*d*. In one non-limiting example, FIG. 6D plots the top surface heights and the bottom surface heights of all FOVs 600*d* (looking at the tissue sample from the XZ plane). As can be seen from FIG. 6D, the tissue sample is substantially angled on the bottom and top surfaces, which may suggest that the sample slide is tilted about the Y axis.

Figure 7:
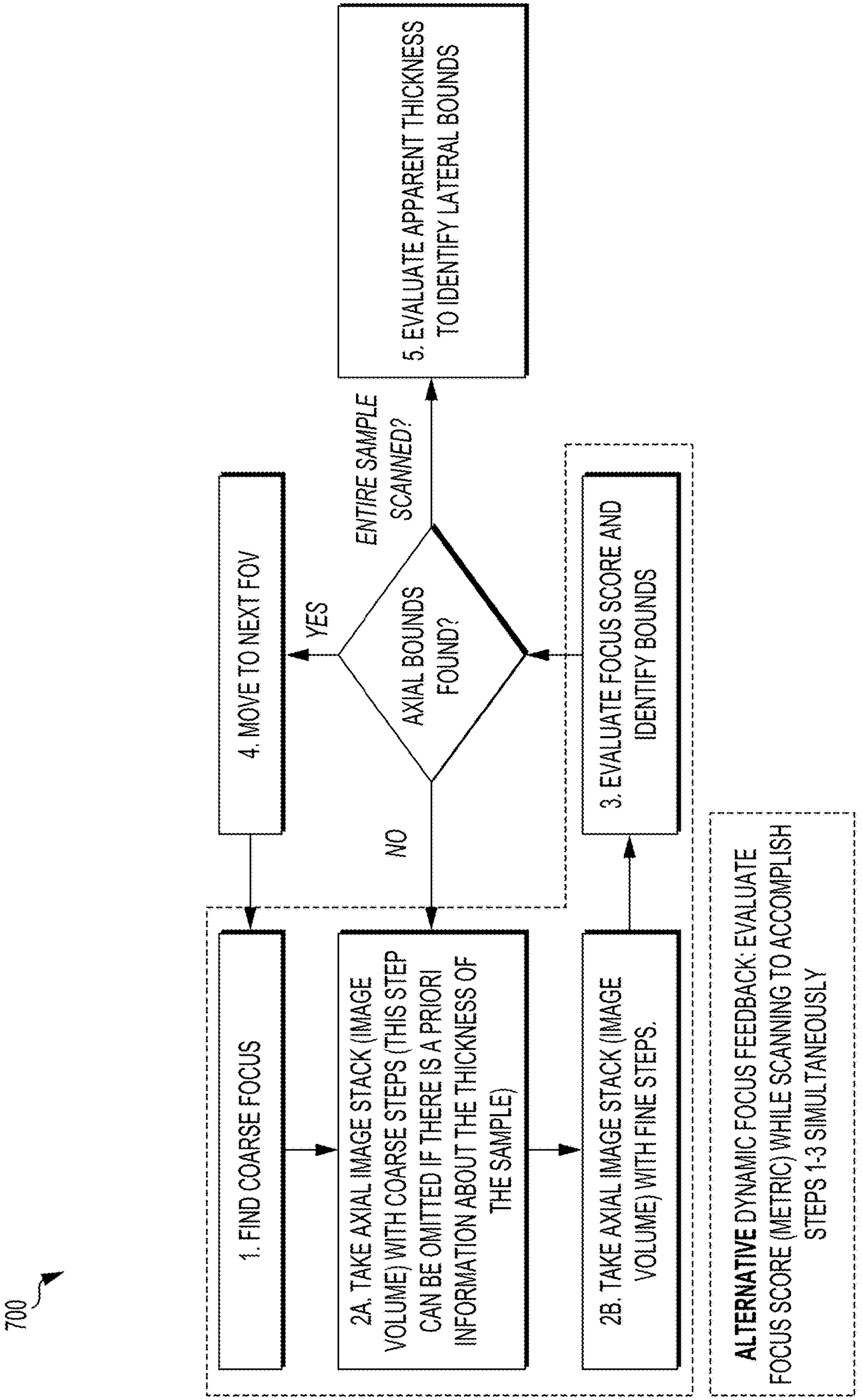
FIG. 7 illustrates a flow chart of a method for tissue bounds detection based on inherent contrast, according to some embodiments.

FIG. 7 illustrates a flow chart of an example method 700 for tissue bounds detection based on inherent contrast, according to non-limiting embodiments of the present disclosure. Aspects of the method 700 can be executed by a server, a computing system, a computing device, and/or other suitable means for performing the steps. For example, the method 700 may be performed by computing system/server 12 of FIG. 16, as will be described further below. As illustrated, the method 700 includes a number of enumerated steps, but aspects of the method 700 may include additional steps before, after, and in between the enumerated steps. In some embodiments, one or more of the enumerated steps may be omitted or performed in a different order. At step 1, a coarse focus may be determined at an FOV with an objective lens. At step 2*a*, an axial image z-stack may be obtained (representing an estimated image volume) at the FOV with coarse steps to obtain a rough estimate of sample thickness. At step 2*b*, an axial image z-stack may be obtained (representing an estimated image volume) at the FOV with fine steps to obtain a more-accurate estimate of sample thickness. At step 3, focus scores may be determined for each image in each z-stack and an axial tissue bound (i.e., thickness) is determined for the FOV. If axial bounds are not determined, the process for method 700 may return to step 2*a*. If axial bounds are able to be determined (e.g., within a predetermined confidence metric), the process for method 700 may proceed to step 4. At step 4, the objective may be moved to the next FOV. At step 5, when the entire sample has been scanned, lateral bounds may be determined based on the determined thicknesses at each FOV.

Figure 8:
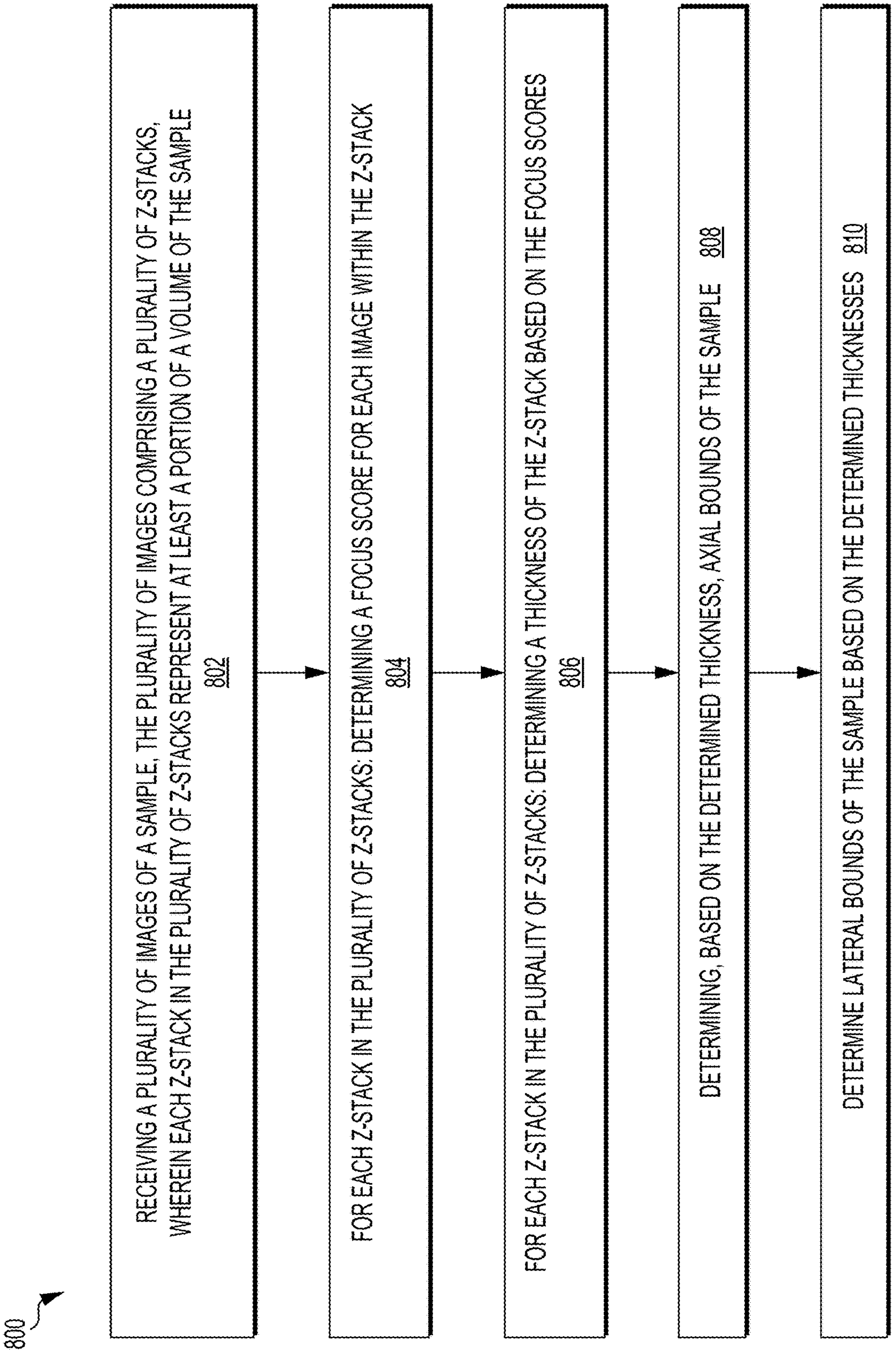
FIG. 8 illustrates a flow chart of a method for determining axial bounds of a tissue sample based on inherent contrast, according to some embodiments.

FIG. 8 illustrates a flow chart of an example method 800 for determining axial bounds of a tissue sample, according to non-limiting embodiments of the present disclosure. Aspects of the method 800 can be executed by a server, a computing system, a computing device, and/or other suitable means for performing the steps. For example, the method 800 may be performed by computing system/server 12 of FIG. 16, as will be described further below. As illustrated, the method 800 includes a number of enumerated steps, but aspects of the method 800 may include additional steps before, after, and in between the enumerated steps. In some embodiments, one or more of the enumerated steps may be omitted or performed in a different order. In various embodiments, the axial and/or lateral bounds of the tissue sample may be determined based on inherent contrast from at least one imaging modality, for example, dark field imaging.

At step 802, a plurality of images of a sample may be received. For example, the plurality of images may be received from an optics module comprising a camera and an object. In some embodiments, the plurality of images may be received from a database (e.g., a remote database or a local database). In at least one embodiment, the plurality of images comprises dark field images of the sample. In some embodiments, the plurality of images comprises fluorescent images of the sample. For example, the fluorescent images may comprise DAPI images. Also or alternatively, the plurality of images comprises transilluminated images of the sample. Furthermore, the sample may comprise a tissue sample. In some aspects, the sample may be translucent. The plurality of images includes a plurality of z-stacks and each z-stack in the plurality of z-stacks represents at least a portion of a volume of the sample. The plurality of z-stacks may represent a plurality of fields of view taken of the sample.

At step 804, for each z-stack in the plurality of z-stacks, a focus score may be determined for each image within the z-stack. In some embodiments, determining a focus score comprises determining a Tenengrad of each image in the z-stack. For example, the determined focus scores for each z-stack in the plurality of z-stacks may represent a curve.

At step 806, for each z-stack in the plurality of z-stacks, a thickness of the z-stack may be determined based on the focus scores. In some embodiments, determining the thickness of the z-stack comprises measuring a width of the curve. For example, measuring the width comprises may comprise measuring from a first inflection point to a second inflection point that is adjacent to the first inflection point. In some embodiments, a maximum thickness of the sample may be determined based on the determined thicknesses. Moreover, the imagable volume may be based on the maximum thickness. For example, the imageable volume may be based on about 100% to about 120% of the maximum thickness. In some embodiments, a filter can be applied to the determined thickness. For example, the filter may include but is not limited to one or more of a smoothing filter, a low pass filter, or a rolling ball filter.

At step 808, axial bounds of the sample may be determined based on the determined thicknesses. In some embodiments, a volume may be imaged based on the determined axial bounds of the sample. In various embodiments, the sample is illuminated with one or more wavelengths of light and sample fluorescence is imaged to determine focus scores. In various embodiments, autofluorescence of the sample is imaged to determine focus scores. In various embodiments, the sample is treated with an added contrast (e.g., DAPI) and imaged (e.g., fluorescence from the contrast is imaged) to determine focus scores. In various embodiments, the sample can be treated with a DAPI stain and is fluorescently imaged with near ultraviolet light to determine focus scores. In various embodiments, the sample can be transilluminated (e.g., via edge lighting) to determine focus scores. In various embodiments, the transillumination can be provided as one or more colors of light (e.g., red, green, yellow, blue, ultraviolet, etc.).

At step 810, lateral bounds of the sample may be determined based on the determined thicknesses. For example, lateral bounds can be determined where the sample thicknesses are substantially zero or below a predetermined threshold (e.g., below 1 micron). In some embodiments, determining the lateral bounds comprises thresholding the determined thicknesses.

Figure 9:
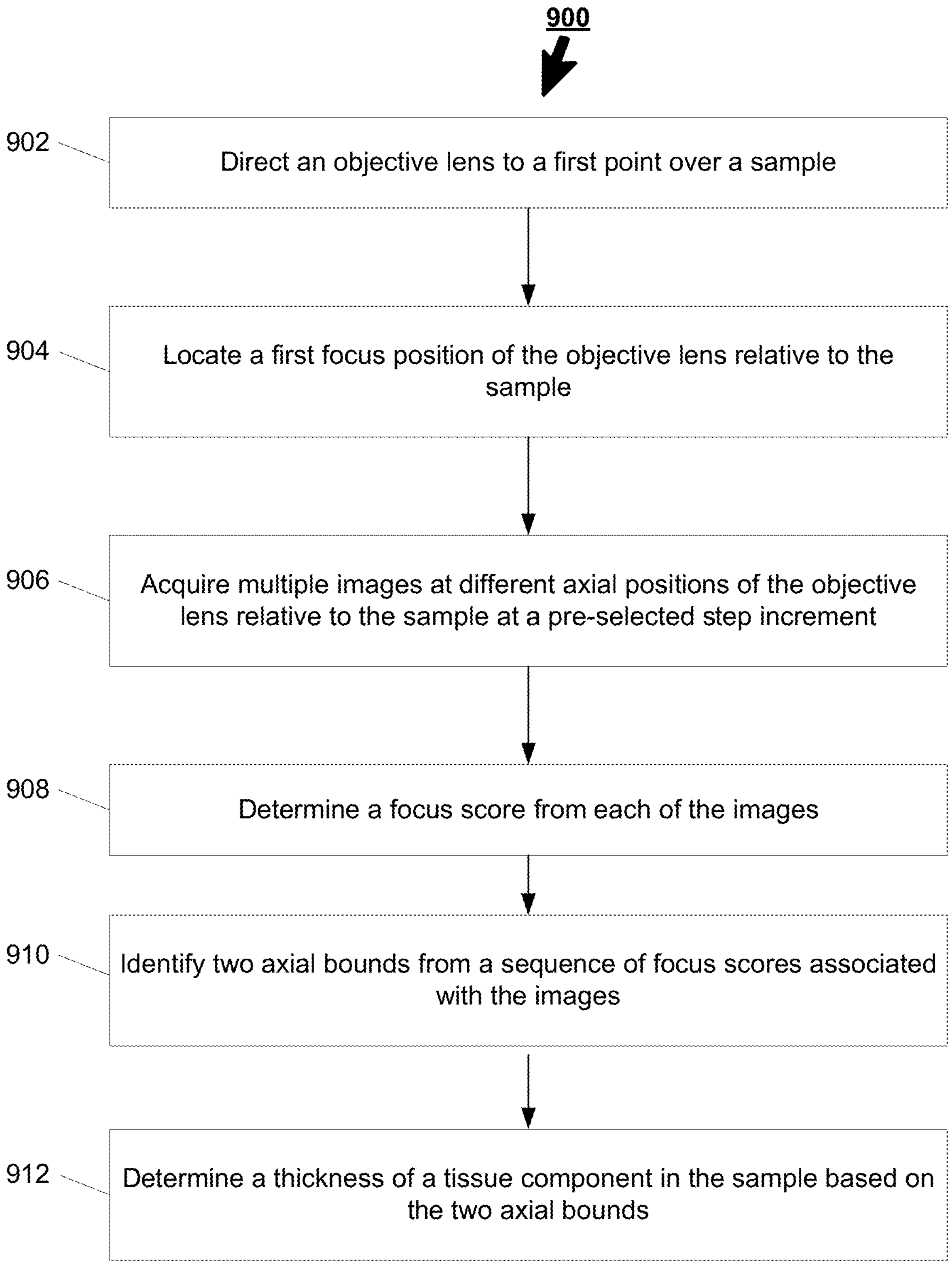
FIG. 9 illustrates a flow chart of an example method for determining a thickness of a tissue sample, according to some embodiments.

FIG. 9 illustrates a flow chart of a method 900 for determining a thickness of a tissue sample, according to non-limiting embodiments of the present disclosure. Aspects of the method 900 can be executed by a server, a computing system, a computing device, and/or other suitable means for performing the steps. For example, the method 900 may be performed by computing system/server 12 of FIG. 16, as will be described further below. As illustrated, the method 900 includes a number of enumerated steps, but aspects of the method 900 may include additional steps before, after, and in between the enumerated steps. In some embodiments, one or more of the enumerated steps may be omitted or performed in a different order.

Step 902 may include directing an objective lens to a first point over a sample. In some embodiments, the objective lens may be configured to collect the image from the sample. A sample stage may be configured to hold the sample. The sample stage may include a motion actuator configured to adjust a distance separating the objective lens from the sample along an optical axis of the objective lens, and to scan the sample in a plane substantially perpendicular to the optical axis of the objective lens.

Step 904 may include locating (e.g., finding) a first focus position of the objective lens relative to the sample.

Step 906 may include acquiring multiple images at different axial positions of the objective lens relative to the sample at a pre-selected step increment. For example, a processor of a computing system performing method 900 may cause a sample stage configured to hold the sample to cause the sample stage to move to multiple positions along the optical axis of the objective lens at the first focus position on the sample. The processor may further cause a sensor array to collect a two-dimensional image at each of the positions along the optical axis of the objective lens. The sensor array may be disposed on an image plane of the objective lens.

Step 908 may include determining a focus score from each of the images. In some embodiments, determining the focus score for each of the images comprises selecting, from multiple focus scores indicative of a difference in pixel counts between adjacent axial positions, that which provides a larger signal-to-noise ratio. Also or alternatively, determining the focus score for each of the images comprises assigning a gradient score to each of the images based on an amplitude of a gradient field associated with a two-dimensional image. Also or alternatively, determining the focus score for each of the images comprises convolving each of the images in two dimensions with a Laplacian matrix to obtain an energy value associated to the focus score. Also or alternatively, determining the focus score for each of the images comprises applying a two-dimensional wavelet filter to each of the images to obtain a wavelet amplitude associated to the focus score. In some embodiments, an illumination power can be adjusted based on a numerical aperture of the objective lens based on a signal to noise ratio for the focus score.

Step 910 may include identifying two axial bounds from a sequence of focus scores associated with the images. In some embodiments, identifying two axial bounds comprises identifying an inflexion point in the sequence of focus scores for at least one of the two axial bounds.

Step 912 may include determining a thickness of a tissue component in the sample based on the two axial bounds.

In some embodiments, the pre-selected step increment may be determined at an initial value. In such embodiments, a sample thickness based on the sequence of focus scores may be determined. Furthermore, a second step increment smaller than the pre-selected step increment can be determined, and two axial bounds can be identified using multiple images at different axial positions of the objective lens relative to the sample at the second step increment.

In some embodiments, the objective lens may be directed to a second point over the sample. Furthermore, the two axial bounds may be identified on the second point over the sample. The second point may be removed from the first point by a distance comparable to a field of view of the objective lens on the sample.

In some embodiments, a lateral boundary of the tissue component in the sample may be determined based on a sample thickness collected for multiple points on a plane view of the sample.

Figure 10:
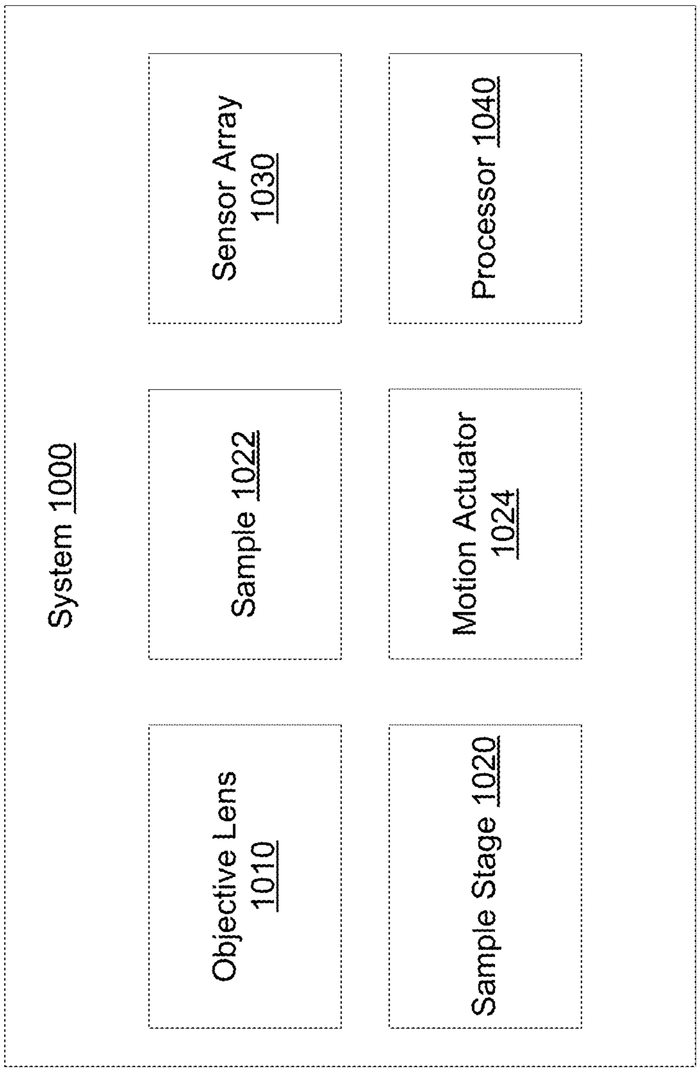
FIG. 10 illustrates an example system for determining a thickness of a tissue sample, according to some embodiments.

FIG. 10 illustrates an example system 1000 for determining a thickness of a tissue sample, according to non-limiting embodiments of the present disclosure. As illustrated, the system 1000 includes a number of components, but aspects of the system 1000 may include additional components, less components, or alternate components. In some embodiments, the system 1000 may comprise, or may include one or more components of, computer system/server 12 of FIG. 16, as will be discussed herein. For example, processing units 16 of computer system/server 12 is a non-limiting example of processor 1040 of system 1000.

As shown in FIG. 10, the system 1000 may include an objective lens 1010, a sample stage 1020, a sensor array 1030 and a processor 1040. The objective lens 1010 may be configured to collect an image from a sample 1022. Objective lens 220 of FIG. 2 is a non-limiting example of objective lens 1010. The sample stage 1020 may be configured to hold a sample 1022 (such as, but not limited to, sample 110 as previously discussed in relation to FIG. 1). The sample stage 1020 may include a motion actuator 1024 configured to adjust a distance separating the objective lens 1010 from the sample 1022 along an optical axis of the objective lens 1010, and to scan the sample 1022 in a plane substantially perpendicular to the optical axis of the objective lens 1010. The sensor array 1030 may be disposed on an image plane of the objective lens 1010. Sensor array 260 of FIG. 2 is a non-limiting example of sensor array 1030.

The processor 1040 may be configured to cause the sample stage 1020 to move to multiple positions along the optical axis of the objective lens 1010 at a first position on the sample 1022. The processor 1040 may be configured to cause the sensor array 1030 to collect a two-dimensional image at each of the positions along the optical axis of the objective lens 1010. The processor 1040 may be configured to determine a focus score from the two-dimensional image. For example, the processor 1040 can apply a two-dimensional wavelet filter to obtain a wavelet amplitude associated to the focus score. The processor 1040 may be configured to determine a thickness of a tissue component in the sample 1022 based on a sequence of the focus score for the positions along the optical axis of the objective lens 1010. For example, to determine the thickness of the tissue component, the processor 1040 can be configured to determine two axial bounds from the sequence of the focus score for the positions along the optical axis of the objective lens 1010.

In some embodiments, the processor 1040 may be further configured to adjust an illumination power for the sample 1022 to provide a desirable phase-contrast to determine the focus score from the two-dimensional image. In some embodiments, the processor 1040 may cause the sensor array 1030 to collect a two-dimensional image of the sample 1022 in a trans-illumination configuration and in a phase contrast illumination configuration.

In some embodiments, the system 1000 may further include a light source configured to illuminate the sample 1022 at an angle relative to the optical axis of the objective lens 1010. The processor 1040 may be configured to detect a lateral width of the tissue component based on a phase contrast created by the light source. Also or alternatively, the system 1000 may further comprise a trans-illumination source to provide a direct illumination of the sample 1022 into the objective lens 1010.

In some embodiments, the processor 1040 may cause the motion actuator 1024 to scan the sample 1022 to a second position on the sample 1022 separated from the first position by distance equivalent to a field of view of the objective lens 1010. Also or alternatively, the processor 1040 may cause the motion actuator 1024 to scan the sample 1022 to a second position on the sample 1022 separated from the first position by distance smaller than a field of view of the objective lens 1010.

In some embodiments, the processor 1040 may be configured to assess a working distance between the objective lens 1010 and the sample 1022 based on a first image and a second image of a first beam and a second beam, respectively, projected on the sensor array 1030 from the sample 1022. The first beam may form a first numerical aperture and the second beam forms a second numerical aperture, in the objective lens 1010.

V. Prediction System

Figure 11:
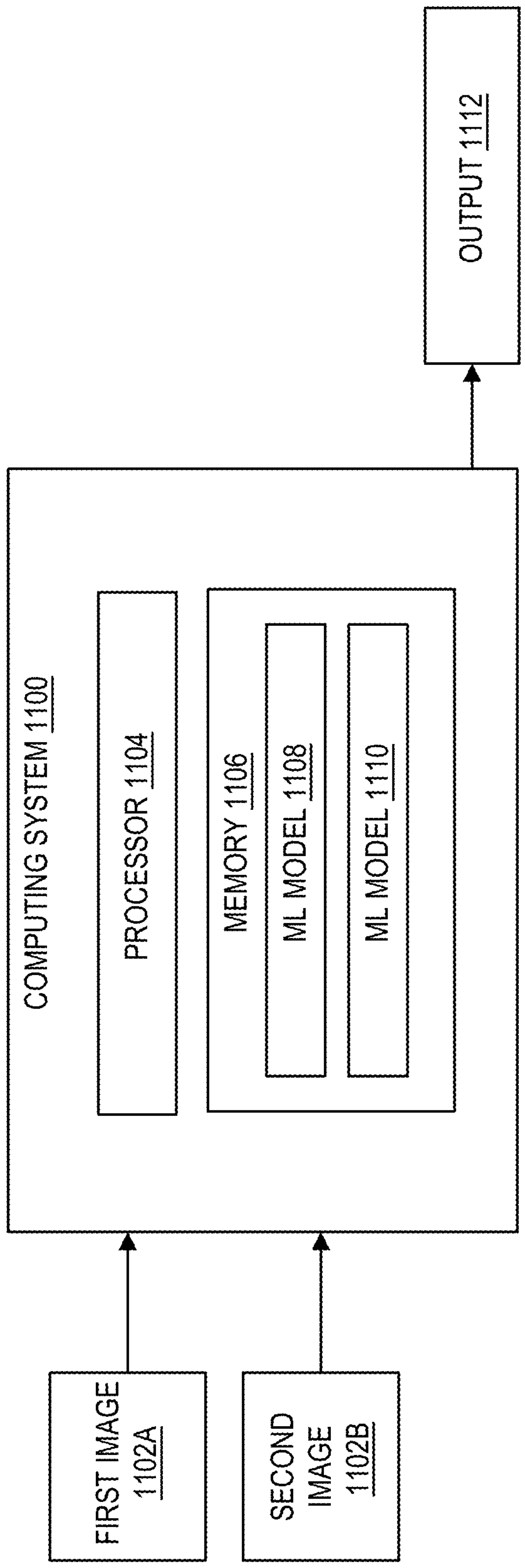
FIG. 11 illustrates a system for determining a thickness of a sample, according to aspects of the present disclosure.

FIG. 11 illustrates an example computing system 1100 for generating a prediction related to a thickness of a sample (e.g., a biological sample). It will be appreciated that FIG. 11 is a simplified depiction of a computing system and that additional components (e.g., computer system 10 of FIG. 16, system 1000 of FIG. 10, etc.) may be included to enable the processing operations described herein. The computing system 1100 includes a processor 1104 in communication with a memory 1106. In various aspects, the memory 1106 may store a machine learning model 1108. In some aspects, the memory 1106 may additionally store a machine learning model 1110. In other aspects, the machine learning model 1108 and/or the machine learning model 1110 may be stored on a separate computing device (e.g., a server) in communication with the computing system 1100 over a network. In such aspects, the network may include one or more wireless networks such as, but not limited to one or more of a Local Area Network (LAN), Wireless Local Area Network (WLAN), a Personal Area Network (PAN), Campus Area Network (CAN), a Metropolitan Area Network (MAN), a Wide Area Network (WAN), a Wireless Wide Area Network (WWAN), Global System for Mobile Communications (GSM), Personal Communications Service (PCS), Digital Advanced Mobile Phone Service (D-Amps), Bluetooth, Wi-Fi, Fixed Wireless Data, 2G, 2.5G, 3G, 4G, LTE networks, enhanced data rates for GSM evolution (EDGE), General packet radio service (GPRS), enhanced GPRS, messaging protocols such as, TCP/IP, SMS, MMS, extensible messaging and presence protocol (XMPP), real time messaging protocol (RTMP), instant messaging and presence protocol (IMPP), instant messaging, USSD, IRC, or any other wireless data networks or messaging protocols. The network may also include wired networks. In some aspects, the machine learning model 1108 and/or the machine learning model 1110 may be implemented as more than one machine learning model.

The computing system 1100 may receive at least two images of a sample as input. For example, the computing system 1100 may receive a first image 1102A and a second image 1102B, which may be input directly to the machine learning model 1108 or may be processed to determine input features for the machine learning model 1108. In various embodiments, the computing system 1100 may receive more than two images. In various embodiments, the first image 1102A is a first z-stack of images. In various embodiments, the second image 1102B is a second z-stack of images. In various embodiments, the first z-stack of images represents a first FOV of the sample and the second z-stack of images represents a second FOV of the sample. In various embodiments, the first image 1102A and the second image 1102B represent two images from a single z-stack. In various embodiments, the first image 1102A and the second image 1102B may correspond to any two image slices within the z-stack (e.g., obtained within the sample volume).

The machine learning model 1108 (and the machine learning model 1110 if included) may be trained in accordance with various different embodiments of the present disclosure. In another embodiment, the machine learning model 1108 may be trained to receive inputs including the first image 1102A and the second image 1102B and output a first feature vector for the first image 1102A and a second feature vector for the second image 1102B. In various embodiments, the machine learning model 1108 may be trained to receive inputs including the first image 1102A, a first height associated with the first image 1102A, the second image 1102B, and/or a second height associated with the second image 1102B, and output a prediction of a thickness of the sample based on the inputs. In various embodiments, the machine learning model 1108 may be trained to receive inputs including a first z-stack of images, heights of each image in the first z-stack, and output a prediction of a thickness of the sample based on the inputs. In various embodiments, the machine learning model 1108 may be trained to receive inputs including a focus score curve (representing focus scores determined from a z-stack of images), and output a prediction of a thickness of the sample based on the inputs.

In various aspects of this embodiment, the machine learning model 1108 may be trained on a plurality of training images, which includes assigning a training label to a first training image of the plurality of training images based on a difference of a focal distance associated with the first training image and a focal distance associated with a second training image of the plurality of training images. The second training image in this training process is associated with a focus score related to a maximum focus score of a z-stack including the first and second training images. A focus score related to the maximum focus score may be the maximum focus score or another focus score that can be identified relative to the maximum focus score. In some embodiments, the sample includes tissue and the machine learning model 1108 may be trained for a particular tissue type (e.g., breast tissue) such that the accuracy with which the machine learning model 1108 predicts the parameter related to the thickness of the sample is highest for images of the particular tissue type sample and may be diminished for other tissue type samples.

In another embodiment, the machine learning model 1108 may be trained to receive inputs including a focus score for the first image 1102A and a focus score for the second image 1102B, and output a prediction of a thickness of the sample based on the inputs. In this embodiment, the focus scores are determined manually or via computing device, such as by the processor 1104, based on the first image 1102A and a second image 1102B. In various aspects of this embodiment, the machine learning model 1108 may be trained on a plurality of focus score curves for a plurality of training images. In some embodiments, the sample includes tissue and the machine learning model 1108 may be trained for a particular tissue type (e.g., breast tissue, brain tissue, etc.) and/or a particular tissue source (e.g., human, mouse, etc.) such that the accuracy with which the machine learning model 1108 predicts the parameter related to the thickness of the sample is highest for images of the particular tissue type sample and may be diminished for other tissue type samples.

In another embodiment, the machine learning model 1108 may be trained to receive inputs including the first image 1102A and the second image 1102B and output a first focus score for the first image 1102A and a second focus score for the second image 1102B. In some aspects, the inputs may further include a focal distance associated with the first image 1102A and a focal distance associated the second image 1102B. In this embodiment, the output focus scores may be input into the machine learning model 1110, which is trained to output a prediction of a parameter related to a thickness of the sample based on the respective input focus scores for the first image 1102A and the second image 1102B. In various aspects of this embodiment, the machine learning model 1110 may be trained on a plurality of training curves represented by focus scores of a plurality of training images, which includes assigning a training label to a first focus score of a first training image of the plurality of training images. In some embodiments, the sample includes tissue and at least one of the machine learning models 1108 and 1110 may be trained for a particular tissue type (e.g., breast tissue) and/or a particular tissue source (e.g., human, mouse, etc.) such that the accuracy with which the machine learning model 1108 and/or the machine learning model 1110 make their respective predictions is highest for images of the particular tissue type sample and may be diminished for other tissue type samples.

In various embodiments, the computing system 1100 determines an output 1112. In some aspects, the output 1112 may be the prediction of the parameter output by the machine learning model 1108 and/or the machine learning model 1110. In various embodiments, the output 1112 is the thickness of the sample.

Each of the machine learning models 1108 and 1110 may include a supervised, semi-supervised, or unsupervised machine learning model. For example, the machine learning model 1108 or the machine learning model 1110 may be one of the machine learning models in the group including random forest, logistic regression, gradient boosting machine, neural networks, support vector machines, k-means clustering, and hierarchical clustering models.

VI. Prediction Methods

Figure 12:
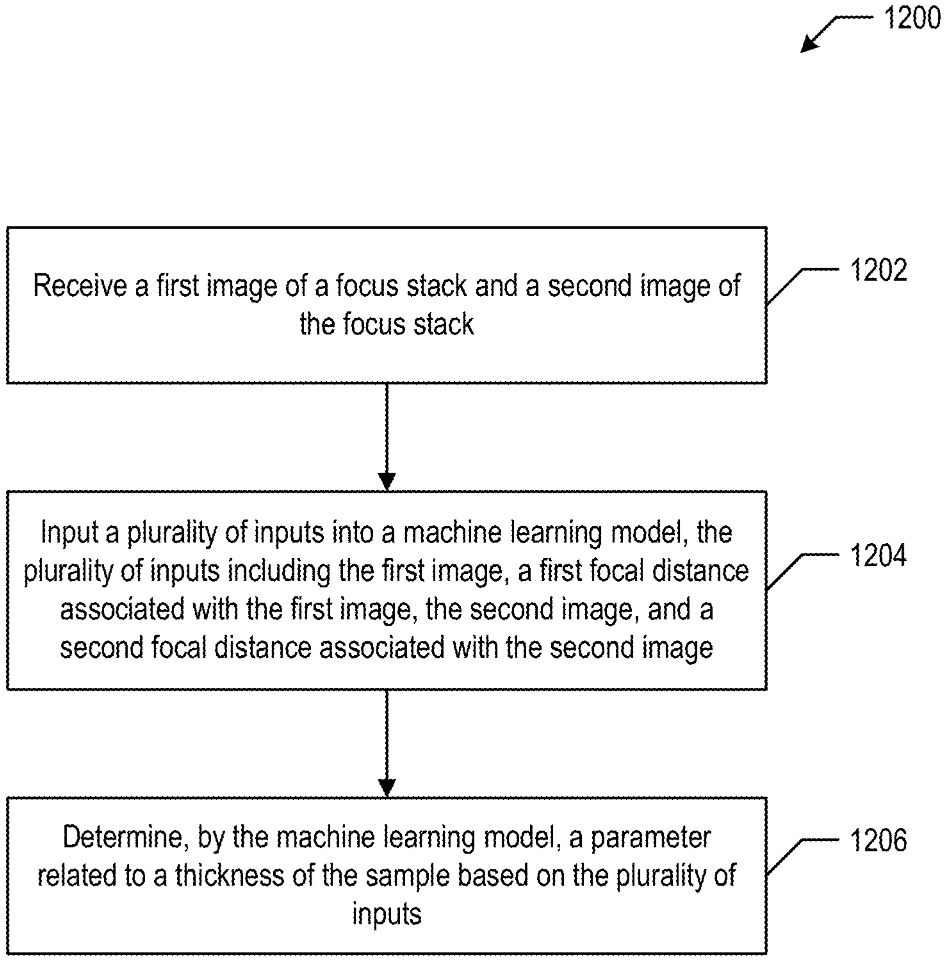
FIG. 12 illustrates a flow chart of an embodiment of a method for determining a thickness of a sample, according to aspects of the present disclosure.

FIG. 12 is a flow chart of an example method 1200 for determining a parameter related to a thickness of a sample (e.g., a biological sample), according to one embodiment of the present disclosure. At block 1202, a first image (e.g., the image 1102A) of a z-stack and a second image (e.g., the image 1102B) of the z-stack is received. For example, the computing system 1100 (e.g., the processor 1104) may receive the first image 1102A and the second image 1102B. The z-stack includes multiple images that include the first image 1102A and the second image 1102B. In some aspects, more than two images of the z-stack may be received, such as 3, 4, 5, 10, etc. images. Each of the multiple images of the z-stack is associated with a different focal distance relative to the sample. For example, the first image 1102A of the z-stack is associated with an image capture device's focal distance at capture of the first image 1102A of the sample, and each of the images of the z-stack were captured at a different focal distance. In some aspects, the first image 1102A and the second image 1102B are received from an optics module comprising a camera and an objective. In other aspects, the first image 1102A and the second image 1102B are received from a database.

In various aspects, the multiple images of the z-stack comprise dark field images of the sample. In various aspects, the multiple images of the z-stack comprise fluorescent images of the sample. In some instances, the fluorescent images comprise DAPI images. In various aspects, the multiple images of the z-stack comprise transilluminated images of the sample. In various aspects, the sample comprises a tissue, such as human or animal tissue. In various aspects, the sample is substantially translucent.

At block 1204, a plurality of inputs are input (e.g., by the processor 1204) into a machine learning model (e.g., the machine learning model 1108). The plurality of inputs include the first image 1102A, a first focal distance associated with the first image 1102A, the second image 1102B, and a second focal distance associated with the second image 1102B.

At block 1206, the machine learning model 1108 determines a parameter related to a thickness of the sample based on the plurality of inputs. For example, the z-stack may be associated with a specific field-of-view of the sample and the determined parameter is related to the thickness of the sample at the specific field-of-view. The thickness of the sample may be determined based on the parameter. For example, in various aspects, the method 1200 further includes determining (e.g., by the processor 1104) the thickness of the sample based on the parameter. In at least some aspects, the thickness of the sample is a difference of a focal distance associated with a first inflection point of a curve and a focal distance associated with a second inflection point of the curve, in which a plurality of focus scores of the plurality of images of the z-stack represent the curve. In at least some aspects, the sample is arranged on a substrate (e.g., glass slide) when an image is captured of the sample and a thickness of the sample is measured perpendicular to the substrate.

In some aspects, determining the parameter includes determining, by the machine learning model, a first focus score (e.g., focus score, first focus measurement, etc.) for the first image and a second focus score (e.g., second focus measurement) for the second image. In such aspects, the parameter related to the thickness of the sample is predicted based on the first and second focus scores. In various aspects, each of the first and second focus scores is a Tenengrad score, a normalized variant score, or a discrete cosine transform, though other suitable measurements of focus quality may be used.

In some aspects, a plurality of focus measurements of the plurality of images represent a curve. The parameter may be (1) a first difference of the first focal distance and a third focal distance associated with a first inflection point of the curve and (2) a second difference of the second focal distance and a fourth focal distance associated with a second inflection point of the curve. In some aspects, the parameter is the thickness of the sample. In other aspects, a plurality of focus scores of the plurality of images in the z-stack (e.g., each image is associated with a focus score) represent a curve, and the parameter is (1) a first difference of the first focal distance associated with the first image 1102A and a third focal distance associated with a first inflection point of the curve and (2) a second difference of the second focal distance associated with the second image 1102B and the third focal distance associated with a second inflection point of the curve. In other aspects, the parameter is (1) a first difference of the first focal distance associated with the first image 1102A and a third focal distance associated with a maximum of the curve and (2) a second difference of the second focal distance associated with the second image 1102B and the third focal distance associated with the maximum of the curve. In other aspects, the parameter is an equation of a curve that is represented by a plurality of focus scores of the plurality of images in the z-stack.

In various aspects, the parameter related to the thickness is determined for a first field-of-view of the sample, and the method 800 further includes receiving a plurality of z-stacks for a plurality of fields-of-view of the sample. A plurality of parameters related to the thickness of the sample are determined by the machine learning model 1108 for the plurality of fields-of-view of the sample determining. The thickness of the sample is determined for each of the plurality of fields-of-view based on the plurality of parameters. Based on the thickness of the sample at each of the plurality of fields-of-view, boundaries of the sample in a plane perpendicular to the thickness of the sample are determined. For example, a thickness of the sample will rapidly approach zero right after a boundary of the sample. In some aspects, the method 800 further includes determining, an imageable volume of the sample based on (1) the thickness of the sample at each of the plurality of fields-of-view and (2) the boundaries of the sample.

Figure 13:
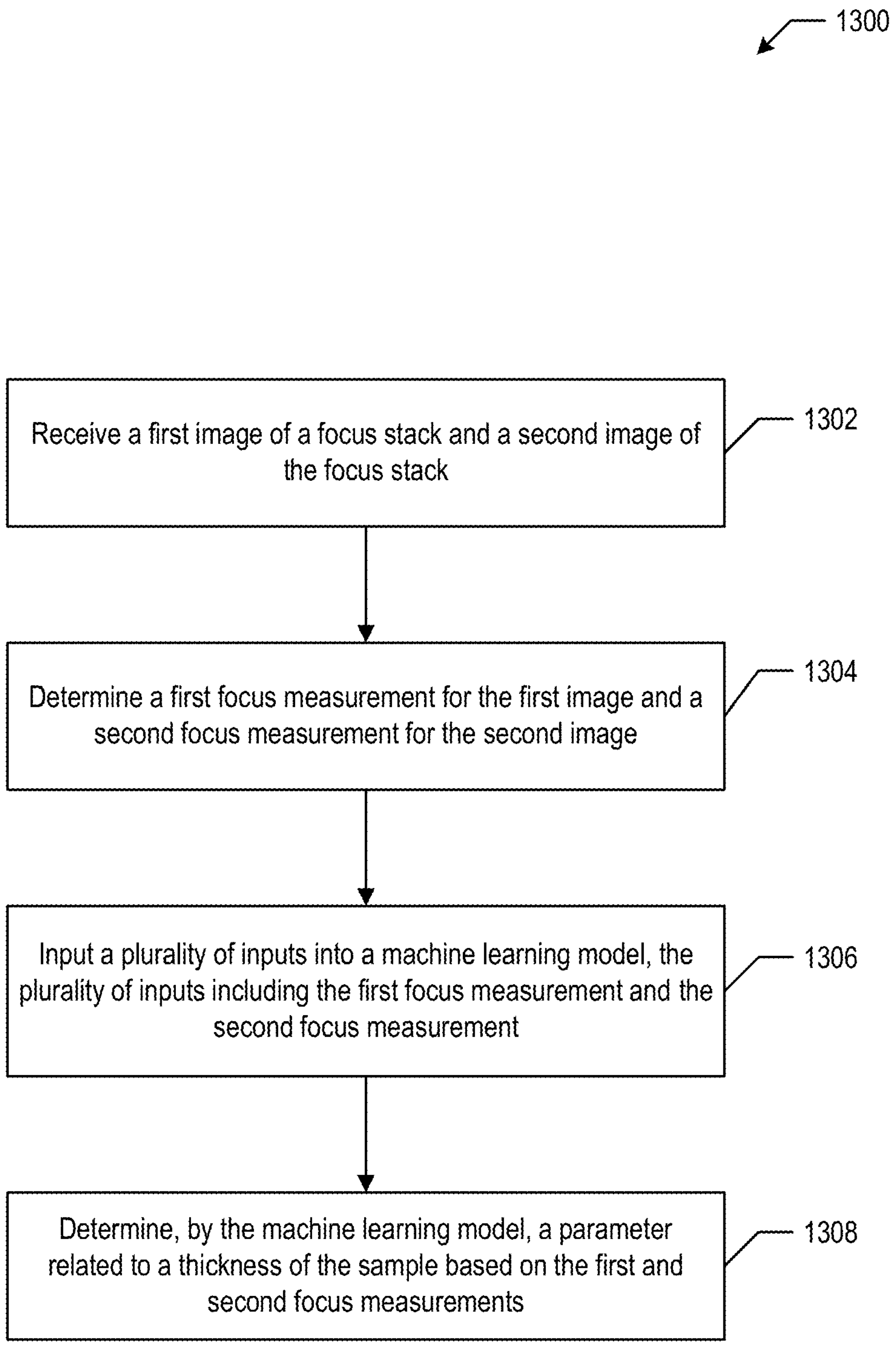
FIG. 13 illustrates a flow chart of another embodiment of the method for determining a thickness of a sample, according to aspects of the present disclosure.

FIG. 13 is a flow chart of an example method 1300 for determining a parameter related to a thickness of a sample (e.g., a biological sample), according to another embodiment of the present disclosure. At block 1302, a first image (e.g., the image 1102A) of a z-stack and a second image (e.g., the image 1102B) of the z-stack is received. For example, the computing system 1100 (e.g., the processor 1104) may receive the first image 1102A and the second image 1102B. The z-stack includes multiple images that include the first image 1102A and the second image 1102B. In some aspects, more than two images of the z-stack may be received, such as 3, 4, 5, 10, etc. images. Each of the multiple images of the z-stack is associated with a different focal distance relative to the sample. For example, the first image 1102A of the z-stack is associated with an image capture device's focal distance at capture of the first image 1102A of the sample, and each of the images of the z-stack were captured at a different focal distance. In some aspects, the first image 1102A and the second image 1102B are received from an optics module comprising a camera and an objective. In other aspects, the first image 1102A and the second image 1102B are received from a database.

At block 1304, a first focus score for the first image 1102A and a second focus score for the second image 1102B are determined (e.g., by the processor 1104). In some aspects, determining the first and second focus scores is based, in part, on a focal distance associated with the first image 1102A and a focal distance associated with the second image 1102B.

At block 1306, a plurality of inputs are input into a machine learning model (e.g., the machine learning model 1108). The plurality of inputs include the first focus score associated with the first image 1102A and the second focus score associated with the second image 1102B.

At block 1308, the machine learning model 1108 determines a parameter related to a thickness of the sample based on the plurality of inputs. For example, the z-stack may be associated with a specific field-of-view of the sample and the determined parameter is related to the thickness of the sample at the specific field-of-view. The thickness of the sample may be determined based on the parameter. For example, in various aspects, the method 1300 further includes determining (e.g., by the processor 1104) the thickness of the sample based on the parameter. In at least some aspects, the thickness of the sample is a difference of a focal distance associated with a first inflection point of a curve and a focal distance associated with a second inflection point of the curve, in which a plurality of focus scores of the plurality of images of the z-stack represent the curve. In at least some aspects, the sample is arranged on a substrate (e.g., glass slide) when an image is captured of the sample and a thickness of the sample is measured perpendicular to the substrate.

In some aspects, the parameter is the thickness of the sample. In other aspects, a plurality of focus scores of the plurality of images in the z-stack (e.g., each image is associated with a focus score) represent a curve, and the parameter is (1) a first difference of the first focal distance associated with the first image 1102A and a third focal distance associated with a first inflection point of the curve and (2) a second difference of the second focal distance associated with the second image 1102B and the third focal distance associated with a second inflection point of the curve. In other aspects, the parameter is (1) a first difference of the first focal distance associated with the first image 1102A and a third focal distance associated with a maximum of the curve and (2) a second difference of the second focal distance associated with the second image 1102B and the third focal distance associated with the maximum of the curve. In other aspects, the parameter is an equation of a curve that is represented by a plurality of focus scores of the plurality of images in the z-stack.

In various aspects, the parameter related to the thickness is determined for a first field-of-view of the sample, and the method 1300 further includes receiving a plurality of z-stacks for a plurality of fields-of-view of the sample. A plurality of parameters related to the thickness of the sample are determined by the machine learning model 1108 for the plurality of fields-of-view of the sample determining. The thickness of the sample is determined for each of the plurality of fields-of-view based on the plurality of parameters. Based on the thickness of the sample at each of the plurality of fields-of-view, boundaries of the sample in a plane perpendicular to the thickness of the sample are determined. For example, a thickness of the sample will rapidly approach zero right after a boundary of the sample. In some aspects, the method 1300 further includes determining, an imageable volume of the sample based on (1) the thickness of the sample at each of the plurality of fields-of-view and (2) the boundaries of the sample.

Figure 14:
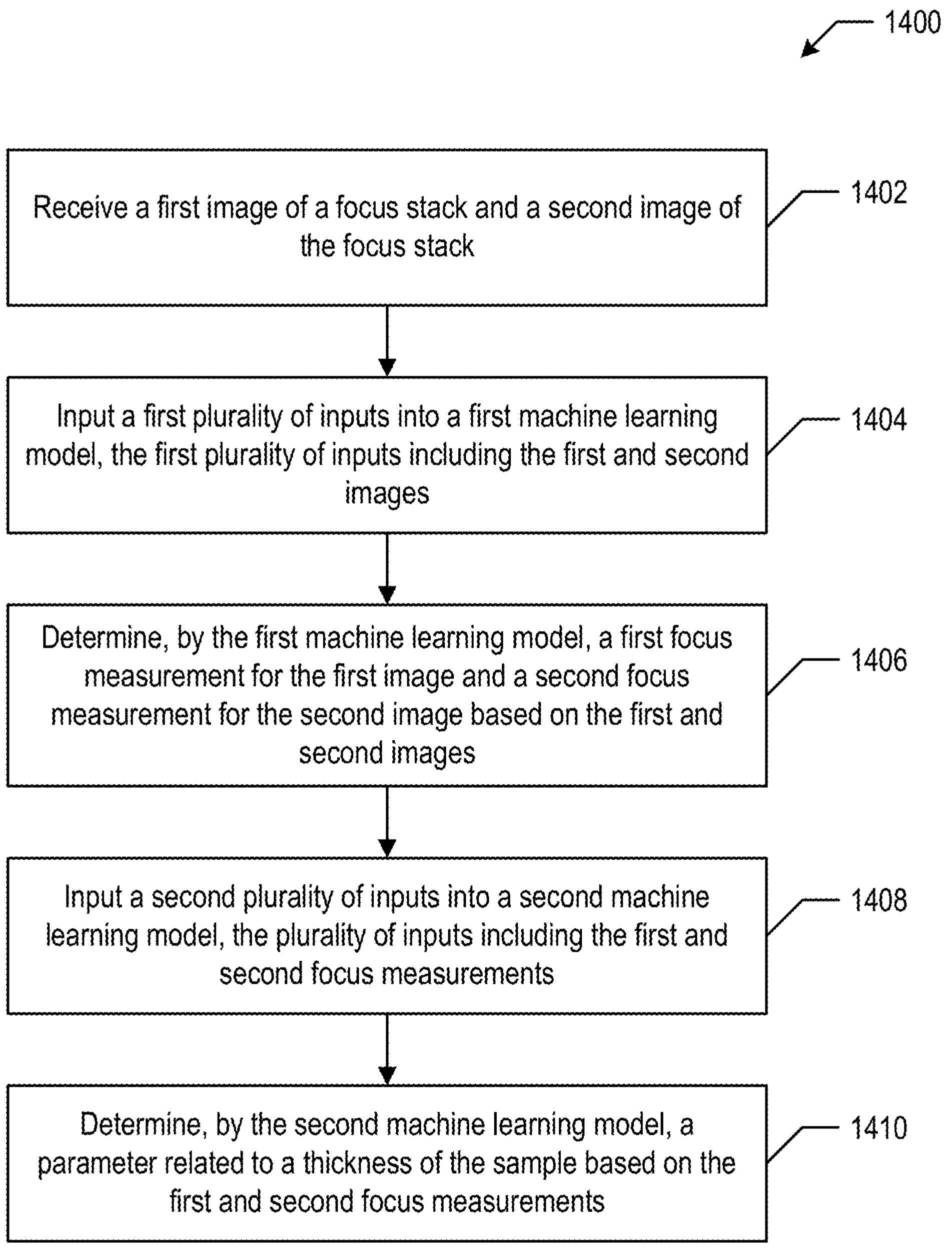
FIG. 14 illustrates a flow chart of another embodiment of the method for determining a thickness of a sample, according to aspects of the present disclosure.

FIG. 14 is a flow chart of an example method 1400 for determining a parameter related to a thickness of a sample (e.g., a biological sample), according to another embodiment of the present disclosure. At block 1402, a first image (e.g., the image 1102A) of a z-stack and a second image (e.g., the image 1102B) of the z-stack is received. For example, the computing system 1100 (e.g., the processor 1104) may receive the first image 1102A and the second image 1102B. The z-stack includes multiple images that include the first image 1102A and the second image 1102B. In some aspects, more than two images of the z-stack may be received, such as 3, 4, 5, 10, etc. images. Each of the multiple images of the z-stack is associated with a different focal distance relative to the sample. For example, the first image 1102A of the z-stack is associated with an image capture device's focal distance at capture of the first image 1102A of the sample, and each of the images of the z-stack were captured at a different focal distance. In some aspects, the first image 1102A and the second image 1102B are received from an optics module comprising a camera and an objective. In other aspects, the first image 1102A and the second image 1102B are received from a database.

At block 1404, a first plurality of inputs are input (e.g., by the processor 1104) into a first machine learning model (e.g., the machine learning model 1108). The first plurality of inputs include the first image 1102A and the second image 1102B. In some aspects, the first plurality of inputs further includes a focal distance associated with the first image 1102A and a focal distance associated with the second image 1102B.

At block 1406, a first focus score for the first image 1102A and a second focus score for the second image 1102B are determined by the machine learning model 1108 based on the first image 1102A and the second image 1102B, and in some aspects, further based on the focal distance associated with the first image 1102A and the focal distance associated with the second image 1102B.

At block 1408, a second plurality of inputs are input (e.g., by the processor 1104) into a second machine learning model (e.g., the machine learning model 1110). The second plurality of inputs include the first and second focus scores.

At block 1410, a parameter related to a thickness of the sample is determined by the machine learning model 1110 based on the first and second focus scores. For example, the z-stack may be associated with a specific field-of-view of the sample and the determined parameter is related to the thickness of the sample at the specific field-of-view. The thickness of the sample may be determined based on the parameter. For example, in various aspects, the method 1400 further includes determining (e.g., by the processor 1104) the thickness of the sample based on the parameter. In at least some aspects, the thickness of the sample is a difference of a focal distance associated with a first inflection point of a curve and a focal distance associated with a second inflection point of the curve, in which a plurality of focus scores of the plurality of images of the z-stack represent the curve. In at least some aspects, the sample is arranged on a substrate (e.g., glass slide) when an image is captured of the sample and a thickness of the sample is measured perpendicular to the substrate.

In some aspects, the parameter is the thickness of the sample. In other aspects, a plurality of focus scores of the plurality of images in the z-stack (e.g., each image is associated with a focus score) represent a curve, and the parameter is (1) a first difference of the first focal distance associated with the first image 1102A and a third focal distance associated with a first inflection point of the curve and (2) a second difference of the second focal distance associated with the second image 1102B and the third focal distance associated with a second inflection point of the curve. In other aspects, the parameter is (1) a first difference of the first focal distance associated with the first image 1102A and a third focal distance associated with a maximum of the curve and (2) a second difference of the second focal distance associated with the second image 1102B and the third focal distance associated with the maximum of the curve. In other aspects, the parameter is an equation of a curve that is represented by a plurality of focus scores of the plurality of images in the z-stack.

In various aspects, the parameter related to the thickness is determined for a first field-of-view of the sample, and the method 1400 further includes receiving a plurality of z-stacks for a plurality of fields-of-view of the sample. A plurality of focus scores for a plurality of images in the plurality of z-stacks are determined by the machine learning model 1108 for the plurality of fields-of-view of the sample. A plurality of parameters related to the thickness of the sample are determined by the machine learning model 1110 for the plurality of fields-of-view of the sample. The thickness of the sample is determined for each of the plurality of fields-of-view based on the plurality of parameters. Based on the thickness of the sample at each of the plurality of fields-of-view, boundaries of the sample in a plane perpendicular to the thickness of the sample are determined. For example, a thickness of the sample will rapidly approach zero right after a boundary of the sample. In some aspects, the method 1400 further includes determining, an imageable volume of the sample based on (1) the thickness of the sample at each of the plurality of fields-of-view and (2) the boundaries of the sample.

Figure 15:
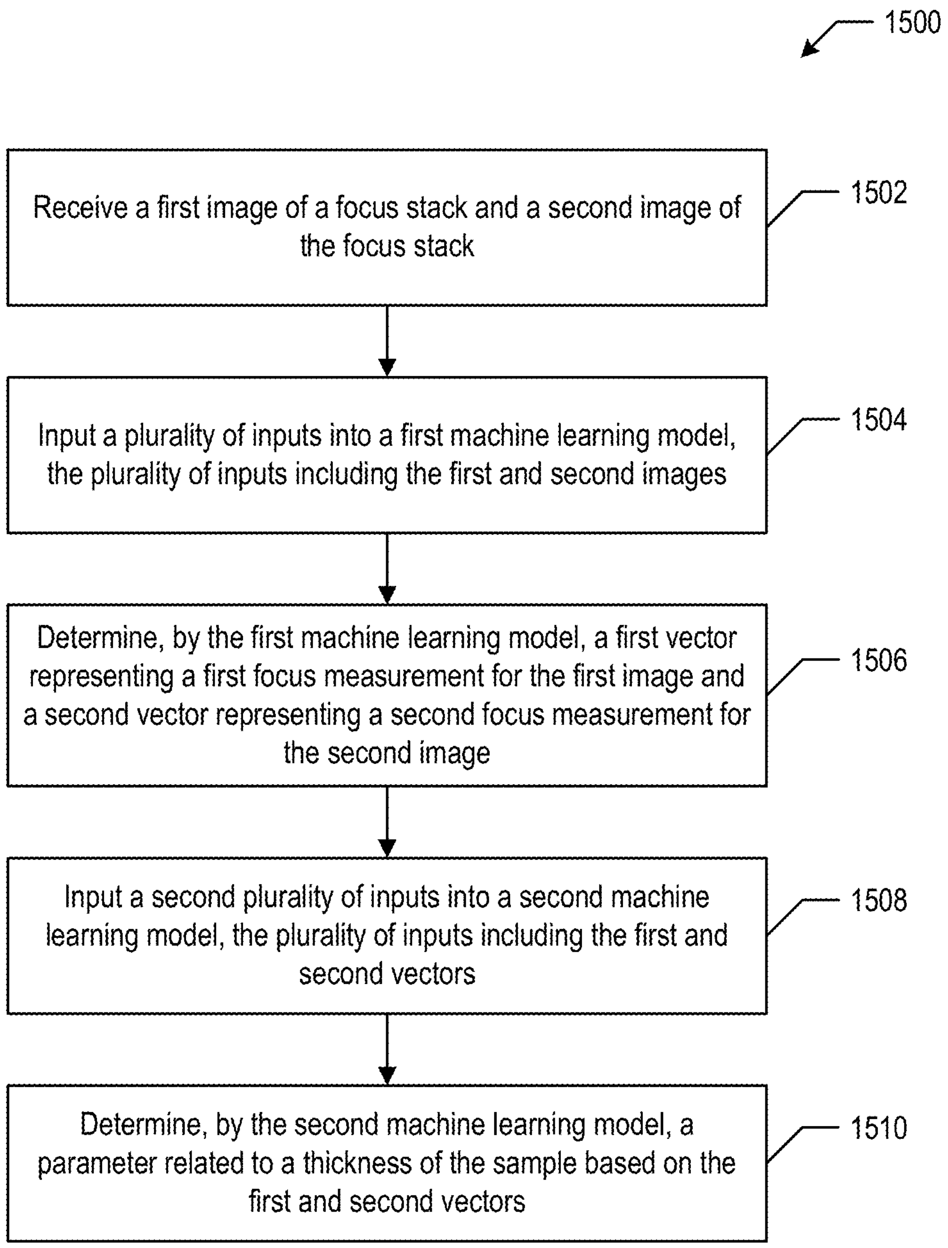
FIG. 15 illustrates a flow chart of another embodiment of a method for determining a thickness of a sample, according to aspects of the present disclosure.

FIG. 15 is a flow chart of an example method 1500 for determining a parameter related to a thickness of a sample (e.g., a biological sample), according to another embodiment of the present disclosure. At block 1502, a first image (e.g., the image 1102A) of a z-stack and a second image (e.g., the image 1102B) of the z-stack is received. For example, the computing system 1100 (e.g., the processor 1104) may receive the first image 1102A and the second image 1102B. The z-stack includes multiple images that include the first image 1102A and the second image 1102B. In some aspects, more than two images of the z-stack may be received, such as 3, 4, 5, 10, etc. images. Each of the multiple images of the z-stack is associated with a different focal distance relative to the sample. For example, the first image 1102A of the z-stack is associated with an image capture device's focal distance at capture of the first image 1102A of the sample, and each of the images of the z-stack were captured at a different focal distance. In some aspects, the first image 1102A and the second image 1102B are received from an optics module comprising a camera and an objective. In other aspects, the first image 1102A and the second image 1102B are received from a database.

At block 1504, a first plurality of inputs are input (e.g., by the processor 1104) into a first machine learning model (e.g., the machine learning model 1108). The first plurality of inputs include the first image (e.g., first image 1102A) and the second image (e.g., the second image 1102B). In some aspects, the first plurality of inputs further includes a focal distance associated with the first image 1102A and a focal distance associated with the second image 1102B.

At block 1506, a first vector representing a first focus score for the first image (e.g., first image 1102A) and a second vector representing a second focus score for the second image (e.g., second image 1102B) are determined by the machine learning model (e.g., machine learning model 1108), based on the first image and the second image, and in some aspects, further based on the focal distance associated with the first image and the focal distance associated with the second image.

At block 1508, a second plurality of inputs are input (e.g., by the processor 1104) into a second machine learning model (e.g., the machine learning model 1110). The second plurality of inputs include the first and second vectors.

At block 1510, a parameter related to a thickness of the sample is determined by the machine learning model (e.g., the second machine learning model (e.g., machine learning model 1110)) based on the first and second vectors. For example, the z-stack may be associated with a specific field-of-view of the sample and the determined parameter is related to the thickness of the sample at the specific field-of-view. The thickness of the sample may be determined based on the parameter. For example, in various aspects, the method 1500 further includes determining (e.g., by the processor 1104) the thickness of the sample based on the parameter. In at least some aspects, the thickness of the sample is a difference of a focal distance associated with a first inflection point of a curve and a focal distance associated with a second inflection point of the curve, in which a plurality of focus scores of the plurality of images of the z-stack represent the curve. In at least some aspects, the sample is arranged on a substrate (e.g., glass slide) when an image is captured of the sample and a thickness of the sample is measured perpendicular to the substrate.

In some aspects, the parameter is the thickness of the sample. In other aspects, a plurality of focus scores of the plurality of images in the z-stack (e.g., each image is associated with a focus score) represent a curve, and the parameter is (1) a first difference of the first focal distance associated with the first image 1102A and a third focal distance associated with a first inflection point of the curve and (2) a second difference of the second focal distance associated with the second image 1102B and the third focal distance associated with a second inflection point of the curve. In other aspects, the parameter is (1) a first difference of the first focal distance associated with the first image 1102A and a third focal distance associated with a maximum of the curve and (2) a second difference of the second focal distance associated with the second image 1102B and the third focal distance associated with the maximum of the curve. In other aspects, the parameter is an equation of a curve that is represented by a plurality of focus scores of the plurality of images in the z-stack.

In various aspects, the parameter related to the thickness is determined for a first field-of-view of the sample, and the method 1500 further includes receiving a plurality of z-stacks for a plurality of fields-of-view of the sample. A plurality of focus scores for a plurality of images in the plurality of z-stacks are determined by the machine learning model 1108 for the plurality of fields-of-view of the sample. A plurality of parameters related to the thickness of the sample are determined by the machine learning model (e.g., the second machine learning model (e.g., machine learning model 1110)) for the plurality of fields-of-view of the sample. The thickness of the sample is determined for each of the plurality of fields-of-view based on the plurality of parameters. Based on the thickness of the sample at each of the plurality of fields-of-view, boundaries of the sample in a plane perpendicular to the thickness of the sample are determined. For example, a thickness of the sample will rapidly approach zero right after a boundary of the sample. In some aspects, the method 1500 further includes determining, an imageable volume of the sample based on (1) the thickness of the sample at each of the plurality of fields-of-view and (2) the boundaries of the sample.

Although the above example methods are described with reference to the flow charts illustrated in FIGS. 12-15, it will be appreciated that many other methods of performing the acts associated with each of the above methods may be used. For example, the order of some of the blocks may be changed, certain blocks may be combined with other blocks, additional blocks may be added, and some of the blocks described may be omitted. Each of the methods may be performed by processing logic that may comprise hardware (circuitry, dedicated logic, etc.), software, or a combination of both.

VII. Example Computing Node

Figure 16:
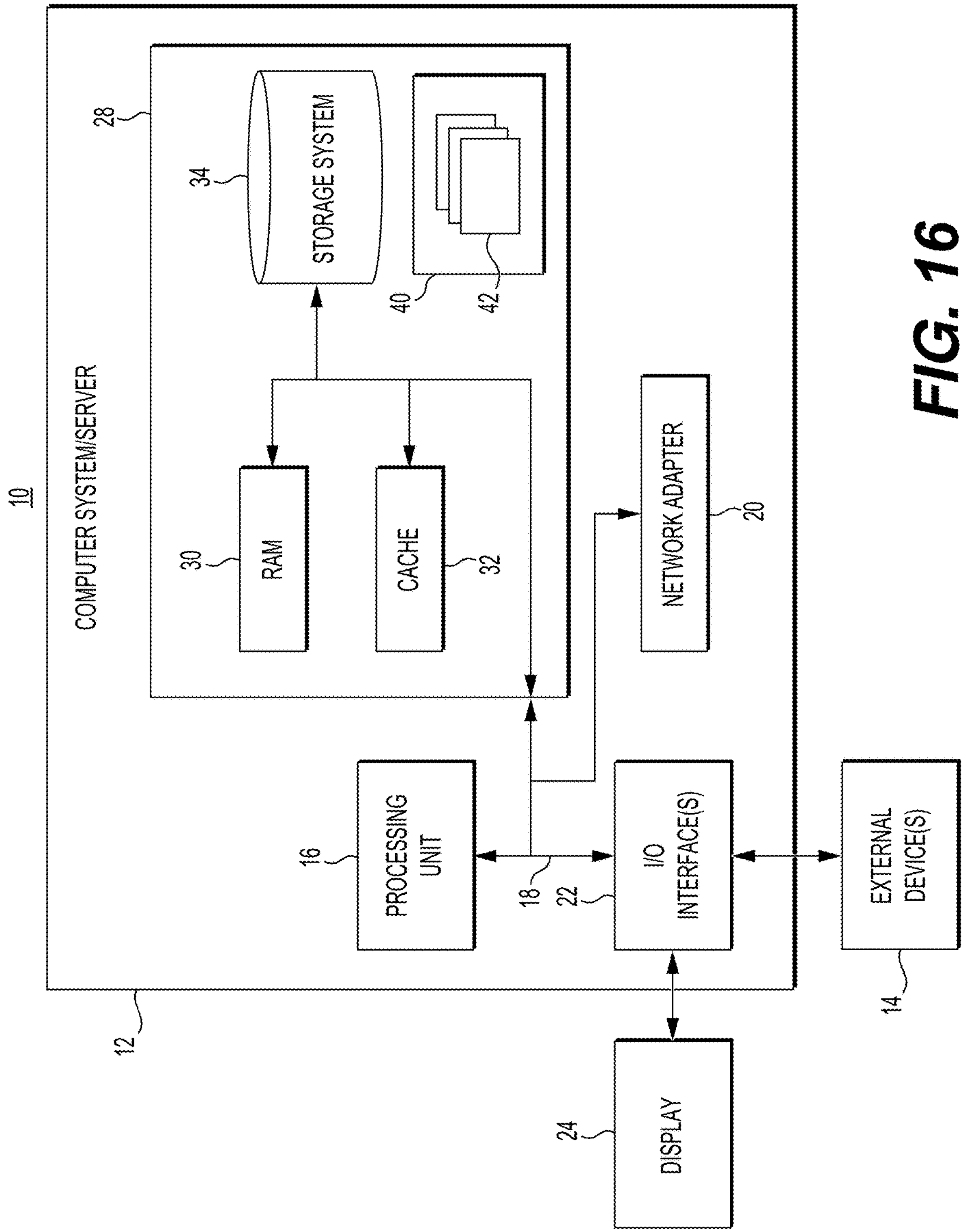
FIG. 16 depicts a computing node according to some embodiments disclosed herein.

Referring now to FIG. 16, a schematic of an example of a computing node is shown. Computing node 10 is only one example of a suitable computing node and is not intended to suggest any limitation as to the scope of use or functionality of the embodiment described herein. Regardless, computing node 10 is capable of being implemented and/or performing any of the functionality set forth hereinabove.

In computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 16, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of the embodiment.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of the embodiment described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

The present embodiment may be a system, a method, and/or a computer program product. The computer program product may include a computer readable storage medium (or media) having computer readable program instructions thereon for causing a processor to carry out aspects of the present embodiment.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a wave-guide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiment may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiment.

Aspects of the present embodiment are described herein with reference to flowchart illustrations and/or block diagrams of methods, apparatus (systems), and computer program products according to the embodiment. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present embodiment have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

VIII. Recitation of Embodiments

Embodiment 1: What is embodied is: A method comprising: receiving a plurality of images of a sample, the plurality of images comprising a plurality of z-stacks, wherein each z-stack in the plurality of z-stacks represents at least a portion of a volume of the sample; for each z-stack in the plurality of z-stacks: determining a focus score for each image within the z-stack; and determining a thickness of the z-stack based on the focus scores; and determining, based on the determined thicknesses, axial bounds of the sample.

Embodiment 2: The method of embodiment 1, wherein the plurality of z-stacks represents a plurality of fields of view taken of the sample.

Embodiment 3: The method of embodiment 1 or embodiment 2, wherein determining a focus score comprises determining a Tenengrad of each image in the z-stack.

Embodiment 4: The method of embodiment 3, wherein the determined focus scores for each z-stack in the plurality of z-stacks represents a curve.

Embodiment 5: The method of embodiment 4, wherein determining the thickness of the z-stack comprises measuring a width of the curve.

Embodiment 6: The method of embodiment 5, wherein measuring the width comprises measuring from a first inflection point to a second inflection point that is adjacent to the first inflection point.

Embodiment 7: The method of any one of embodiments 1 to 6, further comprising applying a filter to the determined thicknesses.

Embodiment 8: The method of embodiment 7, wherein the filter comprises a smoothing filter.

Embodiment 9: The method of embodiment 7 or embodiment 8, wherein the filter comprises a low pass filter.

Embodiment 10: The method of any one of embodiments 7 to 9, wherein the filter comprises a rolling ball filter.

Embodiment 11: The method of any one of embodiments 1 to 10, further comprising determining a maximum thickness of the sample based on the determined thicknesses, wherein the imageable volume is based on the maximum thickness.

Embodiment 12: The method of embodiment 11, wherein the imageable volume is based on about 100% to about 120% of the maximum thickness.

Embodiment 13: The method of any one of embodiments 1 to 12, further comprising imaging a volume based on the determined axial bounds of the sample.

Embodiment 14: The method of any one of embodiments 1 to 13, further comprising determining the lateral bounds of the sample based on the determined thicknesses.

Embodiment 15: The method of embodiment 14, wherein determining the lateral bounds comprises thresholding the determined thicknesses.

Embodiment 16: The method of any one of embodiments 1 to 15, wherein the plurality of images is received from an optics module comprising a camera and an objective.

Embodiment 17: The method of any one of embodiments 1 to 15, wherein the plurality of images is received from a remote database.

Embodiment 18: The method of any one of embodiments 1 to 15, wherein the plurality of images is received from a local database.

Embodiment 19: The method of any one of embodiments 1 to 18, wherein the sample comprises a tissue sample.

Embodiment 20: The method of any one of embodiments 1 to 19, wherein the sample is translucent.

Embodiment 21: The method of any one of embodiments 1 to 20, wherein the plurality of images comprises dark field images of the sample.

Embodiment 22: The method of any one of embodiments 1 to 21, wherein the plurality of images comprises fluorescent images of the sample.

Embodiment 23: The method of embodiment 22, wherein the fluorescent images comprise DAPI images.

Embodiment 24: The method of any one of embodiments 1 to 23, wherein the plurality of images comprises transilluminated images of the sample.

Embodiment 25: A computer program product comprising a computer readable storage medium having program instructions embodied therewith, the program instructions executable by a processor to cause the processor to perform a method comprising: receiving a plurality of images of a sample, the plurality of images comprising a plurality of z-stacks, wherein each z-stack in the plurality of z-stacks represents at least a portion of a volume of the sample; for each z-stack in the plurality of z-stacks: determining a focus score for each image within the z-stack; and determining a thickness of the z-stack based on the focus scores; and determining, based on the determined thicknesses, axial bounds of the sample representing an imageable volume.

Embodiment 26: The computer program product of embodiment 25, wherein the plurality of z-stacks represents a plurality of fields of view taken of the sample.

Embodiment 27: The computer program product of embodiment 25 or embodiment 26, wherein determining a focus score comprises determining a Tenengrad of each image in the z-stack.

Embodiment 28: The computer program product of embodiment 27, wherein the determined focus scores for each z-stack in the plurality of z-stacks represents a curve.

Embodiment 29: The computer program product of embodiment 28, wherein determining the thickness of the z-stack comprises measuring a width of the curve.

Embodiment 30: The computer program product of embodiment 29, wherein measuring the width comprises measuring from a first inflection point to a second inflection point that is adjacent to the first inflection point.

Embodiment 31: The computer program product of any one of embodiments 25 to 30, further comprising applying a filter to the determined thicknesses.

Embodiment 32: The computer program product of embodiment 31, wherein the filter comprises a smoothing filter.

Embodiment 33: The computer program product of embodiment 31 or embodiment 32, wherein the filter comprises a low pass filter.

Embodiment 34: The computer program product of any one of embodiments 31 to 33, wherein the filter comprises a rolling ball filter.

Embodiment 35: The computer program product of any one of embodiments 25 to 34, further comprising determining a maximum thickness of the sample based on the determined thicknesses, wherein the imageable volume is based on the maximum thickness.

Embodiment 36: The computer program product of embodiment 35, wherein the imageable volume is based on about 100% to about 120% of the maximum thickness.

Embodiment 37: The computer program product of any one of embodiments 25 to 36, further comprising imaging a volume based on the determined axial bounds of the sample.

Embodiment 38: The computer program product of any one of embodiments 25 to 37, further comprising determining the lateral bounds of the sample based on the determined thicknesses.

Embodiment 39: The computer program product of embodiment 38, wherein determining the lateral bounds comprises thresholding the determined thicknesses.

Embodiment 40: The computer program product of any one of embodiments 25 to 39, wherein the plurality of images is received from an optics module comprising a camera and an objective.

Embodiment 41: The computer program product of any one of embodiments 25 to 39, wherein the plurality of images is received from a remote database.

Embodiment 42: The computer program product of any one of embodiments 25 to 39, wherein the plurality of images is received from a local database.

Embodiment 43: The computer program product of any one of embodiments 25 to 42, wherein the sample comprises a tissue sample.

Embodiment 44: The computer program product of any one of embodiments 25 to 43, wherein the sample is translucent.

Embodiment 45: The computer program product of any one of embodiments 25 to 44, wherein the plurality of images comprises dark field images of the sample.

Embodiment 46: The computer program product of any one of embodiments 25 to 45, wherein the plurality of images comprises fluorescent images of the sample.

Embodiment 47: The computer program product of embodiment 46, wherein the fluorescent images comprise DAPI images.

Embodiment 48: The computer program product of any one of embodiments 25 to 47, wherein the plurality of images comprises transilluminated images of the sample.

Embodiment 49: A system comprising: an image database; and a computing node comprising a computer readable storage medium having program instructions embodied therewith, the program instructions executable by a processor to cause the processor to perform a method comprising receiving a plurality of images of a sample from the image database, the plurality of images comprising a plurality of z-stacks, wherein each z-stack in the plurality of z-stacks represents at least a portion of a volume of the sample; for each z-stack in the plurality of z-stacks: determining a focus score for each image within the z-stack; and determining a thickness of the z-stack based on the focus scores; and determining, based on the determined thicknesses, axial bounds of the sample.

Embodiment 50: The system of embodiment 49, wherein the plurality of z-stacks represents a plurality of fields of view taken of the sample.

Embodiment 51: The system of embodiment 49 or embodiment 50, wherein determining a focus score comprises determining a Tenengrad of each image in the z-stack.

Embodiment 52: The system of embodiment 51, wherein the determined focus scores for each z-stack in the plurality of z-stacks represents a curve.

Embodiment 53: The system of embodiment 52, wherein determining the thickness of the z-stack comprises measuring a width of the curve.

Embodiment 54: The system of embodiment 53, wherein measuring the width comprises measuring from a first inflection point to a second inflection point that is adjacent to the first inflection point.

Embodiment 55: The system of any one of embodiments 49 to 54, the method further comprising applying a filter to the determined thicknesses.

Embodiment 56: The system of embodiment 55, wherein the filter comprises a smoothing filter.

Embodiment 57: The system of embodiment 55 or embodiment 56, wherein the filter comprises a low pass filter.

Embodiment 58: The system of any one of embodiments 55 to 57, wherein the filter comprises a rolling ball filter.

Embodiment 59: The system of any one of embodiments 49 to 58, the method further comprising determining a maximum thickness of the sample based on the determined thicknesses, wherein the imageable volume is based on the maximum thickness.

Embodiment 60: The system of embodiment 59, wherein the imageable volume is based on about 100% to about 120% of the maximum thickness.

Embodiment 61: The system of any one of embodiments 49 to 60, the method further comprising imaging a volume based on the determined axial bounds of the sample.

Embodiment 62: The system of any one of embodiments 49 to 61, the method further comprising determining the lateral bounds of the sample based on the determined thicknesses.

Embodiment 63: The system of embodiment 62, wherein determining the lateral bounds comprises thresholding the determined thicknesses.

Embodiment 64: The system of any one of embodiments 49 to 63, wherein the image database receives the plurality of images from an optics module comprising a camera and an objective.

Embodiment 65: The system of any one of embodiments 49 to 63, wherein the image database is a remote database.

Embodiment 66: The system of any one of embodiments 49 to 63, wherein the image database is a local database.

Embodiment 67: The system of any one of embodiments 49 to 66, wherein the sample comprises a tissue sample.

Embodiment 68: The system of any one of embodiments 49 to 67, wherein the sample is translucent.

Embodiment 69: The system of any one of embodiments 49 to 68, wherein the plurality of images comprises dark field images of the sample.

Embodiment 70: The system of any one of embodiments 49 to 69, wherein the plurality of images comprises fluorescent images of the sample.

Embodiment 71: The system of embodiment 70, wherein the fluorescent images comprise DAPI images.

Embodiment 72: The system of any one of embodiments 49 to 71, wherein the plurality of images comprises transilluminated images of the sample.

Embodiment 73: A method, comprising: directing an objective lens to a first point over a sample; locating a first focus position of the objective lens relative to the sample; acquiring multiple images at different axial positions of the objective lens relative to the sample at a pre-selected step increment; determining a focus score from each of the images; identifying two axial bounds from a sequence of focus scores associated with the images; and determine a thickness of a tissue component in the sample based on the two axial bounds.

Embodiment 74: The method of embodiment 73, wherein determining a focus score for each of the images comprises selecting from multiple focus scores indicative of a difference in pixel counts between adjacent axial positions, that which provides a larger signal-to-noise ratio.

Embodiment 75: The method of embodiment 73, wherein determining a focus score for each of the images comprises assigning a gradient score to each of the images based on an amplitude of a gradient field associated with a two-dimensional image.

Embodiment 76: The method of embodiment 73, wherein determining a focus score for each of the images comprises convolving each of the images in two dimensions with a Laplacian matrix to obtain an energy value associated to the focus score.

Embodiment 77: The method of embodiment 73, wherein determining a focus score for each of the images comprises applying a two-dimensional wavelet filter to each of the images to obtain a wavelet amplitude associated to the focus score.

Embodiment 78: The method of embodiment 73, wherein identifying two axial bounds comprises identifying an inflexion point in the sequence of focus scores for at least one of the two axial bounds.

Embodiment 79: The method of embodiment 73, further comprising determining the pre-selected step increment at an initial value, determining a sample thickness based on the sequence of focus scores, determining a second step increment smaller than the pre-selected step increment, and identifying the two axial bounds using multiple images at different axial positions of the objective lens relative to the sample at the second step increment.

Embodiment 80: The method of embodiment 73, further comprising directing the objective lens to a second point over the sample, and identifying the two axial bounds on the second point over the sample, wherein the second point removed from the first point by a distance comparable to a field of view of the objective lens on the sample.

Embodiment 81: The method of embodiment 73, further comprising determining a lateral boundary of the tissue component in the sample based on a sample thickness collected for multiple points on a plane view of the sample.

Embodiment 82: The method of embodiment 73, wherein an illumination power is adjusted based on a numerical aperture of the objective lens based on a signal to noise ratio for the focus score.

Embodiment 83: A system, comprising: an objective lens configured to collect an image from a sample; a sample stage configured to hold a sample, the sample stage including a motion actuator configured to adjust a distance separating the objective lens from the sample along an optical axis of the objective lens, and to scan the sample in a plane substantially perpendicular to the optical axis of the objective lens; a sensor array disposed on an image plane of the objective lens; and a processor configured to: cause the sample stage to move to multiple positions along the optical axis of the objective lens at a first position on the sample; cause the sensor array to collect a two-dimensional image at each of the positions along the optical axis of the objective lens; determine a focus score from the two-dimensional image; and determine a thickness of a tissue component in the sample based on a sequence of the focus score for the positions along the optical axis of the objective lens.

Embodiment 84: The system of embodiment 83, further comprising a light source configured to illuminate the sample at an angle relative to the optical axis of the objective lens, wherein the processor is configured to detect a lateral width of the tissue component based on a phase contrast created by the light source.

Embodiment 85: The system of embodiment 83, wherein the processor is configured to adjust an illumination power for the sample to provide a desirable phase-contrast to determine the focus score from the two-dimensional image.

Embodiment 86: The system of embodiment 83, further comprising a trans-illumination source to provide a direct illumination of the sample into the objective lens.

Embodiment 87: The system of embodiment 83, wherein the processor causes the sensor array to collect a two-dimensional image of the sample in a trans-illumination configuration and in a phase contrast illumination configuration.

Embodiment 88: The system of embodiment 83, wherein to determine a focus score for the two-dimensional image the processor is configured to convolve the two-dimensional image in two dimensions with a Laplacian matrix to obtain an energy value associated to the focus score.

Embodiment 89: The system of embodiment 83, wherein to determine a focus score for the two-dimensional image the processor applies a two-dimensional wavelet filter to obtain a wavelet amplitude associated to the focus score.

Embodiment 90: The system of embodiment 83, wherein to identify two axial bounds comprises identifying an inflexion point in the sequence of the focus score for at least one of the two axial bounds.

Embodiment 91: The system of embodiment 83, wherein to determine the thickness of the tissue component, the processor determines two axial bounds from the sequence of the focus score for the positions along the optical axis of the objective lens.

Embodiment 92: The system of embodiment 83, wherein the processor causes the motion actuator to scan the sample to a second position on the sample separated from the first position by distance equivalent to a field of view of the objective lens.

Embodiment 93: The system of embodiment 83, wherein the processor causes the motion actuator to scan the sample to a second position on the sample separated from the first position by distance smaller than a field of view of the objective lens.

Embodiment 94: The system of embodiment 83, wherein the processor is configured to assess a working distance between the objective lens and the sample based on a first image and a second image of a first beam and a second beam, respectively, projected on the sensor array from the sample, wherein the first beam forms a first numerical aperture and the second beam forms a second numerical aperture, in the objective lens.

Embodiment 95: A computer-implemented method comprising: receiving, by a processor, a first image of a z-stack and a second image of the z-stack, wherein the z-stack comprises a plurality of images of a sample, wherein the plurality of images include the first and second images, and wherein each of the plurality of images is associated with a different focal distance relative to the sample; inputting, by the processor, a plurality of inputs into a machine learning model, wherein the plurality of inputs include the first image, a first focal distance associated with the first image, the second image, and a second focal distance associated with the second image; and determining, by the machine learning model, a parameter related to a thickness of the sample based on the plurality of inputs.

Embodiment 96: The method of embodiment 95, further comprising determining, by the processor, the thickness of the sample based on the parameter.

Embodiment 97: The method of embodiments 95 or 96, wherein the sample is arranged on a substrate and a thickness of the sample is measured perpendicular to the substrate.

Embodiment 98: The method of any of embodiments 95 to 97, wherein the parameter is the thickness of the sample.

Embodiment 99: The method of any of embodiments 95 to 97, wherein a plurality of focus measurements of the plurality of images represent a curve, and wherein the parameter is (1) a first difference of the first focal distance and a third focal distance associated with a first inflection point of the curve and (2) a second difference of the second focal distance and a fourth focal distance associated with a second inflection point of the curve.

Embodiment 100: The method of any of embodiments 95 to 97, wherein a plurality of focus measurements of the plurality of images represent a curve, and wherein the parameter is (1) a first difference of the first focal distance and a fifth focal distance associated with a maximum of the curve and (2) a second difference of the second focal distance and the fifth focal distance.

Embodiment 101: The method of any of embodiments 95 to 97, wherein the parameter is an equation of a curve, wherein a plurality of focus measurements, including the first and second focus measurements, represent the curve.

Embodiment 102: The method of any of embodiments 95 to 101, wherein determining the parameter includes determining, by the machine learning model, a first focus measurement for the first image and a second focus measurement for the second image, wherein the parameter related to the thickness of the sample is generated based on the first and second focus measurements.

Embodiment 103: The method of embodiment 102, wherein each of the first and second focus measurements is one in the group consisting of: a Tenengrad score, a normalized variant score, and a discrete cosine transform.

Embodiment 104: The method of any of embodiments 95 to 103, wherein the thickness of the sample is a difference of a sixth focal distance associated with a first inflection point of a curve and a seventh focal distance associated with a second inflection point of the curve, and wherein a plurality of focus measurements of the plurality of images of the z-stack represent the curve.

Embodiment 105: The method of any of embodiments 95 to 104, wherein the parameter related to the thickness is determined for a first field-of-view of the sample, the method further comprising: receiving a plurality of z-stacks for a plurality of fields-of-view of the sample; determining, by the machine learning model, a plurality of parameters related to the thickness of the sample for the plurality of fields-of-view of the sample; determining, by the processor, the thickness of the sample for each of the plurality of fields-of-view based on the plurality of parameters; and determining, by the processor, boundaries of the sample in a plane perpendicular to the thickness of the sample based on the thickness of the sample at each of the plurality of fields-of-view.

Embodiment 106: The method of embodiment 105, further comprising determining, by the processor, an imageable volume of the sample based on (1) the thickness of the sample at each of the plurality of fields-of-view and (2) the boundaries of the sample.

Embodiment 107: The method of any of embodiments 95 to 106, wherein the machine learning model is trained on a plurality of training images, wherein training the machine learning model comprises: assigning a training label to a first training image of the plurality of training images based on a difference of an eighth focal distance associated with the first training image and a ninth focal distance associated with a second training image of the plurality of training images, wherein the second training image is associated with a maximum focus measurement of a z-stack including the first and second training images.

Embodiment 108: The method of any of embodiments 95 to 107, wherein the first and second images are received from (1) an optics module comprising a camera and an objective or (2) a database.

Embodiment 109: The method of any of embodiments 95 to 108, wherein the sample comprises tissue.

Embodiment 110: The method of embodiment 109, wherein the machine learning model is trained for a first tissue type of a plurality of tissue types.

Embodiment 111: The method of any of embodiments 95 to 110, wherein the sample is translucent.

Embodiment 112: The method of any of embodiments 95 to 111, wherein the plurality of images comprise dark field images of the sample.

Embodiment 113: The method of any of embodiments 95 to 112, wherein the plurality of images comprise fluorescent images of the sample.

Embodiment 114: The method of embodiment 113, wherein the fluorescent images comprise DAPI images.

Embodiment 115: The method of any of embodiments 95 to 111, wherein the plurality of images comprise transilluminated images of the sample.

Embodiment 116: The method of any of embodiments 95 to 115, wherein the machine learning model is implemented as at least two machine learning models.

Embodiment 117: A system comprising: a memory; and a processor in communication with the memory, the processor configured to perform operations comprising any of the methods of embodiments 95 to 116.

Embodiment 118: A non-transitory, computer-readable medium storing instructions, which when executed by a processor, cause the process to perform operations comprising any of the methods of embodiments 95 to 116.

Embodiment 119: A computer-implemented method comprising: receiving, by a processor, a first image of a z-stack and a second image of the z-stack, wherein the z-stack comprises a plurality of images of a sample including the first and second images, and wherein each of the plurality of images is at a different focal distance relative to the sample; determining, by the processor, a first focus measurement for the first image and a second focus measurement for the second image; inputting, by the processor, a plurality of inputs into a machine learning model, the plurality of inputs including the first focus measurement and the second focus measurement; and determining, by the machine learning model, a parameter related to a thickness of the sample based on the first and second focus measurements.

Embodiment 120: The method of embodiment 119, further comprising determining, by the processor, the thickness of the sample based on the parameter.

Embodiment 121: The method of embodiments 119 or 120, wherein the sample is arranged on a substrate and a thickness of the sample is measured perpendicular to the substrate.

Embodiment 122: The method of any of embodiments 119 to 121, wherein the parameter is the thickness of the sample.

Embodiment 123: The method of any of embodiments 119 to 121, wherein a plurality of focus measurements of the plurality of images represent a curve, and wherein the parameter is (1) a first difference of the first focal distance and a third focal distance associated with a first inflection point of the curve and (2) a second difference of the second focal distance and a fourth focal distance associated with a second inflection point of the curve.

Embodiment 124: The method of any of embodiments 119 to 121, wherein a plurality of focus measurements of the plurality of images represent a curve, and wherein the parameter is (1) a first difference of the first focal distance and a fifth focal distance associated with a maximum of the curve and (2) a second difference of the second focal distance and the fifth focal distance.

Embodiment 125: The method of any of embodiments 119 to 121, wherein the parameter is an equation of a curve, wherein a plurality of focus measurements, including the first and second focus measurements, represent the curve.

Embodiment 126: The method of any of embodiments 119 to 125, wherein each of the first and second focus measurements is one in the group consisting of: a Tenengrad score, a normalized variant score, and a discrete cosine transform.

Embodiment 127: The method of any of embodiments 119 to 126, wherein the thickness of the sample is a difference of a sixth focal distance associated with a first inflection point of a curve and a seventh focal distance associated with a second inflection point of the curve, and wherein a plurality of focus measurements of the plurality of images of the z-stack represent the curve.

Embodiment 128: The method of any of embodiments 119 to 127, wherein the parameter related to the thickness is determined for a first field-of-view of the sample, the method further comprising: receiving a plurality of z-stacks for a plurality of fields-of-view of the sample; determining, by the machine learning model, a plurality of parameters related to the thickness of the sample for the plurality of fields-of-view of the sample; determining, by the processor, the thickness of the sample for each of the plurality of fields-of-view based on the plurality of parameters; and determining, by the processor, boundaries of the sample in a plane perpendicular to the thickness of the sample based on the thickness of the sample at each of the plurality of fields-of-view.

Embodiment 129: The method of embodiment 128, further comprising determining, by the processor, an imageable volume of the sample based on (1) the thickness of the sample at each of the plurality of fields-of-view and (2) the boundaries of the sample.

Embodiment 130: The method of any of embodiments 119 to 129, wherein the first and second images are received from (1) an optics module comprising a camera and an objective or (2) a database.

Embodiment 131: The method of any of embodiments 119 to 130, wherein the sample comprises tissue.

Embodiment 132: The method of embodiment 131, wherein the machine learning model is trained for a first tissue type of a plurality of tissue types.

Embodiment 133: The method of any of embodiments 119 to 132, wherein the sample is translucent.

Embodiment 134: The method of any of embodiments 119 to 133, wherein the plurality of images comprise dark field images of the sample.

Embodiment 135: The method of any of embodiments 119 to 133, wherein the plurality of images comprise fluorescent images of the sample.

Embodiment 136: The method of embodiment 135, wherein the fluorescent images comprise DAPI images.

Embodiment 137: The method of any of embodiments 119 to 133, wherein the plurality of images comprise transilluminated images of the sample.

Embodiment 138: The method of any of embodiments 119 to 137, wherein the machine learning model is implemented as at least two machine learning models.

Embodiment 139: A system comprising: a memory; and a processor in communication with the memory, the processor configured to perform operations comprising any of the methods of embodiments 119 to 138.

Embodiment 140: A non-transitory, computer-readable medium storing instructions, which when executed by a processor, cause the process to perform operations comprising any of the methods of embodiments 119 to 138.

Embodiment 141: A computer-implemented method comprising: receiving, by a processor, a first image of a z-stack and a second image of the z-stack, wherein the z-stack comprises a plurality of images of a sample including the first and second images, and wherein each of the plurality of images is at a different focal distance relative to the sample; inputting, by the processor, a first plurality of inputs into a first machine learning model, the first plurality of inputs including the first and second images; determining, by the first machine learning model, a first focus measurement for the first image and a second focus measurement for the second image based on the first and second images; inputting, by the processor, a second plurality of inputs into a second machine learning model, the plurality of inputs including the first and second focus measurements; and determining, by the second machine learning model, a parameter related to a thickness of the sample based on the first and second focus measurements.

Embodiment 142: The method of embodiment 141, further comprising determining, by the processor, the thickness of the sample based on the parameter.

Embodiment 143: The method of embodiments 141 or 142, wherein the sample is arranged on a substrate and a thickness of the sample is measured perpendicular to the substrate.

Embodiment 144: The method of any of embodiments 141 to 143, wherein the parameter is the thickness of the sample.

Embodiment 145: The method of any of embodiments 141 to 143, wherein a plurality of focus measurements of the plurality of images represent a curve, and wherein the parameter is (1) a first difference of the first focal distance and a third focal distance associated with a first inflection point of the curve and (2) a second difference of the second focal distance and a fourth focal distance associated with a second inflection point of the curve.

Embodiment 146: The method of any of embodiments 141 to 143, wherein a plurality of focus measurements of the plurality of images represent a curve, and wherein the parameter is (1) a first difference of the first focal distance and a fifth focal distance associated with a maximum of the curve and (2) a second difference of the second focal distance and the fifth focal distance.

Embodiment 147: The method of any of embodiments 141 to 143, wherein the parameter is an equation of a curve, wherein a plurality of focus measurements, including the first and second focus measurements, represent the curve.

Embodiment 148: The method of any of embodiments 141 to 147, wherein each of the first and second focus measurements is one in the group consisting of: a Tenengrad score, a normalized variant score, and a discrete cosine transform.

Embodiment 149: The method of any of embodiments 141 to 148, wherein the thickness of the sample is a difference of a sixth focal distance associated with a first inflection point of a curve and a seventh focal distance associated with a second inflection point of the curve, and wherein a plurality of focus measurements of the plurality of images of the z-stack represent the curve.

Embodiment 150: The method of any of embodiments 141 to 149, wherein the parameter related to the thickness is determined for a first field-of-view of the sample, the method further comprising: receiving a plurality of z-stacks for a plurality of fields-of-view of the sample; determining, by the machine learning model, a plurality of parameters related to the thickness of the sample for the plurality of fields-of-view of the sample; determining, by the processor, the thickness of the sample for each of the plurality of fields-of-view based on the plurality of parameters; and determining, by the processor, boundaries of the sample in a plane perpendicular to the thickness of the sample based on the thickness of the sample at each of the plurality of fields-of-view.

Embodiment 151: The method of embodiment 150, further comprising determining, by the processor, an imageable volume of the sample based on (1) the thickness of the sample at each of the plurality of fields-of-view and (2) the boundaries of the sample.

Embodiment 152: The method of any of embodiments 141 to 151, wherein the first and second images are received from (1) an optics module comprising a camera and an objective or (2) a database.

Embodiment 153: The method of any of embodiments 141 to 152, wherein the sample comprises tissue.

Embodiment 154: The method of embodiment 153, wherein the first and second machine learning models are trained for a first tissue type of a plurality of tissue types.

Embodiment 155: The method of any of embodiments 141 to 154, wherein the sample is translucent.

Embodiment 156: The method of any of embodiments 141 to 155, wherein the plurality of images comprise dark field images of the sample.

Embodiment 157: The method of any of embodiments 141 to 156, wherein the plurality of images comprise fluorescent images of the sample.

Embodiment 158: The method of embodiment 157, wherein the fluorescent images comprise DAPI images.

Embodiment 159: The method of any of embodiments 141 to 158, wherein the plurality of images comprise transilluminated images of the sample.

Embodiment 160: The method of any of embodiments 141 to 159, wherein at least one of the first machine learning model and the second machine learning model is implemented as at least two machine learning models.

Embodiment 161: A system comprising: a memory; and a processor in communication with the memory, the processor configured to perform operations comprising any of the methods of embodiments 141 to 160.

Embodiment 162: A non-transitory, computer-readable medium storing instructions, which when executed by a processor, cause the process to perform operations comprising any of the methods of embodiments 141 to 160.

Embodiment 163: A computer-implemented method comprising: receiving, by a processor, a first image of a z-stack and a second image of the z-stack, wherein the z-stack comprises a plurality of images of a sample including the first and second images, and wherein each of the plurality of images is at a different focal distance relative to the sample; inputting, by the processor, a first plurality of inputs into a first machine learning model, the first plurality of inputs including the first and second images; determining, by the first machine learning model, a first vector representing a first focus measurement for the first image and a second vector representing a second focus measurement for the second image; inputting, by the processor, a second plurality of inputs into a second machine learning model, the second plurality of inputs including the first and second vectors; and determining, by the second machine learning model, a parameter related to a thickness of the sample based on the first and second vectors.

Embodiment 164: The method of embodiment 163, further comprising determining, by the processor, the thickness of the sample based on the parameter.

Embodiment 165: The method of embodiments 163 or 164, wherein the sample is arranged on a substrate and a thickness of the sample is measured perpendicular to the substrate.

Embodiment 166: The method of any of embodiments 163 to 165, wherein the parameter is the thickness of the sample.

Embodiment 167: The method of any of embodiments 163 to 165, wherein a plurality of focus measurements of the plurality of images represent a curve, and wherein the parameter is (1) a first difference of the first focal distance and a third focal distance associated with a first inflection point of the curve and (2) a second difference of the second focal distance and a fourth focal distance associated with a second inflection point of the curve.

Embodiment 168: The method of any of embodiments 163 to 165, wherein a plurality of focus measurements of the plurality of images represent a curve, and wherein the parameter is (1) a first difference of the first focal distance and a fifth focal distance associated with a maximum of the curve and (2) a second difference of the second focal distance and the fifth focal distance.

Embodiment 169: The method of any of embodiments 163 to 165, wherein the parameter is an equation of a curve, wherein a plurality of focus measurements, including the first and second focus measurements, represent the curve.

Embodiment 170: The method of any of embodiments 163 to 169, wherein each of the first and second focus measurements is one in the group consisting of: a Tenengrad score, a normalized variant score, and a discrete cosine transform.

Embodiment 171: The method of any of embodiments 163 to 169, wherein the thickness of the sample is a difference of a sixth focal distance associated with a first inflection point of a curve and a seventh focal distance associated with a second inflection point of the curve, and wherein a plurality of focus measurements of the plurality of images of the z-stack represent the curve.

Embodiment 172: The method of any of embodiments 163 to 171, wherein the parameter related to the thickness is determined for a first field-of-view of the sample, the method further comprising: receiving a plurality of z-stacks for a plurality of fields-of-view of the sample; determining, by the machine learning model, a plurality of parameters related to the thickness of the sample for the plurality of fields-of-view of the sample; determining, by the processor, the thickness of the sample for each of the plurality of fields-of-view based on the plurality of parameters; and determining, by the processor, boundaries of the sample in a plane perpendicular to the thickness of the sample based on the thickness of the sample at each of the plurality of fields-of-view.

Embodiment 173: The method of embodiment 172, further comprising determining, by the processor, an imageable volume of the sample based on (1) the thickness of the sample at each of the plurality of fields-of-view and (2) the boundaries of the sample.

Embodiment 174: The method of any of embodiments 163 to 173, wherein the first and second images are received from (1) an optics module comprising a camera and an objective or (2) a database.

Embodiment 175: The method of any of embodiments 163 to 174, wherein the sample comprises tissue.

Embodiment 176: The method of embodiment 175, wherein the first and second machine learning models are trained for a first tissue type of a plurality of tissue types.

Embodiment 177: The method of any of embodiments 163 to 176, wherein the sample is translucent.

Embodiment 178: The method of any of embodiments 163 to 177, wherein the plurality of images comprise dark field images of the sample.

Embodiment 179: The method of any of embodiments 163 to 178, wherein the plurality of images comprise fluorescent images of the sample.

Embodiment 180: The method of embodiment 179, wherein the fluorescent images comprise DAPI images.

Embodiment 181: The method of any of embodiments 163 to 177, wherein the plurality of images comprise transilluminated images of the sample.

Embodiment 182: The method of any of embodiments 163 to 181, wherein at least one of the first machine learning model and the second machine learning model is implemented as at least two machine learning models.

Embodiment 183: A system comprising: a memory; and a processor in communication with the memory, the processor configured to perform operations comprising any of the methods of embodiments 163 to 182.

Embodiment 184: A non-transitory, computer-readable medium storing instructions, which when executed by a processor, cause the process to perform operations comprising any of the methods of embodiments 163 to 182.

What is claimed is:

1. A method comprising:
- receiving a plurality of images of a sample, the plurality of images comprising a plurality of z-stacks, wherein each z-stack in the plurality of z-stacks represents at least a portion of a volume of the sample;
- for each z-stack in the plurality of z-stacks:
  - determining a focus score for each image within the z-stack; and
  - determining a thickness of the z-stack based on the focus scores;
- determining, based on the determined thicknesses, axial bounds of the sample; and
- determining, based on the determined thicknesses, the lateral bounds of the sample.

2. The method of claim 1, wherein the plurality of z-stacks represents a plurality of fields of view taken of the sample.

3. The method of claim 1, wherein determining a focus score comprises determining a Tenengrad of each image in the z-stack.

4. The method of claim 3, wherein the determined focus scores for each z-stack in the plurality of z-stacks represents a curve.

5. The method of claim 4, wherein determining the thickness of the z-stack comprises measuring a width of the curve.

6. The method of claim 5, wherein measuring the width comprises measuring from a first inflection point to a second inflection point that is adjacent to the first inflection point.

7. The method of claim 1, further comprising applying a filter to the determined thicknesses.

8. The method of claim 7, wherein the filter comprises a smoothing filter.

9. The method of claim 7, wherein the filter comprises a low pass filter or a rolling ball filter.

10. The method of claim 1, further comprising determining a maximum thickness of the sample based on the determined thicknesses, wherein the imageable volume is based on the maximum thickness.

11. The method of claim 10, wherein the imageable volume is based on about 100% to about 120% of the maximum thickness.

12. The method of claim 1, further comprising imaging a volume based on the determined axial bounds of the sample.

13. The method of claim 1, wherein determining the lateral bounds comprises thresholding the determined thicknesses.

14. The method of claim 1, wherein the plurality of images is received from an optics module comprising a camera and an objective.

15. The method of claim 1, wherein the sample comprises a tissue sample.

16. The method of claim 1, wherein the sample is translucent.

17. A non-transitory computer readable storage medium having program instructions embodied therewith, the program instructions executable by a processor to cause the processor to perform a method comprising:
- receiving a plurality of images of a sample, the plurality of images comprising a plurality of z-stacks, wherein each z-stack in the plurality of z-stacks represents at least a portion of a volume of the sample;
- for each z-stack in the plurality of z-stacks:
  - determining a focus score for each image within the z-stack; and
  - determining a thickness of the z-stack based on the focus scores;
- determining, based on the determined thicknesses, axial bounds of the sample representing an imageable volume; and
- determining, based on the determined thicknesses, the lateral bounds of the sample.

18. A system comprising:
- an image database; and
- a computing node comprising a computer readable storage medium having program instructions embodied therewith, the program instructions executable by a processor to cause the processor to perform a method comprising:
  - receiving a plurality of images of a sample from the image database, the plurality of images comprising a plurality of z-stacks, wherein each z-stack in the plurality of z-stacks represents at least a portion of a volume of the sample;
  - for each z-stack in the plurality of z-stacks:
    - determining a focus score for each image within the z-stack; and
    - determining a thickness of the z-stack based on the focus scores;
  - determining, based on the determined thicknesses, axial bounds of the sample; and
  - determining, based on the determined thicknesses, the lateral bounds of the sample.

19. The non-transitory computer readable storage medium of claim 17, wherein determining the lateral bounds comprises thresholding the determined thicknesses.

20. The system of claim 18, wherein determining the lateral bounds comprises thresholding the determined thicknesses.

* * * * *